(12) United States Patent
Kato et al.

(10) Patent No.: US 10,222,050 B2
(45) Date of Patent: Mar. 5, 2019

(54) LIGHTING DEVICE

(71) Applicant: KABUSHIKI KAISHA TOSHIBA, Minato-ku (JP)

(72) Inventors: Mitsuaki Kato, Kawasaki (JP); Hiroshi Ohno, Yokohama (JP); Katsumi Hisano, Matsudo (JP); Tomonao Takamatsu, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 144 days.

(21) Appl. No.: 15/015,432

(22) Filed: Feb. 4, 2016

(65) Prior Publication Data

US 2016/0230978 A1    Aug. 11, 2016

(30) Foreign Application Priority Data

Feb. 5, 2015  (JP) .................................. 2015-021351

(51) Int. Cl.

| F21V 29/00 | (2015.01) |
|---|---|
| F21V 29/83 | (2015.01) |
| G02B 6/00 | (2006.01) |
| F21K 9/232 | (2016.01) |
| F21V 3/02 | (2006.01) |
| F21K 9/64 | (2016.01) |
| F21Y 115/10 | (2016.01) |

(52) U.S. Cl.
CPC .............. F21V 29/83 (2015.01); F21K 9/232 (2016.08); G02B 6/00 (2013.01); F21K 9/64 (2016.08); F21V 3/02 (2013.01); F21Y 2115/10 (2016.08)

(58) Field of Classification Search
CPC ... F21K 9/00; F21K 9/23; F21K 9/232; F21K 9/235; F21K 9/237; F21K 9/238; F21K 9/64; F21V 29/00; F21V 29/10; F21V 29/15; F21V 29/83; G02B 6/00
USPC ....................... 362/249.02, 294, 311.02, 800
See application file for complete search history.

(56) References Cited

U.S. PATENT DOCUMENTS

| 8,382,325 B2 * | 2/2013 | Hisayasu | F21V 3/00 362/249.02 |
|---|---|---|---|
| 2010/0026185 A1 | 2/2010 | Betsuda et al. | |
| 2010/0027276 A1 | 2/2010 | Kornitz et al. | |
| 2012/0061070 A1 | 3/2012 | Kornitz et al. | |
| 2012/0163001 A1 | 6/2012 | Bertram et al. | |

(Continued)

FOREIGN PATENT DOCUMENTS

| EP | 2 998 639 A1 | 3/2016 |
|---|---|---|
| JP | H8-212826 A | 8/1996 |

(Continued)

*Primary Examiner* — Jason M Han
(74) *Attorney, Agent, or Firm* — Oblon, McClelland, Maier & Neustadt, L.L.P.

(57) ABSTRACT

According to one embodiment, a lighting device includes a hollow main body having thermal conductivity, a light source having at least a semiconductor light-emitting element, an accessory element, and an adiabatic member. The light source is thermally coupled to the main body. The accessory element has an allowable temperature limit different from that of the light source, and is accommodated in the main body. The adiabatic member divides the main body into a first region thermally coupled to the light source, and at least a second region thermally coupled to the accessory element and thermally isolated from the first region.

8 Claims, 28 Drawing Sheets

(56) References Cited

U.S. PATENT DOCUMENTS

| | | |
|---|---|---|
| 2012/0218768 A1 | 8/2012 | Hisano et al. |
| 2013/0223077 A1 | 8/2013 | Kato et al. |
| 2014/0153252 A1 | 6/2014 | Shida et al. |
| 2014/0293654 A1 | 10/2014 | Kato et al. |
| 2015/0085492 A1 | 3/2015 | Kato et al. |

FOREIGN PATENT DOCUMENTS

| | | |
|---|---|---|
| JP | 2002-352604 A | 12/2002 |
| JP | 2009-170114 A | 7/2009 |
| JP | 2009-206026 A | 9/2009 |
| JP | 2010-86709 A | 4/2010 |
| JP | 2010-198807 A | 9/2010 |
| JP | 2010-282838 A | 12/2010 |
| JP | 2010-282986 A | 12/2010 |
| JP | 2011-175786 A | 9/2011 |
| JP | 2011-187220 A | 9/2011 |
| JP | 2011-243365 A | 12/2011 |
| JP | 2011-529627 A | 12/2011 |
| JP | 2012-79565 A | 4/2012 |
| JP | 2012-181966 A | 9/2012 |
| JP | 2012-234731 A | 11/2012 |
| JP | 2013-500560 A | 1/2013 |
| JP | 2013-175406 A | 9/2013 |
| JP | 5284734 B2 | 9/2013 |
| JP | 2013-214465 A | 10/2013 |
| JP | 2013-222566 A | 10/2013 |
| JP | 2014-32827 A | 2/2014 |
| JP | 2014-191921 A | 10/2014 |
| JP | 2014-216259 A | 11/2014 |
| JP | 2015-64989 A | 4/2015 |
| WO | 2013/024557 A1 | 2/2013 |
| WO | 2014/174859 A1 | 10/2014 |
| WO | WO 2015/019683 A1 | 2/2015 |
| WO | WO 2015/020229 A1 | 2/2015 |

\* cited by examiner

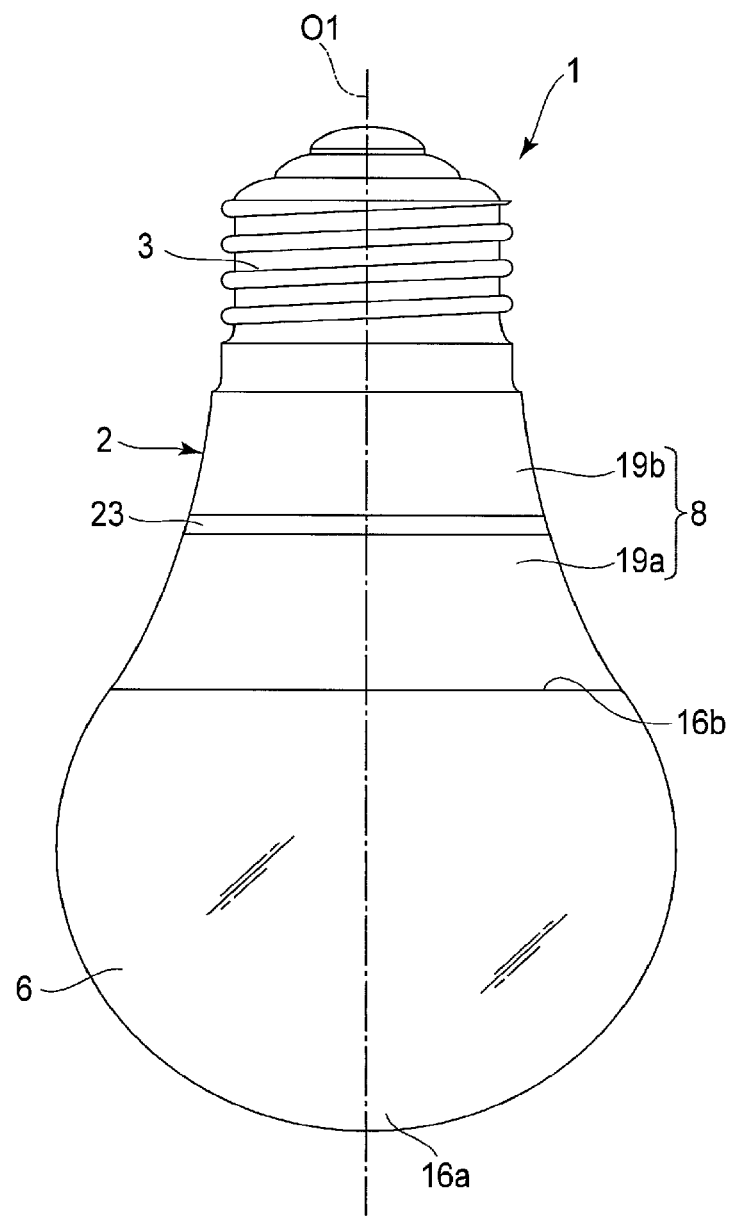
F I G. 1

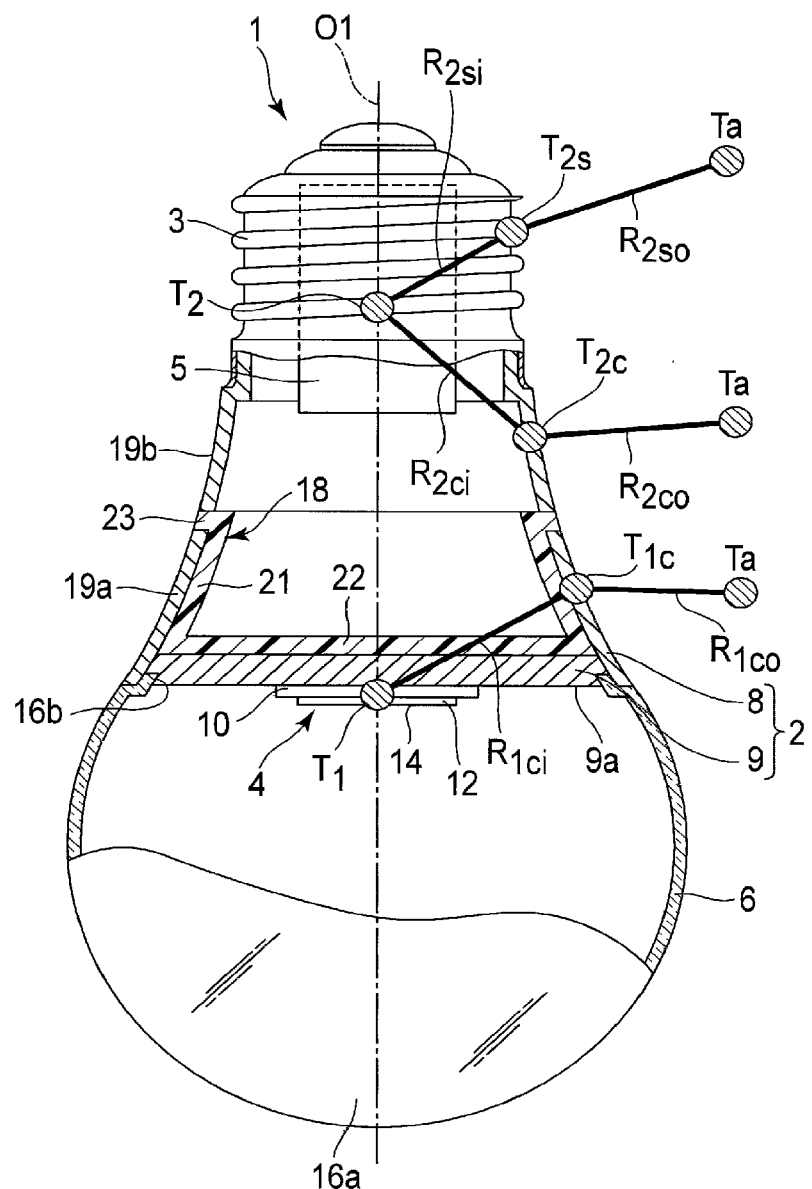
F I G. 4

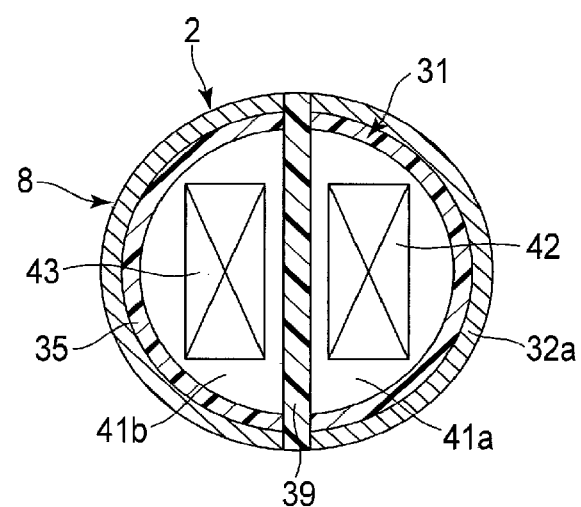
F I G. 7

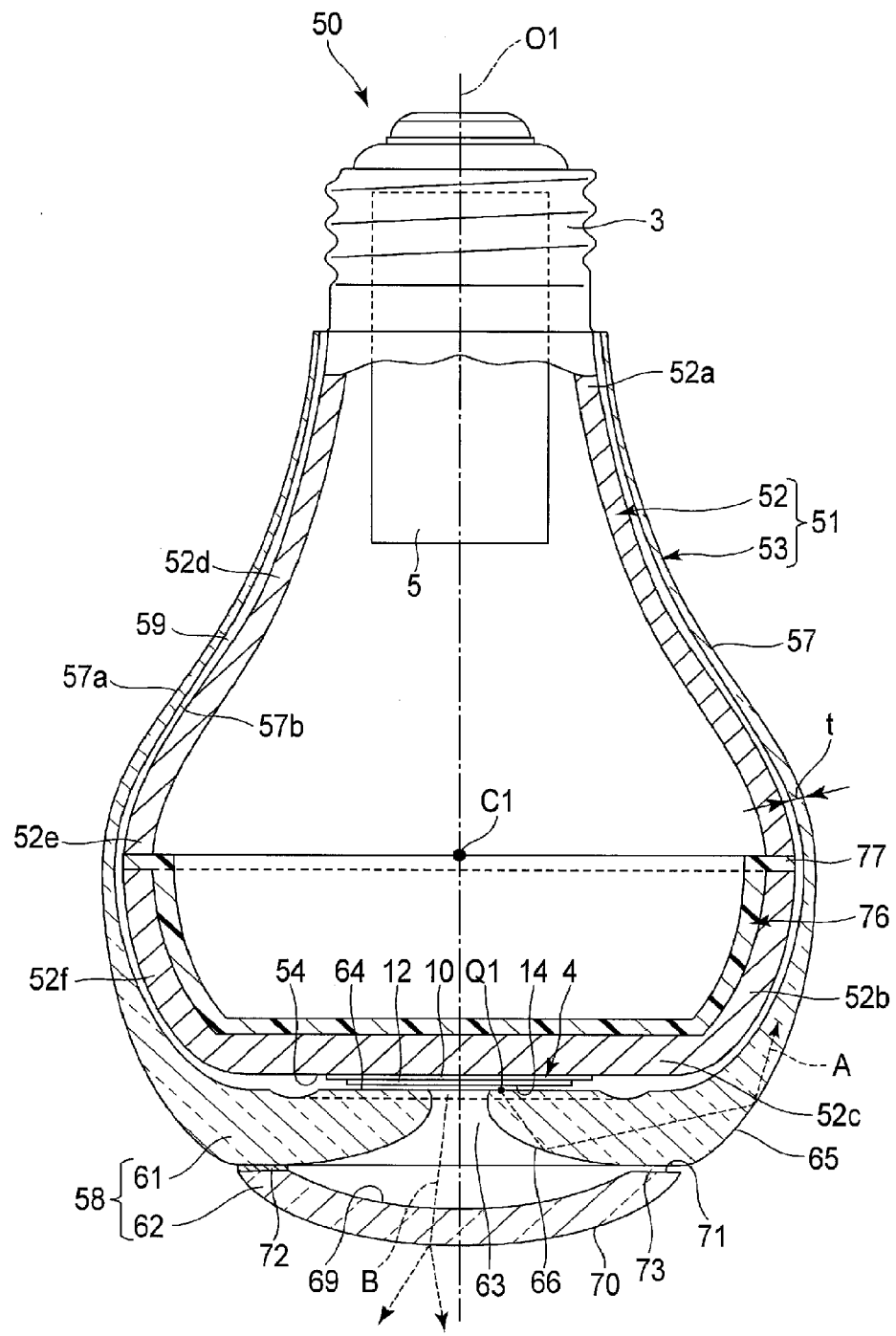
F I G. 8

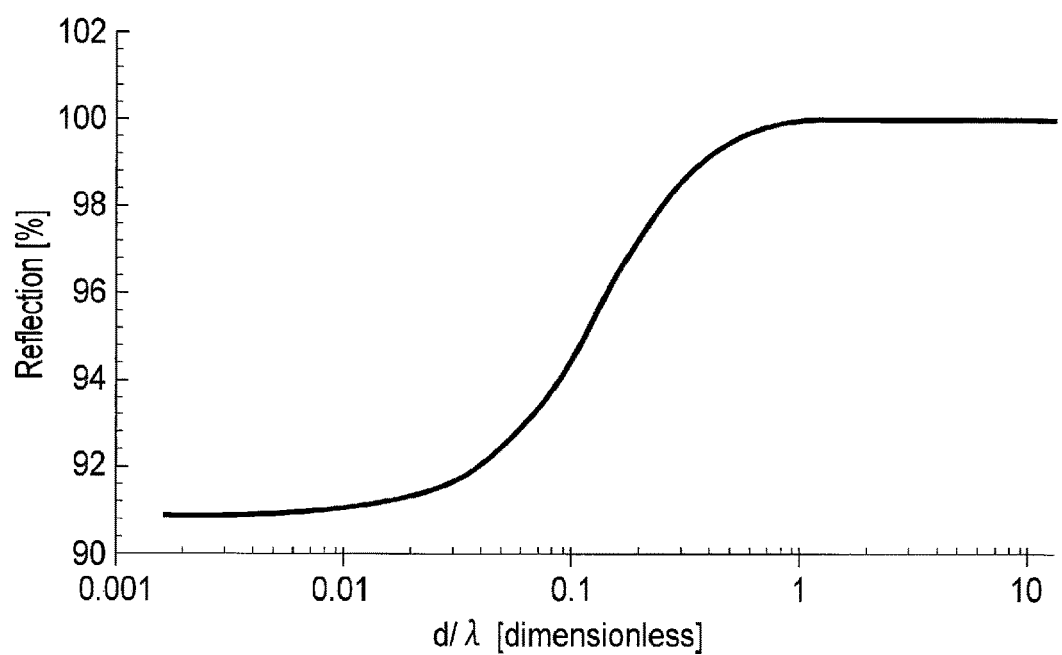
F I G. 9

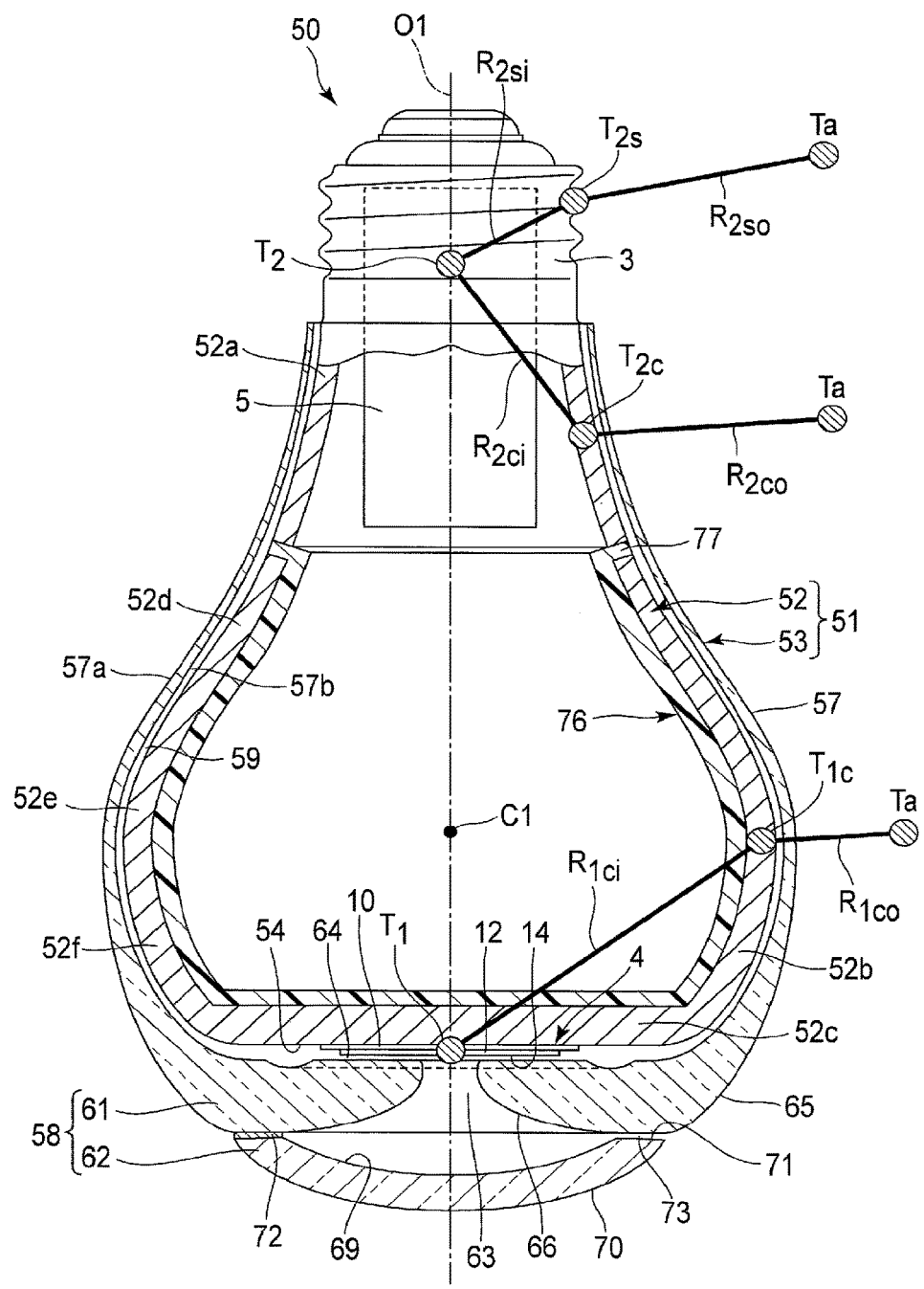
F I G. 11

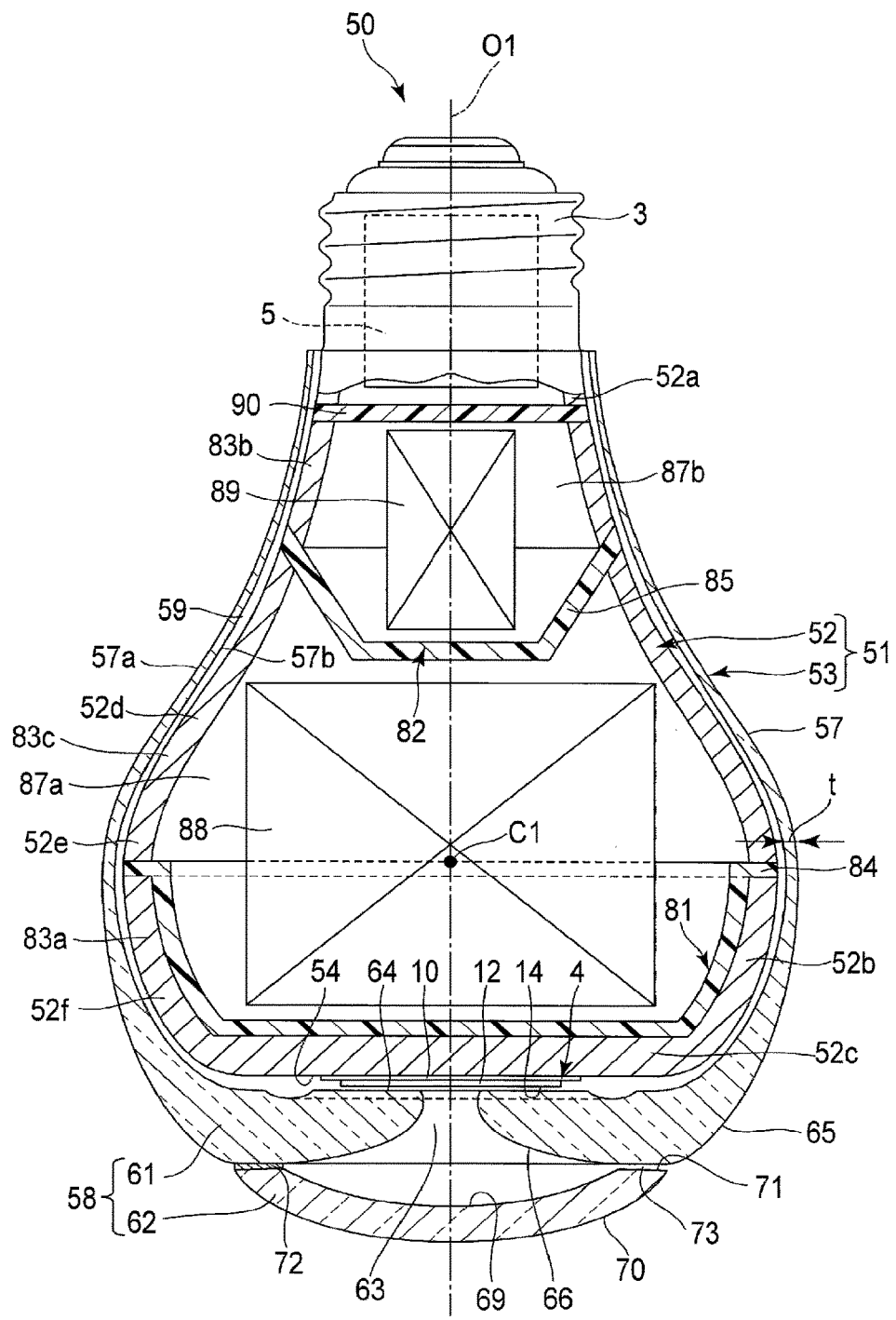
F I G. 12

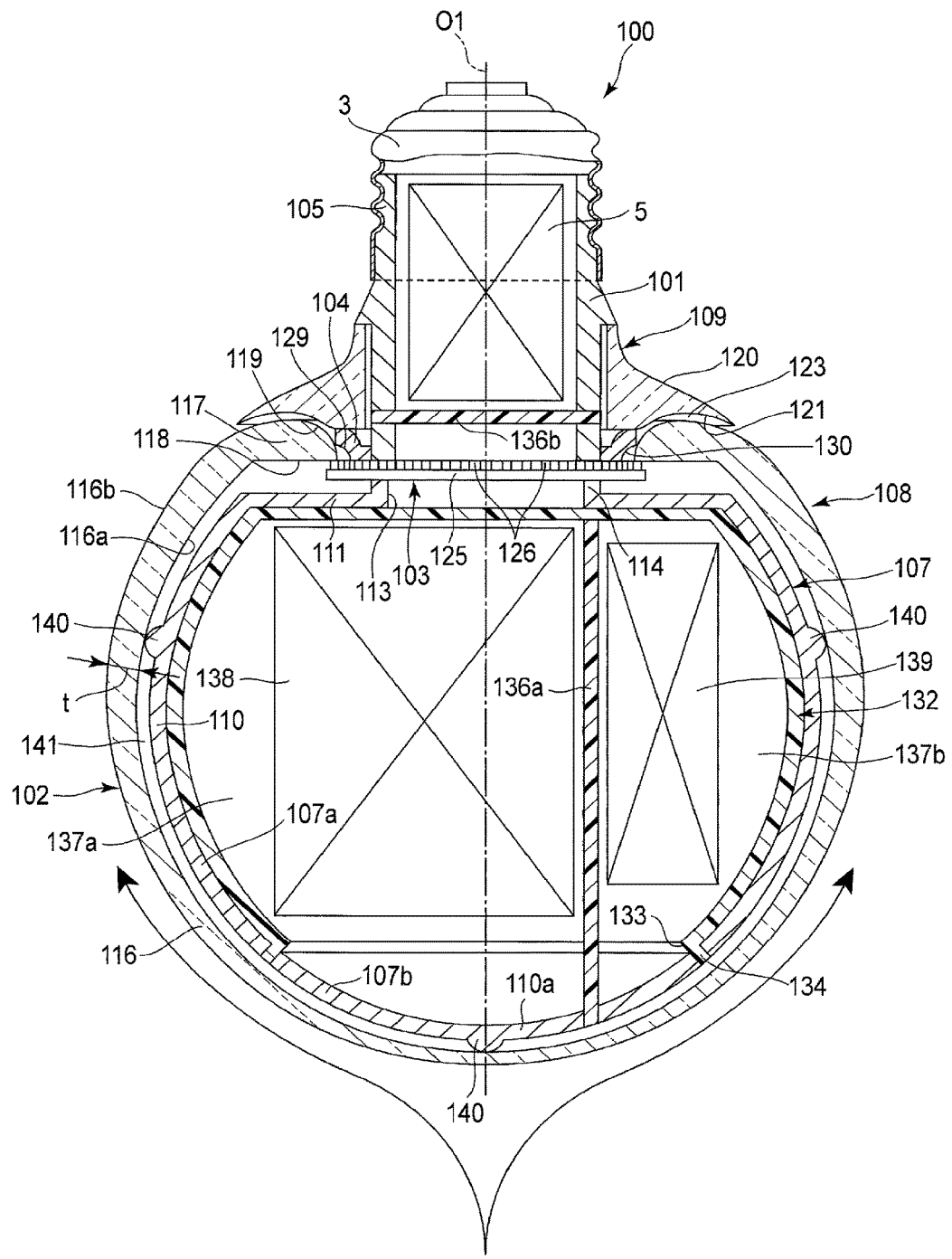
F I G. 13

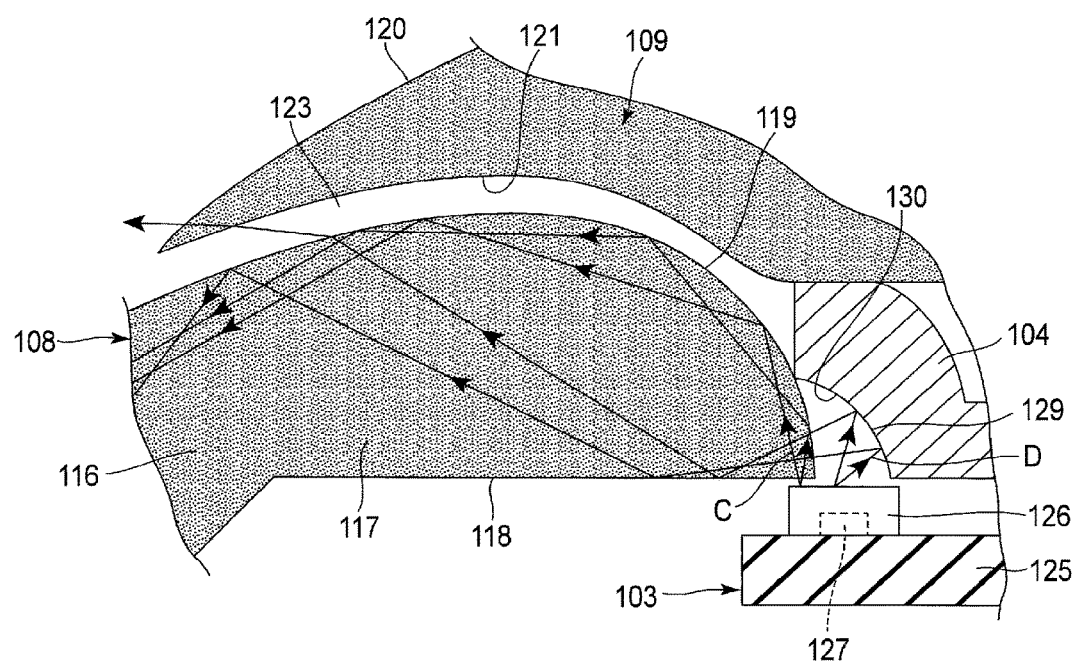
F I G. 14

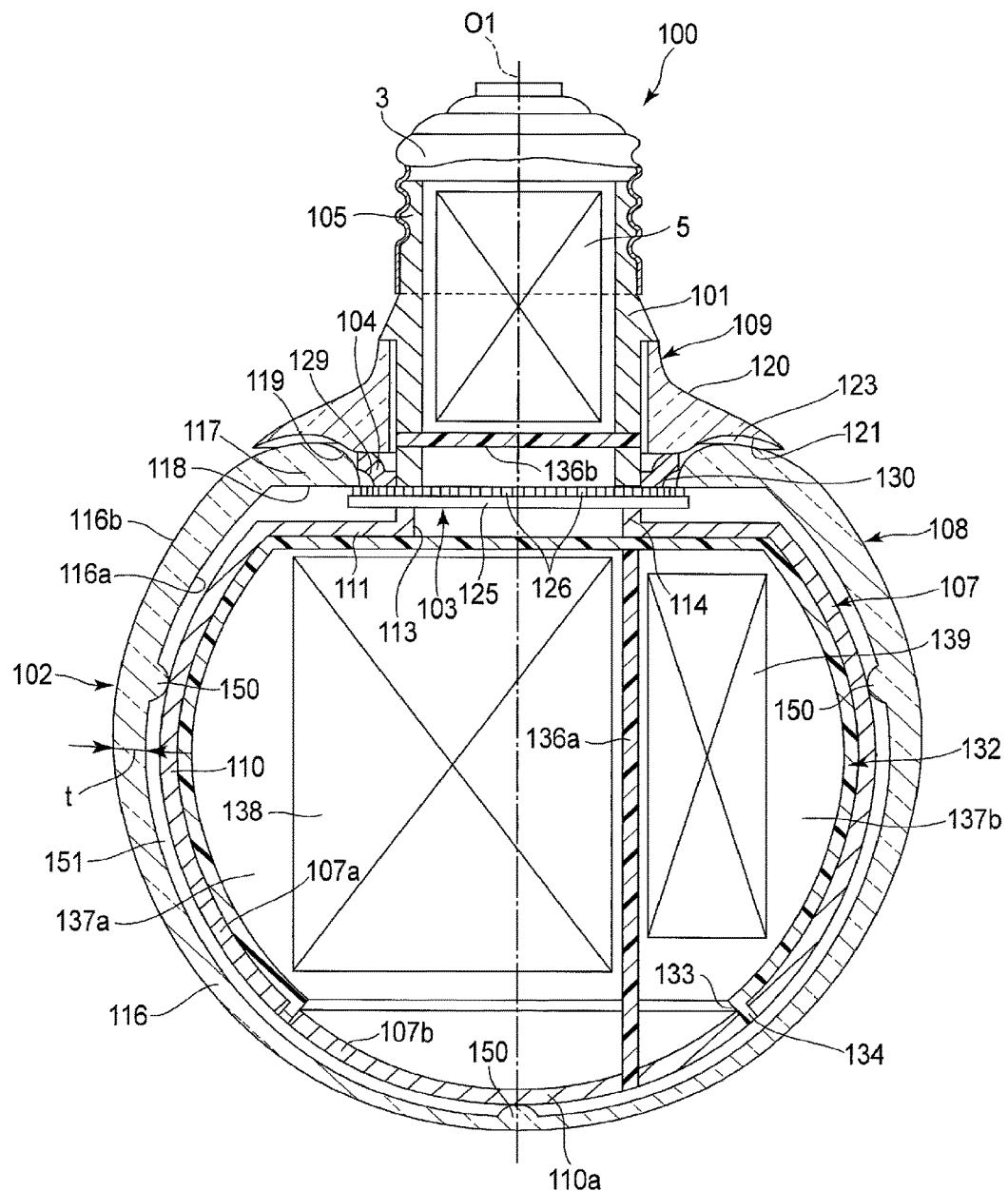
F I G. 15

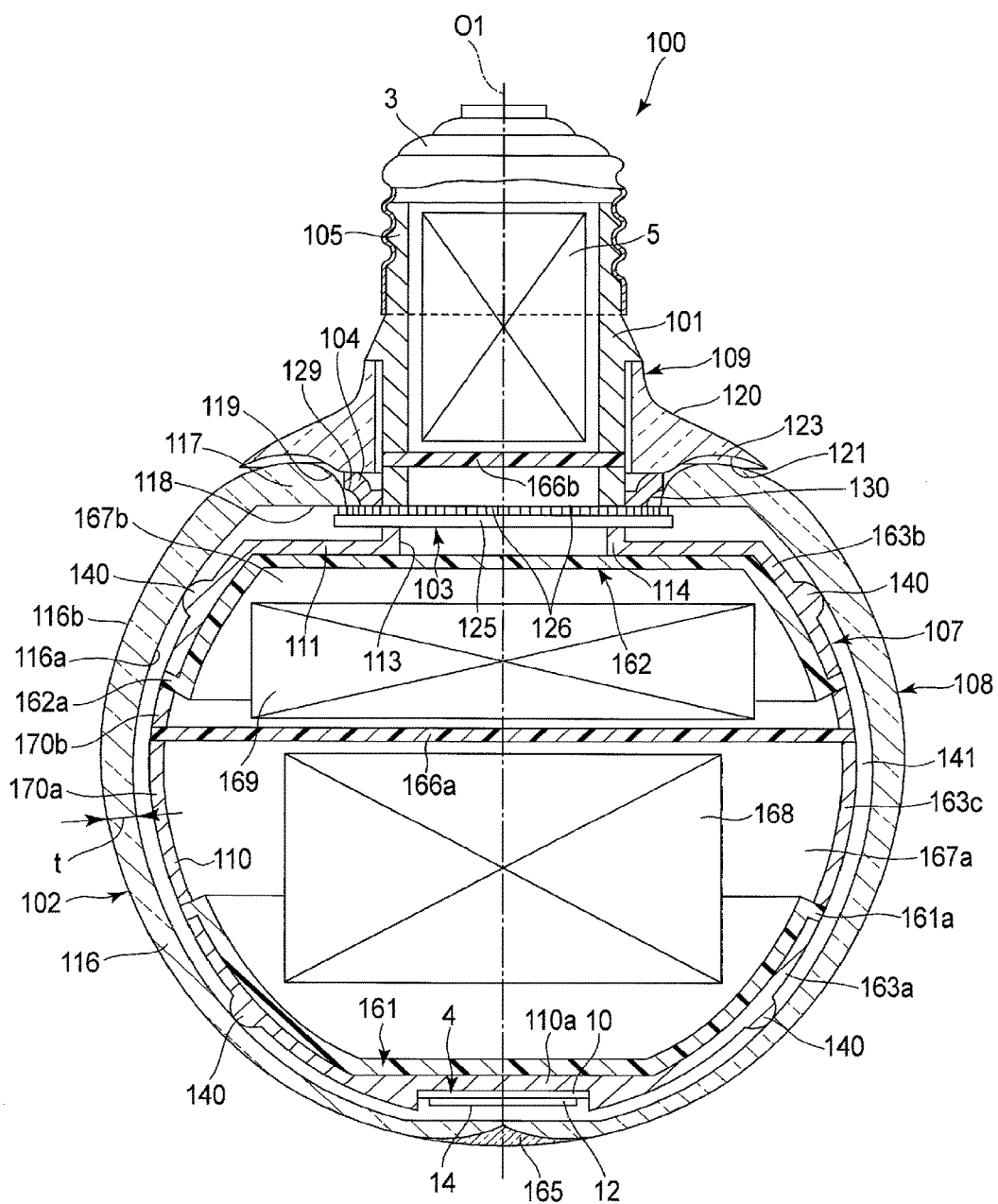
F I G. 16

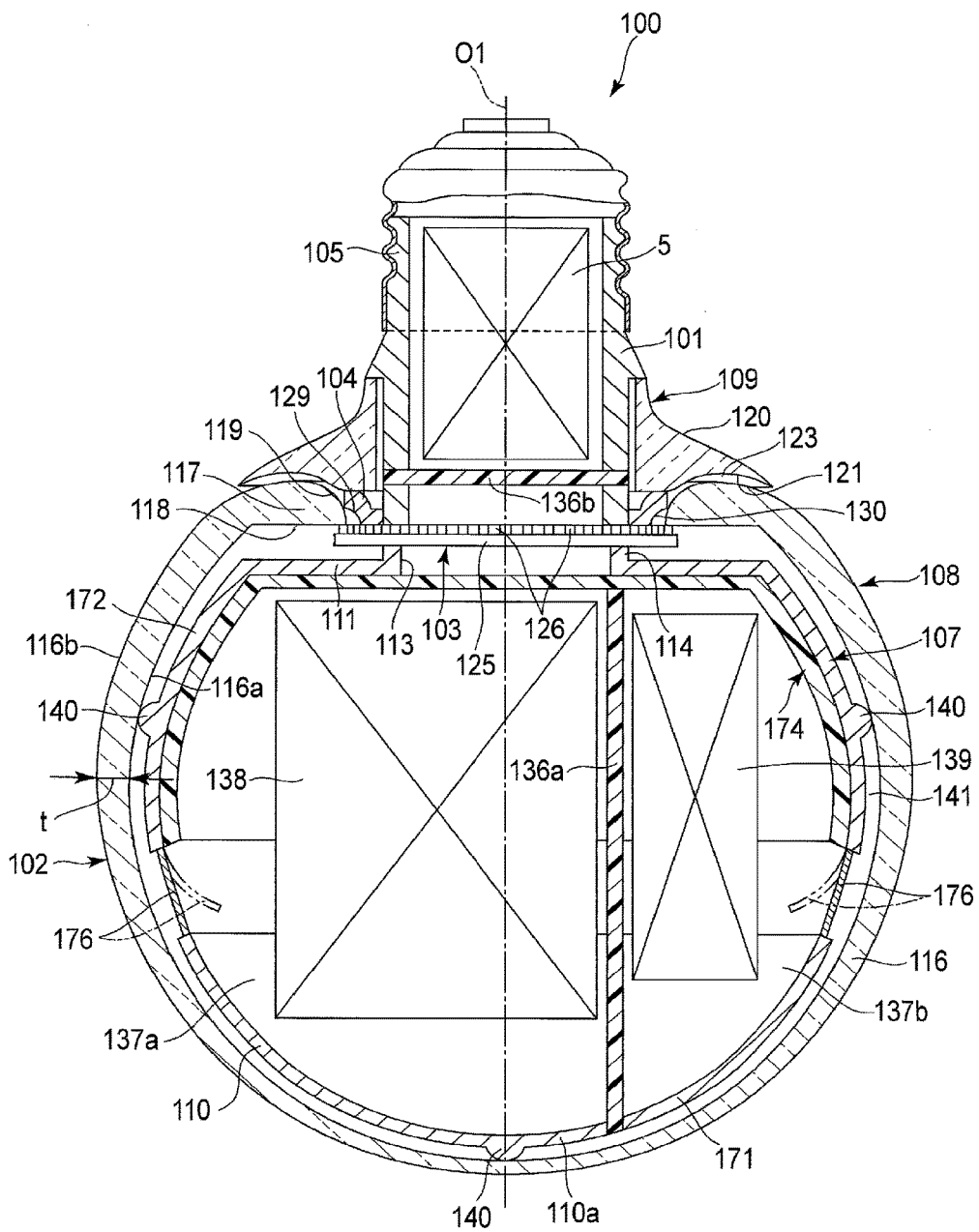
F I G. 17

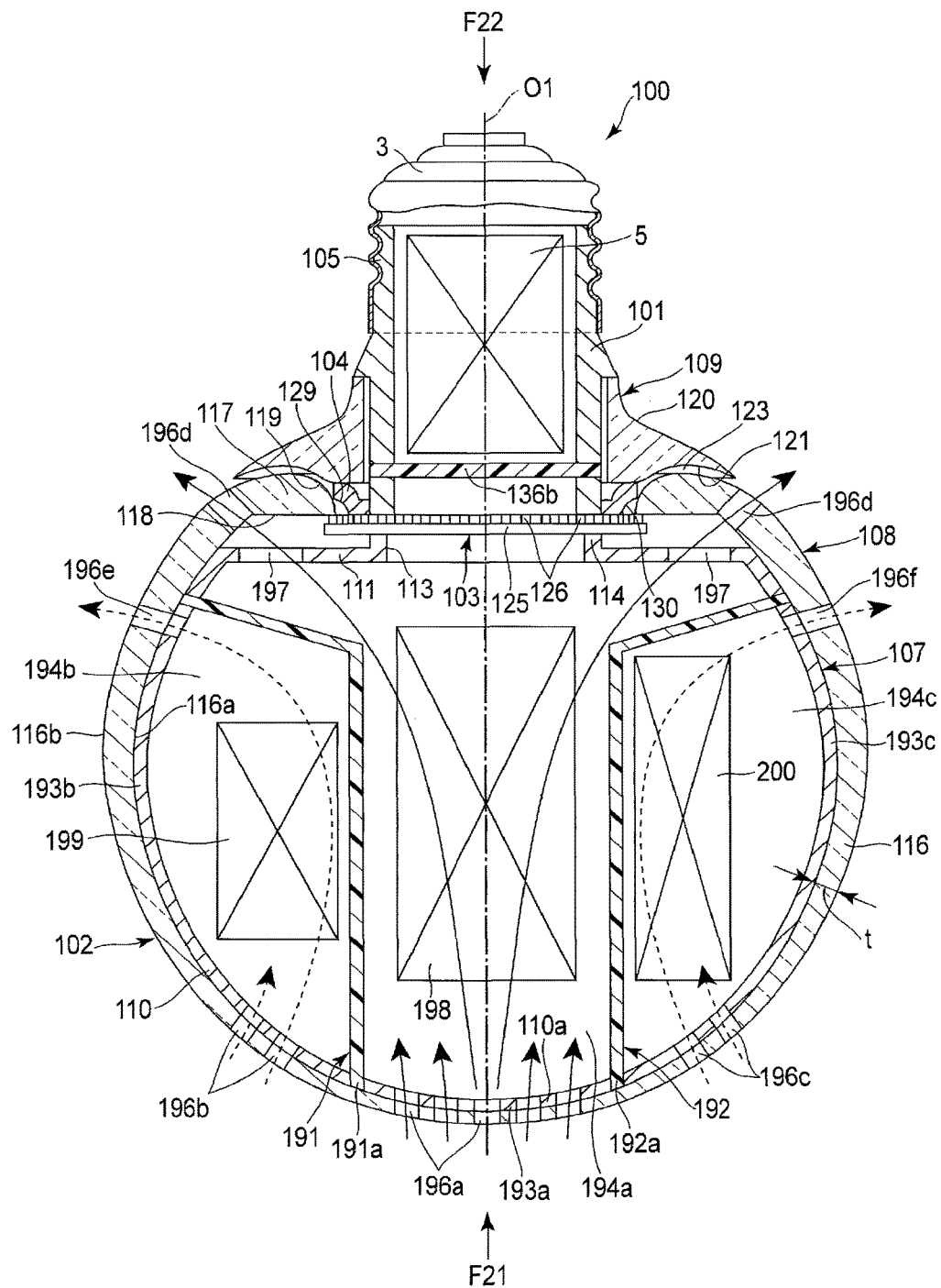
F I G. 20

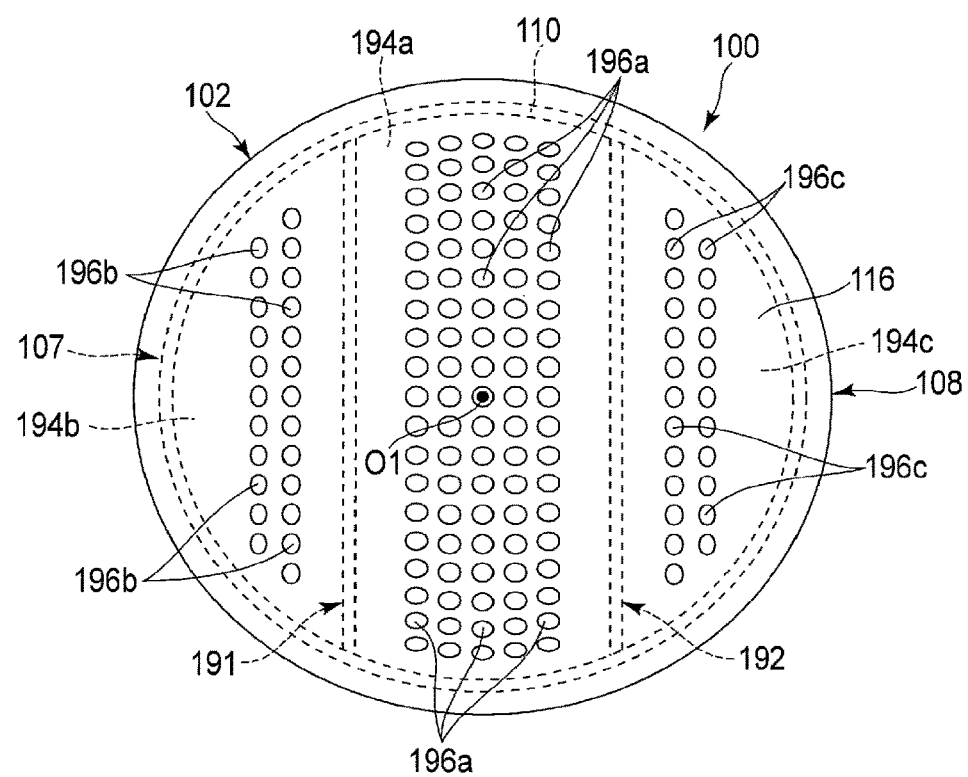
F I G. 21

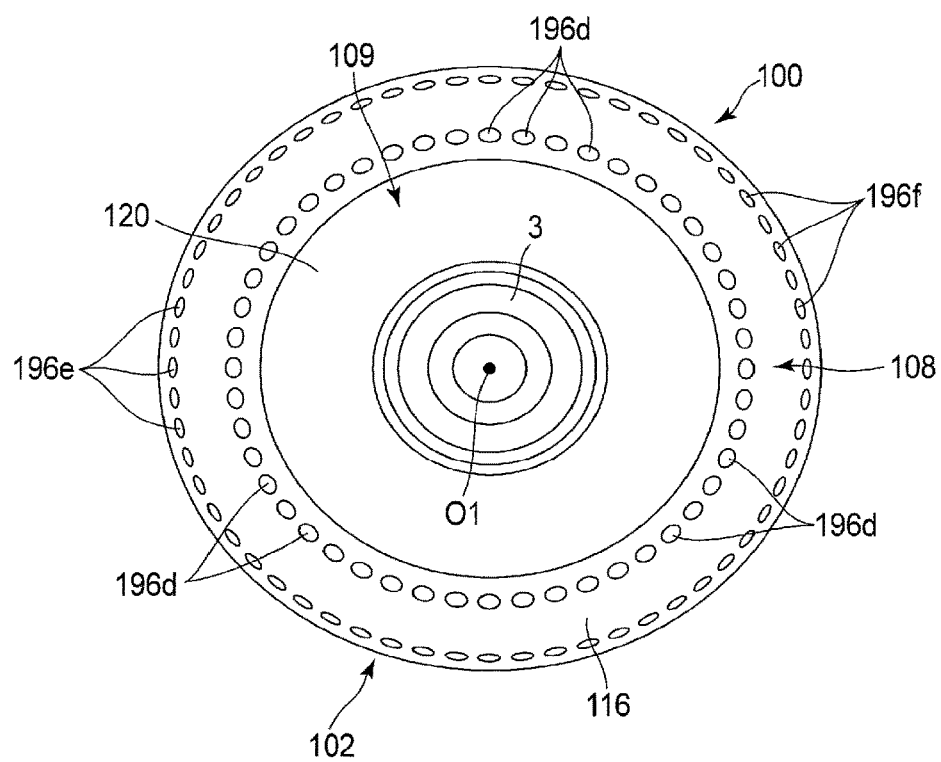
F I G. 22

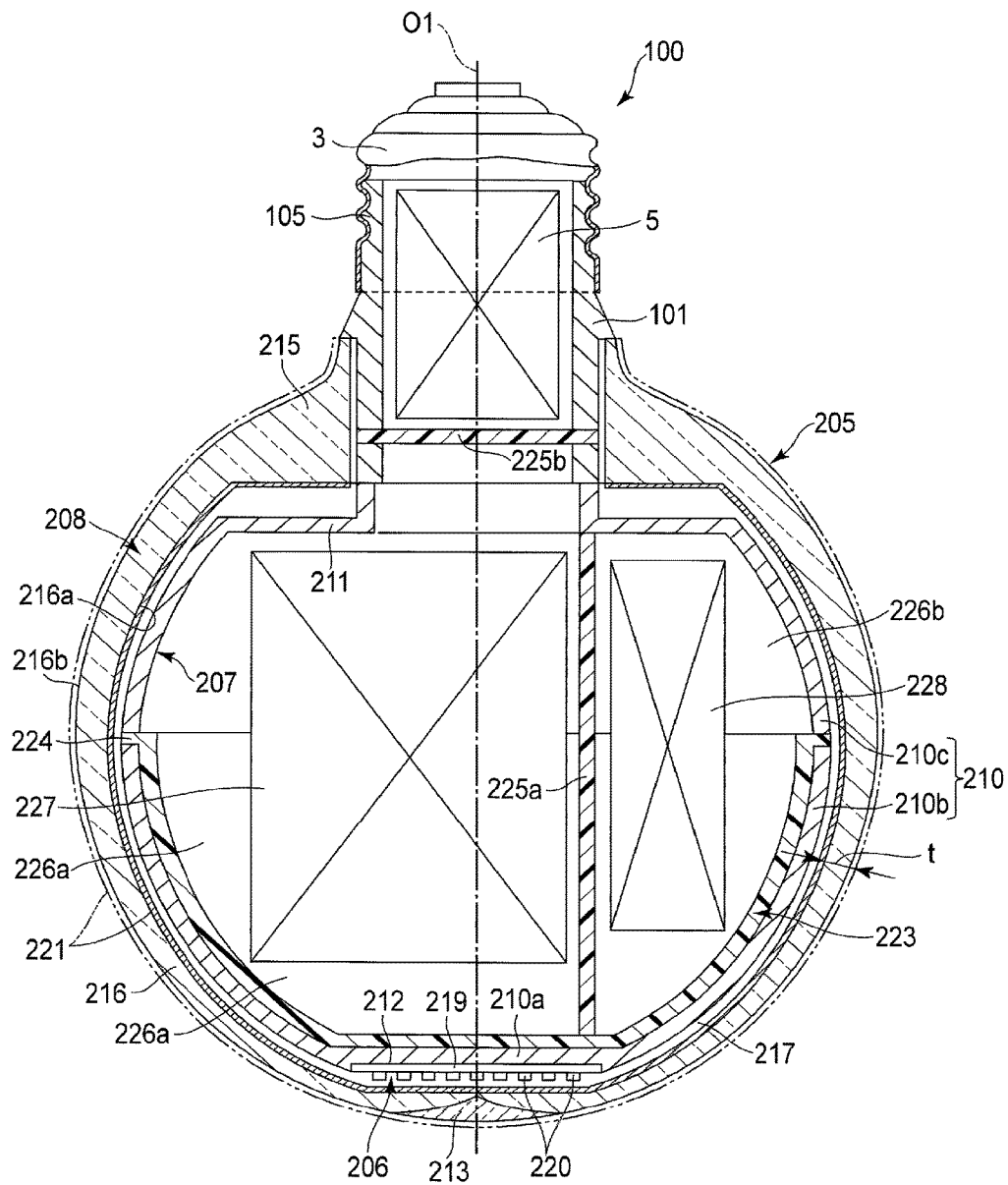
F I G. 23

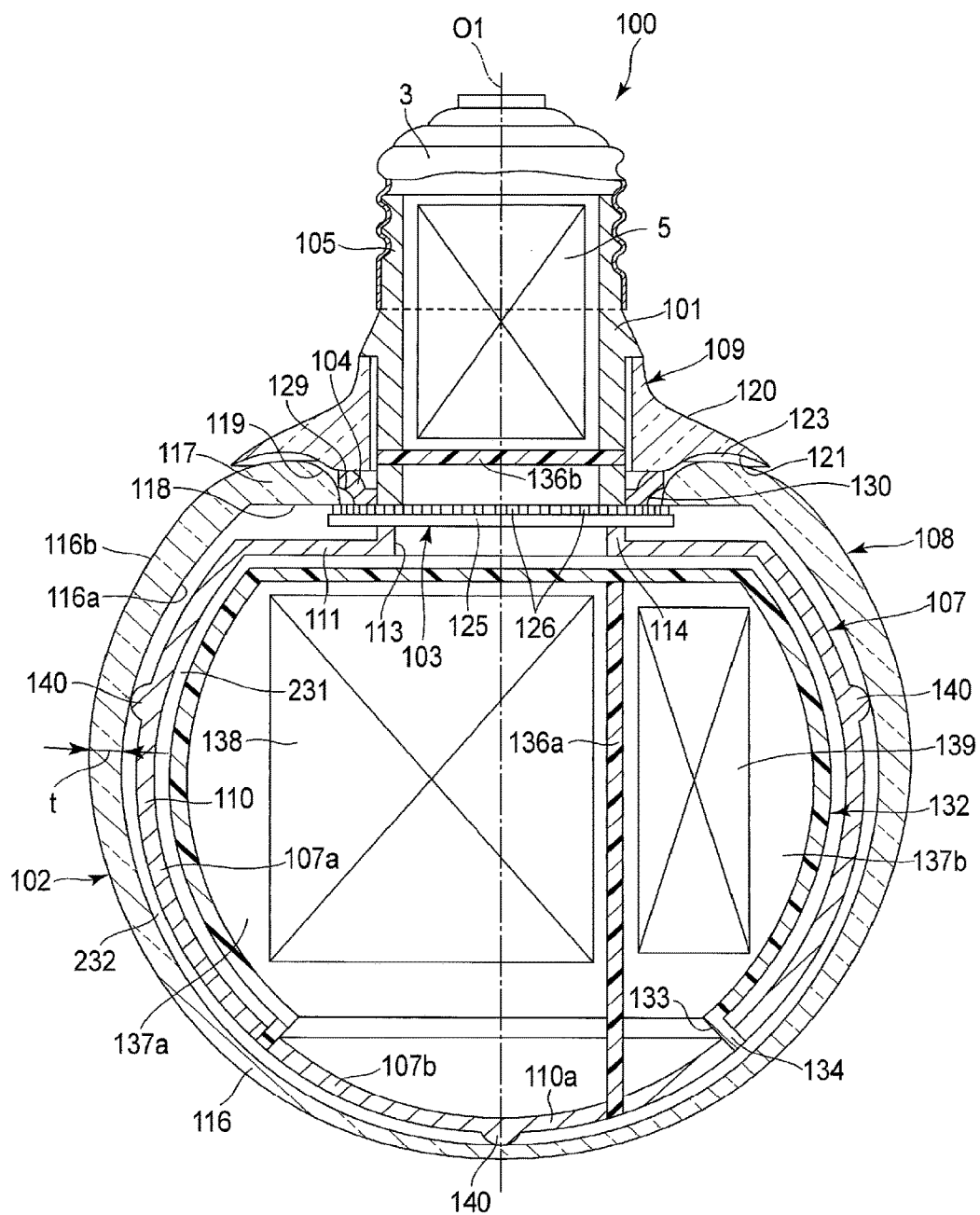
F I G. 24

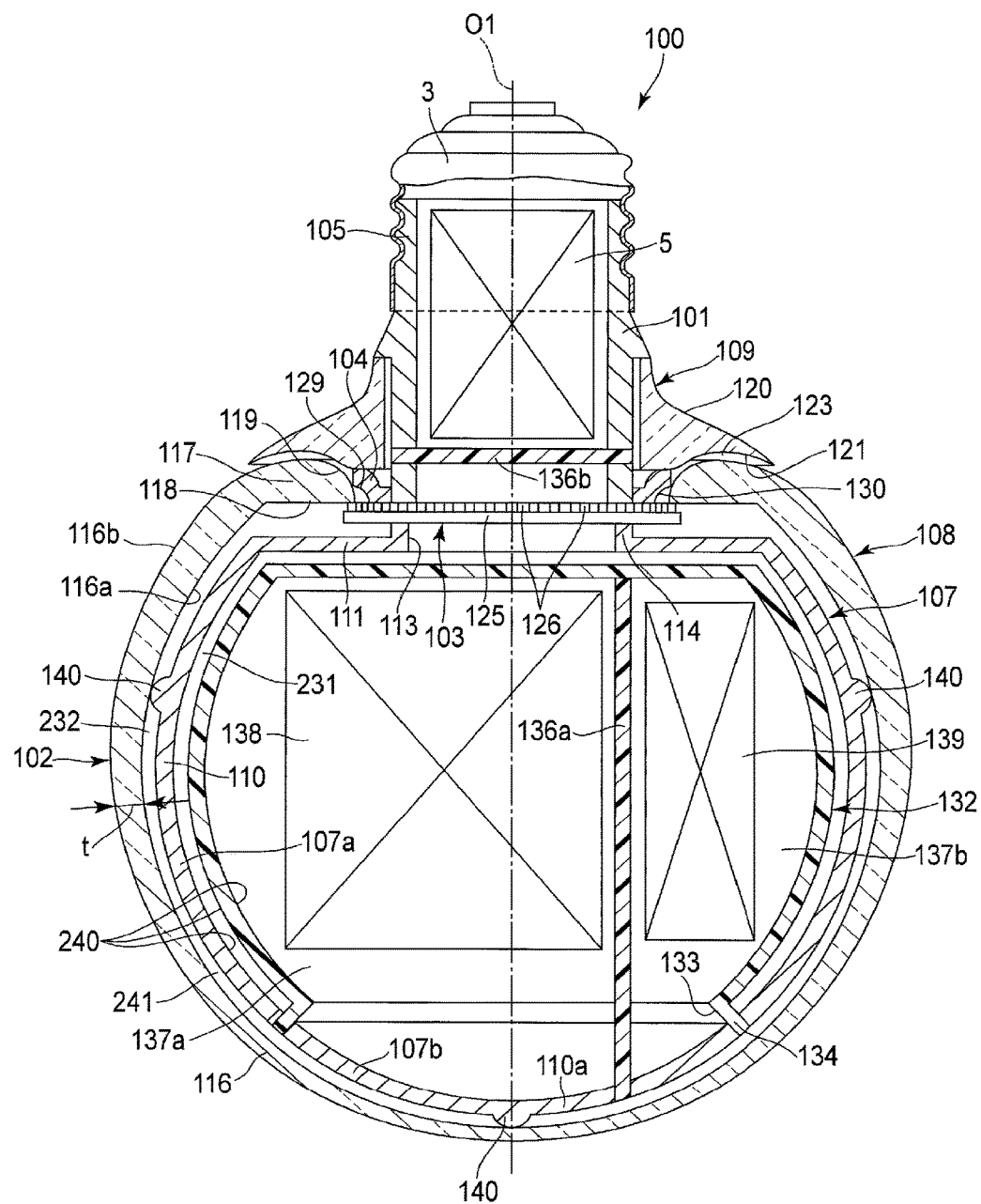
F I G. 25

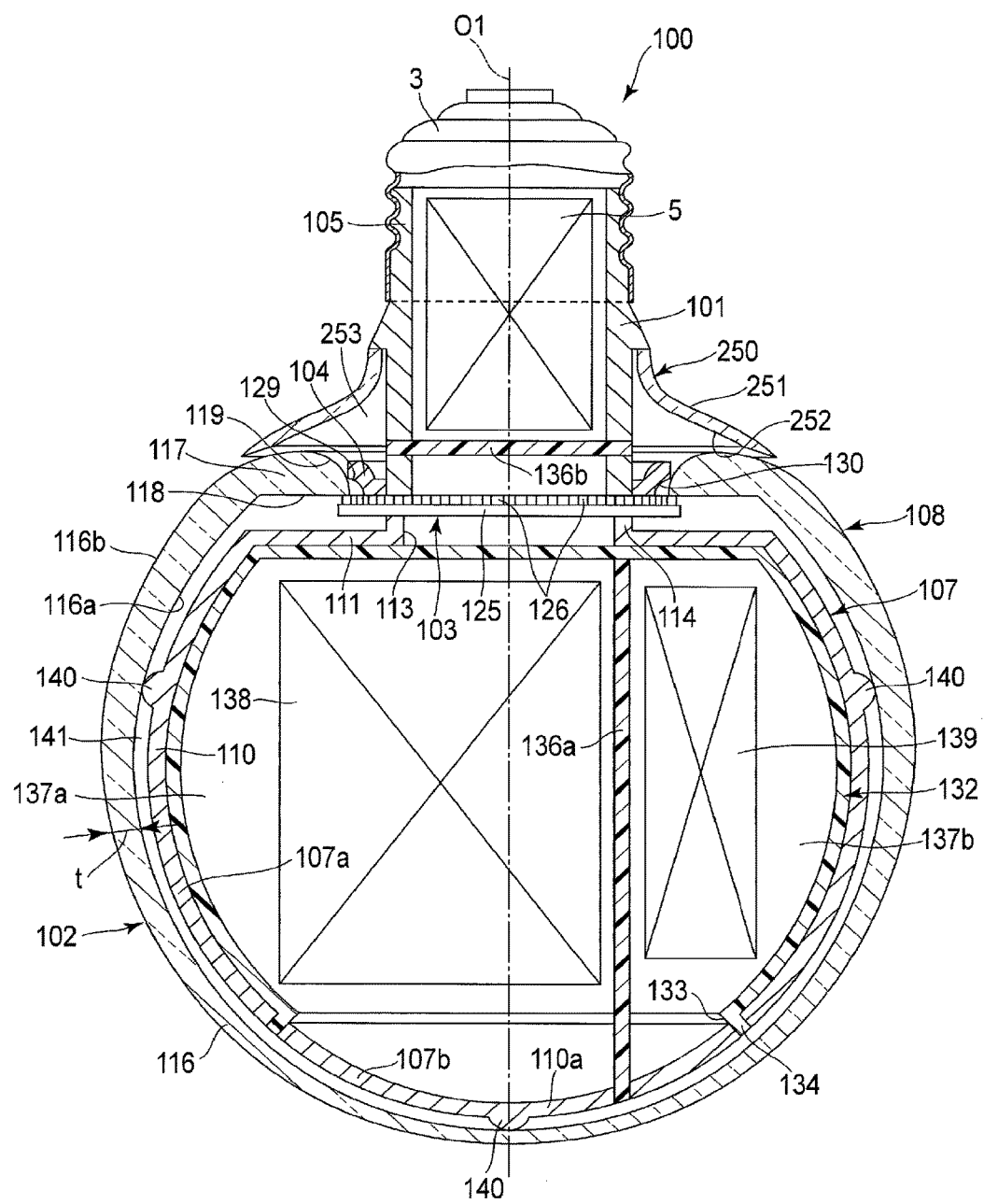
F I G. 26

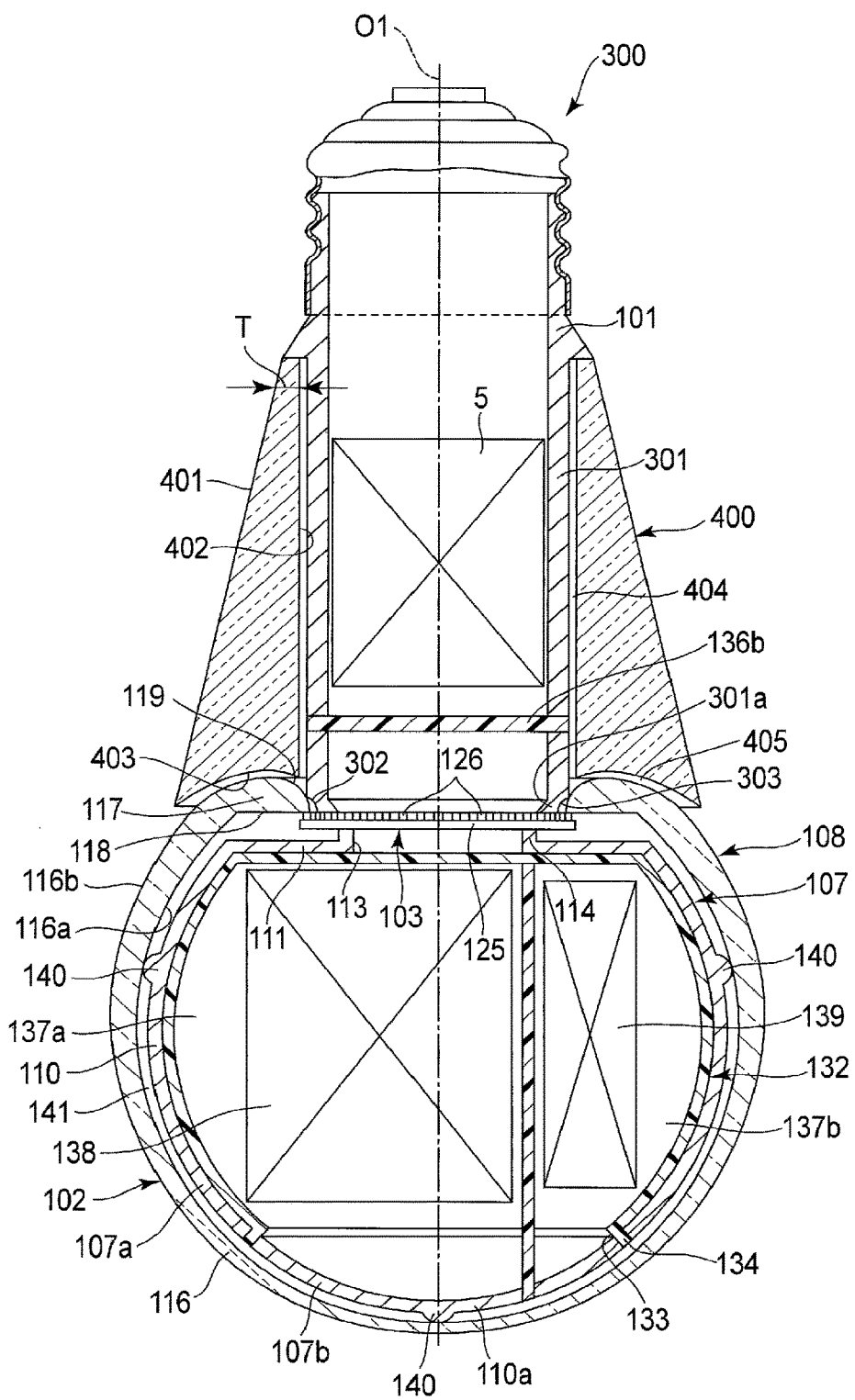
F I G. 28

LIGHTING DEVICE

CROSS-REFERENCE TO RELATED APPLICATIONS

This application is based upon and claims the benefit of priority from Japanese Patent Application No. 2015-021351, filed Feb. 5, 2015, the entire contents of which are incorporated herein by reference.

FIELD

Embodiments described herein relate generally to a lighting device using an LED as a light source.

BACKGROUND

In general, a lighting device using light-emitting diodes (LEDs) comprises a base with LEDs mounted thereon, and a globe covering the LEDs. Light emitted from the LEDs is diffused to the environment through the globe.

In lighting devices using LEDs, there is a demand for realization of a light distribution angle, a total luminous flux, a size, and an appearance during lighting equivalent to those of a lighting device using a common light bulb, a fluorescent light, etc. There is another demand for installing, in a lighting device, additional functions, such as communication and storage, as well as a power supply circuit, such as an AC-DC conversion circuit.

Generally, in lighting devices using LEDs, in order to control the light distribution angle, it is necessary to design the shape and/or the diffusion coefficient of a globe so that the light forwardly emitted from the light emitting surface of the globe will be guided in a desired direction.

Furthermore, in order to increase the total luminous flux, it is necessary, in making the LED emit light, to increase the current. This inevitably increases the amount of heat emitted from the LED or a power supply circuit. Further, if additional functions, such as communication and storage, are used, the components associated therewith produce heat.

To prevent performance degradation of accessories including the power supply circuit, and the LEDs, it is necessary to reduce the thermal resistance of the lighting device and to suppress the temperatures of the LEDs and the accessories less than their respective allowable temperature limits. If the thermal resistance of each part of the lighting device is sufficiently low, the lighting device exhibits substantially uniform temperature, and the thermal resistance between the LEDs and the environment will be substantially minimum.

In this case, since the difference in temperature between the LEDs and the accessories is small, the allowable temperature limit of the lighting device is substantially equal to that of a component that has the lowest allowable temperature limit among the LEDs and the accessories. This makes it difficult to supply high electric power to the LEDs.

Thus, when the allowable temperature limits of the above-mentioned accessories are lower than that of the LEDs, it is difficult to realize high-output LEDs.

It is an object of the invention to provide a lighting device in which sufficient heat dissipation performance of a light source is maintained, while degradation of performance due to the production of heat by the light source and accessories is avoided.

BRIEF DESCRIPTION OF THE DRAWINGS

FIG. 1 is a side view showing an LED lamp of a common bulb shape according to a first embodiment;

FIG. 4 is a cross-sectional view schematically showing the heat dissipation path of the common-bulb-shape LED lamp according to the first embodiment;

FIG. 7 is a cross-sectional view taken along line F7-F7 in FIG. 6;

FIG. 8 is a cross-sectional view showing an LED lamp of a common bulb shape according to a third embodiment;

FIG. 9 is a graph showing the relationship between d/λ and the reflectance assumed in the third embodiment when light with an angle of incidence of 45° is totally internally reflected within the cylinder of a light conductor;

FIG. 11 is a cross-sectional view schematically showing the heat dissipation path of the common-bulb-shape LED lamp according to the fourth embodiment;

FIG. 12 is a cross-sectional view showing an LED lamp of a common bulb shape according to a fifth embodiment;

FIG. 13 is a cross-sectional view showing an LED lamp of a spherical bulb shape according to a sixth embodiment;

FIG. 14 is a cross-sectional view showing paths of light passing through the light-receiving element of a first light conductor in the sixth embodiment;

FIG. 15 is a cross-sectional view showing an LED lamp of a spherical bulb shape according to a seventh embodiment;

FIG. 16 is a cross-sectional view showing an LED lamp of a spherical bulb shape according to an eighth embodiment;

FIG. 17 is a cross-sectional view showing an LED lamp of a spherical bulb shape according to a ninth embodiment;

FIG. 20 is a cross-sectional view showing an LED lamp of a spherical bulb shape according to an eleventh embodiment;

FIG. 21 is a plan view showing the LED lamp as viewed from the direction indicated by arrow F21 in FIG. 20;

FIG. 22 is a plan view showing the LED lamp as viewed from the direction indicated by arrow F22 in FIG. 20;

FIG. 23 is a cross-sectional view showing an LED lamp of a spherical bulb shape according to a twelfth embodiment;

FIG. 24 is a cross-sectional view showing an LED lamp of a spherical bulb shape according to a thirteenth embodiment;

FIG. 25 is a cross-sectional view showing an LED lamp of a spherical bulb shape according to a fourteenth embodiment;

FIG. 26 is a cross-sectional view showing an LED lamp of a spherical bulb shape according to a fifteenth embodiment;

FIG. 28 is a cross-sectional view showing an LED lamp according to a seventeenth embodiment.

DETAILED DESCRIPTION

Various embodiments will be described hereinafter with reference to the accompanying drawings. In general, according to one embodiment, a lighting device comprises a hollow main body having thermal conductivity, a light source having at least one semiconductor light-emitting element, an accessory element, and an adiabatic member. The light source is thermally coupled to the main body. The accessory element has an allowable temperature limit different from that of the light source, and is accommodated in the main body. The adiabatic member divides the main body into a first region thermally coupled to the light source, and at least one second region thermally coupled to the accessory element and thermally isolated from the first region.

First Embodiment

Referring now to FIGS. 1 to 4, a description will be given of a first embodiment.

Figure 2:
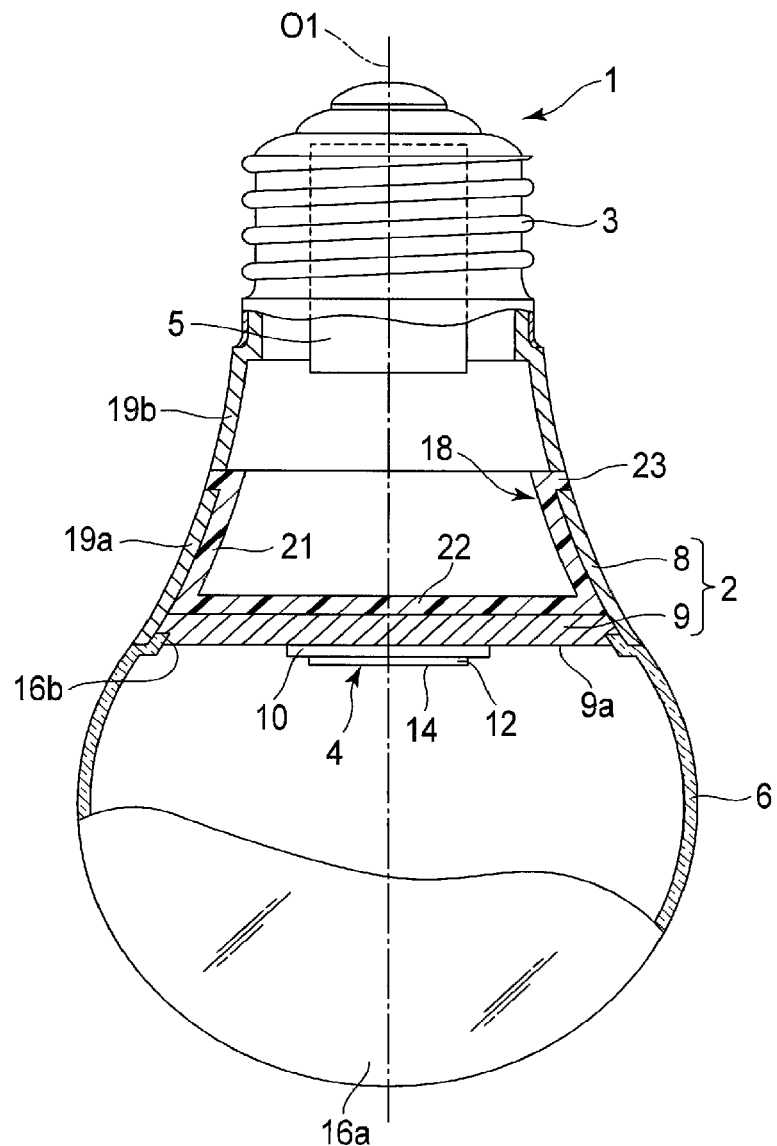
FIG. 2 is a cross-sectional view showing the common-bulb-shape LED lamp according to the first embodiment.

FIGS. 1 and 2 show an LED lamp 1 of a common bulb shape. The LED lamp 1 is an example of a lighting device. It is assumed that the LED lamp 1 of the first embodiment is used, fitted in a socket provided in, for example, the ceiling of a room. The LED lamp 1 has a shape symmetrical with respect to a straight vertical axis O1.

As shown in FIGS. 1 and 2, the LED lamp 1 comprises a main body 2, an E-type base (cap) 3, a Chip On Board (COB) type light-emitting module 4, a power supply circuit 5 and a globe 6, as main elements.

The main body 2 includes a hollow cylindrical shell portion 8 and a light-source support portion 9. The shell portion 8 of the LED lamp 1 has a shape that is symmetrical with response to the axis O1 and is gradually enlarged from the upper end to the lower end thereof along the axis. The shell portion 8 is formed of, for example, a metal, such as aluminum, copper, iron, or of ceramic excellent in thermal conductivity, and functions as a heat dissipation portion.

The light-source support portion 9 closes the lower end of the shell portion 8. The light-source support portion 9 may be formed of a metal material, such as aluminum, copper, iron, a ceramic excellent in thermal conductivity, or a resin excellent in thermal resistance. The light-source support portion 9 has a support face 9a located on the opposite side of the shell portion 8. It is desirable that the support face 9a is formed as, for example, a white-light reflection face.

The base 3 is an element detachably screwed into a socket connected to a commercial alternating-current power supply, and can also be referred to as a power connecter. The base 3 is secured to the upper end of the shell portion 8.

Figure 3:
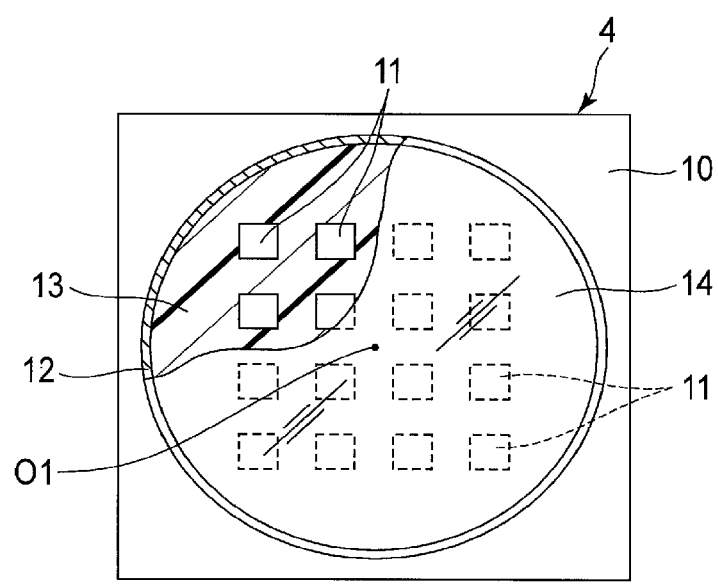
FIG. 3 is a plan view partly in section, showing a COB-type light-emitting module used in the LED lamp of the first embodiment.

The light-emitting module 4 is an element used as a light source for the LED lamp 1, and is located on the central portion of the support face 9a. As shown in FIG. 3, the light-emitting module 4 mainly comprises a substrate 10, a plurality of LEDs 11, a frame 12, and a sealing member 13.

The substrate 10 is secured to the support face 9a of the light-source support portion 9 by means of a screw or connector (not shown). Further, the substrate 10 is thermally coupled to the main body 2 via, for example, a thermal conduction sheet, thermally conductive grease, or a thermally conductive adhesive.

The LEDs 11 are examples of semiconductor elements, and are arranged in, for example, a matrix on the substrate 10. The frame 12 is secured to the substrate 10, surrounding the LEDs 11. The sealing member 13 is formed of a transparent or translucent resin material containing fluorescent particles. The sealing member 13 is filled within the frame 12, covering the LEDs 11.

The light-emitting module 4 emits visible light, such as white light, for example. When, for example, LEDs 11 capable of emitting blue-purple color light with a wavelength of 450 nm is employed, white light is emitted from the surface of the sealing member 13 if the LEDs 11 are covered with a sealing member 13 containing fluorescent particles that absorb blue-purple color light and emit yellow light with a wavelength of about 560 nm.

Accordingly, the surface of the sealing member 13 constitutes a circular light-emitting surface 14 that emits light of wide distribution. The axis O1 of the LED lamp 1 passes through the center of the light-emitting surface 14 or through a portion near the center, and extends perpendicularly with respect to the light-emitting surface 14.

The shape of the light-emitting surface 14 is not limited to a circle, but may be an arbitrary shape, such as a rectangle. There is no limitation on the shape of the light-emitting surface 14. Furthermore, if the light-emitting surface 14 has an annular shape that includes a non-light emission part at the center, the center of the light-emitting surface 14, at which the axis O1 is positioned, is the center of an outside or inner circle that defines the shape of the light-emitting surface 14, and does not exist on the light-emitting surface 14.

The power supply circuit 5 is an example of an accessory contained in the LED lamp 1. The power supply circuit 5 converts, into direct-current voltage, commercial alternating-current voltage applied through the socket of a ceiling, and supplies the resultant voltage to the light-emitting module 4. The power supply circuit 5 produces heat during operation. Various types of circuit elements that constitute the power supply circuit 5 include elements having allowable temperature limits lower than that of the LEDs 11. The allowable temperature limit of a circuit element refers not only to the thermal resistance of the element, but also to a desired temperature determined in consideration of the life, efficiency, etc., of the element.

In the first embodiment, the power supply circuit 5 is accommodated inside one end (upper end) portion of the shell portion 8, and is surrounded by the base 3. Further, the power supply circuit 5 is thermally coupled to the base 3 and the shell portion 8 through a filler (not shown), such as silicone, or through a metal, ceramic or plastic member.

The globe 6 is formed of, for example, a resin or glass that passes light. The globe 6 comprises a spherical head portion 16a and an upper opening 16b. The opening 16b of the globe 6 is coaxially connected to the other end (lower end) of the shell portion 8 of the main body 2, covering the support face 9a of the light-source support portion 9 and the light-emitting module 4. In the first embodiment, the main body 2 having the base 3 and the globe 6 cooperate with each other to form an outer shape similar to a common light bulb.

As shown in FIGS. 1 and 2, the shell portion 8 of the main body 2 is divided into a first shell element 19a and a second shell element 19b by an adiabatic member 18. The first shell element 19a and the second shell element 19b are located along the axis of the shell portion 8.

The first shell element 19a is an example of a first region. The first shell element 19a has a cylindrical shape and is mechanically joined and thermally coupled to the light-source support portion 9. The second shell element 19b is an example of a second region. The second shell element 19b has a cylindrical shape and is joined to the base 3. The second shell element 19b cooperates with the base 3 to surround the power supply circuit 5.

It is desirable to form the adiabatic member 18 of a resin having a high allowable temperature limit, such as, in particular, PC, PEEK and ABS.

Furthermore, the adiabatic member 18 may be formed of stainless steel, iron, or a resin having the above-mentioned allowable temperature limit, and may, at the same time, be provided with a plurality of holes or a plurality of convex and concave portions, or a cavity. In this structure, the spaces defined by the concave and convex portions or the cavity increases the thermal resistance of the adiabatic member 18, compared to the case where the adiabatic member 18 is formed only of a metal or resin.

In addition, if the adiabatic member 18 is in contact with other members, these other members may have unevenness to thereby define spaces between them and the adiabatic member 18. In this case, the same effect as in the case where the adiabatic member 18 has unevenness can be acquired.

If the adiabatic member 18 opposes the above-mentioned members, a spacer as yet another member formed of, for example, a metal, a resin, a sheet or tape may be interposed between the adiabatic member 18 and those members, in order to keep a space therebetween. This structure provides the same advantage as in the case where the adiabatic member 18 and/or other members have unevenness.

The overall or inner surface of the adiabatic member 18 and the surfaces of the members opposing the adiabatic member 18 may be formed as glossy surfaces by polishing, coating, metal deposition, etc. This suppresses thermal radiation of the adiabatic member 18 and other members, and increases the thermal resistance of the adiabatic member 18.

The space defined between the adiabatic member 18 and other members and the space inside the adiabatic member 18 may be decompressed, or may be filled with a gas having low thermal conductivity, such as argon. This increases the thermal resistance of the spaces.

Furthermore, the adiabatic member 18 may be formed of a fiber-based adiabatic material, such as glass wool, rock wool, cellulose fiber, carbonized cork, adiabatic wool material, or a foam insulation material, such as urethane foam, phenolic foam and polystyrene form, other adiabatic materials, such as aerogel, brick, concrete, or an epoxy-based heat-resistant adhesive, or a high heat-resistant paint. In addition, the adiabatic member 18 may be formed of a combination of various adiabatic materials mentioned above. Thus, there are no particular limitations on the material of the adiabatic member 18.

As shown in FIG. 2, the adiabatic member 18 comprises a first wall 21 formed cylindrical and covering the inner peripheral surface of the first shell element 19a, and a second wall 22 formed like a disk and covering the inner surface of the light-source support portion 9. The second wall 22 is interposed between the light-emitting module 4 and the power supply circuit 5 inside the shell portion 8, thereby thermally isolating the light-emitting module 4 and the power supply circuit 5.

Furthermore, the first wall 21 has a flange 23 at an edge thereof away from the second wall 22. The flange 23 continuously extends along the periphery of the shell portion 8, and is interposed between the first and second shell elements 19a and 19b.

Thus, the flange 23 of the adiabatic member 18 thermally isolates the first and second shell elements 19a and 19b. As a result, transfer of heat between the first and second shell elements 19a and 19b is suppressed.

In the first embodiment, the adiabatic member 18 is formed as one body. However, the first and second walls 21 and 22 and flange 23 may be separate members. In this case, the elements may be secured to the main body 2 or to each other, using an engagement mechanism, such as screws, adhesives, or tape.

Furthermore, in FIG. 2, the first wall 21 extends along the shape of the shell portion 8, and the second wall 22 extends along the shape of the light-source support portion 9. However, there are no limitations in the shapes of the first and second walls 21 and 22. That is, the first and second walls 21 and 22 can be modified freely in accordance with, for example, the shapes of elements contained in the main body 2.

In addition, the first wall 21 may be formed completely cylindrical along the axis O1 of the LED lamp 1, and the second wall 22 may be separated from the light-source support portion 9. This structure enables the adiabatic member 18 to be easily incorporated into the main body 2. This can also reduce the processing accuracy of the adiabatic member 18, and hence can reduce the manufacturing cost of the same.

Moreover, since the structure causes a space to be defined between the adiabatic member 18 and the main body 2, adiabatic efficiency is further enhanced. If the surface of the adiabatic member 18 and the inner surface of the main body 2, which define the space, are formed as glossy surfaces by polishing, painting, metal deposition, etc., thermal radiation of the surfaces is suppressed, thereby further enhancing adiabatic performance.

The above-mentioned space may be decompressed, or a gas having a low thermal conductivity, such as argon, may be filled in the space. This increases the thermal resistance of the space, thereby further enhancing the adiabatic performance.

Furthermore, when elements accommodated in the area surrounded by the adiabatic member 18 need supply of power supply or liquid, a hole for introducing a wire or a pipe is formed in the adiabatic member 18. If a gap occurs between the hole and the wire/pipe, it may be filled with, for example, an adhesive. This suppresses reduction of adiabatic performance due to the hole formed in the adiabatic member 18.

When direct-current voltage is applied to the light-emitting module 4 by the power supply circuit 5, a plurality of the LEDs 11 emit light simultaneously, whereby the light-emitting surface 14 emits light of wide distribution. The light emitted from the light-emitting surface 14 enters the inner surface of the globe 6. The light having entered the globe 6 is diffused by a diffusion material contained in the globe 6, and is also transmitted through the globe 6 to the surroundings of the LED lamp 1. As a result, light is emitted broadly from the surface of the globe 6, whereby the LED lamp 1 functions as a lighting device of wide light distribution.

When the LED lamp 1 is turned on, the LEDs 11, fluorescent substance particles and the power supply circuit 5 of the light-emitting module 4 produce heat. The heat produced by the light-emitting module 4 is uniformly transmitted from the substrate 10 to the light-source support portion 9. The heat reaching the light-source support portion 9 is uniformly transmitted therefrom to the first shell element 19a of the shell portion 8, and is then emitted from the surface of the first shell element 19a to the outside.

On the other hand, the heat produced by the power supply circuit 5 is uniformly transmitted via the filling agent to the second shell element 19b of the shell portion 8, and is then emitted from the surface of the second shell element 19b to the outside. Furthermore, part of the heat produced by the power supply circuit 5 is also transmitted to the base 3, and is emitted from the base 3 to the outside of the LED lamp 1 through the socket.

In the LED lamp 1 of the first embodiment, the first shell element 19a to which heat of the light-emitting module 4 is transmitted is thermally isolated by the adiabatic member 18 from the second shell element 19b to which heat of the power supply circuit 5 is transmitted. In other words, transmission of heat between the first and second shell elements 19a and 19b is suppressed.

As a result, the heat of the light-emitting module 4 is mainly emitted from the surface of the first shell element 19a to the outside of the lamp. Similarly, the heat of the power supply circuit 5 is mainly emitted from the second shell element 19b to the outside of the lamp, and also emitted from the base 3 to the outside of the lamp through the socket.

By virtue of the above structure, adverse influence of the heat produced by the light-emitting module 4 upon the power supply circuit 5 having a lower allowable temperature limit than the LEDs 11 can be avoided. Therefore, the temperatures of the power supply circuit 5 and the light-emitting module 4 can be made to fall within their respective allowable limits, by appropriately dissipating the heat of the power supply circuit 5 and the light-emitting module 4 to the outside of the lamp through the surface of the shell portion 8.

Accordingly, the heat of the light-emitting module 4 can be positively transmitted to the first shell element 19a, which enables the total luminous flux of the LED lamp 1 to increase, using LEDs 11 of a higher output.

A description will now be given of preferable heat dissipation areas of the first and second shell elements 19a and 19b of the shell portion 8, assumed when the first and second shell elements 19a and 19b are completely thermally insulated by the adiabatic member 18.

Assuming that the entire surface area of the shell portion 8 of the main body 2 is $A_{all}$, the surface area of the first shell element 19a thermally coupled to the light-emitting module 4 is $A_1$, the surface area of the second shell element 19b thermally coupled to the power supply circuit 5 is $A_2$, surface areas $A_{all}$, $A_1$ and $A_2$ satisfy the following equation:

$$A_{all}=A_1+A_2 \quad (1)$$

Further, assuming that the surface area of the first shell element 19a which causes allowable temperature limit increase $\Delta T_{1max}$ in the light-emitting module 4 is $A_{1min}$, surface area $A_1$ of the first shell element 19a satisfies expression 2, below. Similarly, assuming that the surface area of the second shell element 19b which causes allowable temperature limit increase $\Delta T_{2max}$ in the power supply circuit 5 is $A_{2min}$, surface area $A_2$ of the second shell element 19b satisfies expression 3, below.

$$A_1 \geq A_{1min} \quad (2)$$

$$A_2 \geq A_{2min} \quad (3)$$

Furthermore, surface area $A_{all}$ satisfies the following relationship:

$$A_{all} \neq A_{1min}+A_{2min} \quad (4)$$

If inequation (2) is applied to equation (1), the following relationship is established:

$$A_1 \leq A_{all}-A_{2min} \quad (5)$$

Similarly, if inequation (3) is applied to equation (1), the following relationship is established:

$$A_2 \leq A_{all}-A_{1min} \quad (6)$$

If inequations (2) and (5) are combined, the following relationship is established:

$$A_{1min} \leq A_1 \leq A_{all}-A_{2min} \quad (7)$$

Similarly, if inequations (3) and (6) are combined, the following relationship is established:

$$A_{2min} \leq A_2 \leq A_{all}-A_{1min} \quad (8)$$

For instance, if only a temperature reduction in the light-emitting module 4 contributes to enhancement of the short-term performance, such as emission efficiency, of the LED lamp 1, or the long-term performance, such as life duration, of the same, it is optimal to define surface area $A_1$ of the first shell element 19a as follows:

$$A_1=A_{all}-A_{2min} \quad (9)$$

Similarly, it is optimal to define surface area $A_2$ of the second shell element 19b as follows:

$$A_2=A_{all}-A_1 \quad (10)$$

Assuming here that the thermal resistance between the light-emitting module 4 and the environment is $R_1(A_1)$, an allowable temperature limit increase in the junction of the light-emitting module 4 is $\Delta T_{1max}$, the thermal resistance between the power supply circuit 5 and the environment is $R_2(A_2)$, the quantity of heat produced by the power supply circuit 5 is $Q_2$, and an allowable temperature limit increase in the power supply circuit 5 is $\Delta T_{2max}$, $A_{1min}$ and $A_{2min}$ description above satisfy the following equations, respectively:

$$\Delta T_{1max}=R_1(A_{1min})Q_1 \quad (11)$$

$$\Delta T_{2max}=R_2(A_{2min})Q_2 \quad (12)$$

FIG. 4 schematically shows the heat dissipation paths of the LED lamp 1. Assuming as shown in FIG. 4 that the thermal resistance between the junction of the light-emitting module 4 and the first shell element 19a of the shell portion 8 is $R_{1ci}$, the thermal resistance between the first shell element 19a and the environment is $R_{1co}$, the thermal resistance between the power supply circuit 5 and the second shell element 19b of the shell portion 8 is $R_{2ci}$, the thermal resistance between the second shell element 19b and the environment is $R_{2co}$, the thermal resistance between the power supply circuit 5 and the base 3 is $R_{2si}$, and the thermal resistance between the base 3 and the environment is $R_{2so}$, $R_1(A_1)$ including $A_1$ and $R_2(A_2)$ including $A_2$ satisfy the following equations, respectively:

$$R_1(A_1) = R_{1ci} + R_{1co} \quad (13)$$

$$R_2(A_2) = \frac{(R_{2ci} + R_{2co})(R_{2si} + R_{2so})}{(R_{2ci} + R_{2co}) + (R_{2si} + R_{2so})} \quad (14)$$

A consideration will now be given to thermal resistance $R_{1co}$ between the first shell element 19a of the shell portion 8 and the environment. Assuming that the thermal resistance due to convection is $R_{1coc}(A_1)$, and that the thermal resistance due to radiation is $R_{1cor}(A_1)$, thermal resistance $R_{1co}(A_1)$ including $A_1$ satisfies the following equation:

$$R_{1co}(A_1) = \frac{R_{1coc}(A_1)R_{1cor}(A_1)}{R_{1coc}(A_1) + R_{1cor}(A_1)} \quad (15)$$

Thermal resistance $R_{2co}$ between the second shell element 19*b* of the shell portion 8 and the environment can also be expressed by an equation similar to equation (15), using thermal resistance $R_{2coc}(A_2)$ due to convection and thermal resistance $R_{2cor}(A_2)$ due to radiation.

First, a consideration will be given to $R_{1coc}(A_1)$ due to convection. Assuming that the thermal transfer coefficient from the first shell element 19a of the shell portion 8 to the environment is $h_1$, thermal resistance $R_{1coc}(A_1)$ due to convection satisfies the following equation:

$$R_{1coc}(A_1) = \frac{1}{h_1 A_1} \quad (16)$$

Furthermore, if thermal transfer coefficient $h_1$ is equivalent to natural convection along a vertical isothermal plate, it is given by the following equation:

$$h_1 = \frac{k_1}{d_1} Nu_1 \quad (17)$$

where $d_1$ is the vertical length of the first shell element 19a of the shell portion 8, $k_1$ is the thermal transfer coefficient of ambient gas, and $Nu_1$ is a Nusselt number.

It is known that assuming that $R_{a1}$ is a Rayleigh number, Nusselt number $Nu_1$ satisfies a relationship given by the following equation:

$$Nu_1 = 0.59 Ra_1^{1/4} \quad (18)$$

Assuming that the average temperature of the shell portion 8 is $T_{1c}$, the temperature of the environment is $T_a$, the gravitational acceleration is g, the volume elasticity of gas is $\beta_1$, the kinematic viscosity of gas is $\nu_1$, and the thermometric conductivity of gas is $\alpha_1$, Rayleigh number $R_{a1}$ of gas is given by the following equation:

$$Ra_1 = \frac{g \beta_1 (T_{1c} - T_a) d_1^3}{\nu_1 \alpha_1} \quad (19)$$

Thermal resistance $R_{2coc}(A_2)$ due to convection can be obtained by equations similar to the above. Equations (17) to (19) associated with convection can also be applied to an arbitrary model associated with convection, in addition to natural convection along a vertical isothermal plate.

A consideration will be given to thermal resistance $R_{1cor}$ ($r_i$) due to the above-mentioned radiation.

If the area of a surface surrounding a convex surface is sufficiently large relative to the convex surface, the relationship given by the following equation is known in association with radiation between the convex surface and the surface surrounding the same:

$$R_{1cor}(A_1) = \frac{1}{A_1 \varepsilon_1 \sigma (T_{1c} + T_a)(T_{1c}^2 + T_a^2)} \quad (20)$$

where $A_1$ is the area of the first shell element 19a of the shell portion 8, $T_{1c}$ is the temperature of the same, $\varepsilon_1$ is the emissivity of the same, $T_a$ is the temperature of the environment, and $\sigma$ is a Stefan-Boltzmann constant.

Thermal resistance $R_{2cor}(A_2)$ due to radiation can be obtained by an equation similar to the above. Equation (20) is also applicable to an arbitrary model associated with radiation, as well as radiation between a convex surface and a surface surrounding the same.

A description will then be given of the preferable heat dissipation area of each component part in a case where the number of component parts is generalized.

Assuming that the entire surface area of the shell portion of an LED lamp is $A_{all}$, the surface area of an $i^{th}$ shell element thermally coupled to an $i^{th}$ heat producer is $A_1$, the total number of heat producers is n, entire surface area $A_{all}$ satisfies the following equation:

$$A_{all} = \sum_{i=1}^{n} A_i \quad (21)$$

Assuming that the surface area of the $i^{th}$ shell element that causes an increase $\Delta T_{imax}$ in the allowable temperature limit of the $i^{th}$ heat producer is $A_{imin}$, $A_i$ satisfies the following relationship:

$$A_i \geq A_{imin} \quad (22)$$

Furthermore, surface area $A_{all}$ satisfies the following relationship:

$$A_{all} \geq \sum_{i=1}^{n} A_{i\,min} \quad (23)$$

If expression 22 is applied to expression 21, the following relationship is established:

$$A_i \leq A_{all} - \sum_{\substack{j=1 \\ j \neq i}}^{n} A_{j\,min} \quad (24)$$

If expressions 22 and 24 are combined, the following relationship is established:

$$A_{i\,min} \leq A_i \leq A_{all} - \sum_{\substack{j=1 \\ j \neq i}}^{n} A_{j\,min} \quad (25)$$

If only a temperature reduction in the $i^{th}$ heat producer contributes to enhancement of the short-term performance, such as emission efficiency, of the LED lamp, or the long-term performance, such as life duration, of the same, it is optimal to define surface area $A_i$ of the $i^{th}$ shell element as follows:

$$A_i = A_{all} - \sum_{\substack{j=1 \\ j \neq i}}^{n} A_{j\,min} \quad (26)$$

Assuming that the thermal resistance between the $i^{th}$ heat producer and the environment is $R_i(A_i)$, the quantity of heat (i.e., calorific value) produced by the $i^{th}$ heat producer is $Q_i$, and an allowable temperature limit increase in the junction of the $i^{th}$ heat producer is $\Delta T_{imax}$, $A_{imin}$ satisfies the following equation:

$$\Delta T_{imax} = R_i(A_{imin}) Q_i \quad (27)$$

Further, assuming that the thermal resistance between the $i^{th}$ heat producer and the $i^{th}$ shell element is $R_{ici}$, and the thermal resistance between the $i^{th}$ shell element and the environment is $R_{ico}$, $R_i(A_i)$ including $A_i$ satisfies the following equation:

$$R_i(A_i) = R_{ici} + R_{ico} \quad (28)$$

If a cap is included in the heat dissipation path of the $i^{th}$ heat producer, $R_i(A_i)$ including $A_i$ satisfies the following equation:

$$R_i(A_i) = \frac{(R_{ici} + R_{ico})(R_{isi} + R_{iso})}{(R_{ici} + R_{ico}) + (R_{isi} + R_{iso})} \quad (29)$$

where $R_{isi}$ is the thermal resistance between the $i^{th}$ heat producer and the cap, and $R_{iso}$ is the thermal resistance between the $i^{th}$ shell element and the cap.

A consideration will be given to thermal resistance $R_{ico}$ between the $i^{th}$ shell element of the shell portion and the environment. Assuming that the thermal resistance due to convection is $R_{icoc}(A_i)$, and the thermal resistance due to radiation is $R_{icor}(A_i)$, thermal resistance $R_{ico}(A_i)$ including $A_i$ satisfies the following equation:

$$R_{ico}(A_i) = \frac{R_{icoc}(A_i) R_{icor}(A_i)}{R_{icoc}(A_i) + R_{icor}(A_i)} \quad (30)$$

When the $i^{th}$ heat producer comprises m small heat producers $Q_j$, more specifically, when, for example, a light-emitting module comprises a plurality of LEDs, when a circuit board comprises a plurality of elements, or when a rechargeable battery module comprises a plurality of rechargeable batteries, calorific value Qi satisfies the following equation:

$$Q_i = \sum_{j=1}^{m} Q_j \quad (31)$$

It is desirable that the small heat producers $Q_j$ surrounded by an adiabatic member should have the same allowable temperature limit.

In light of the above, the first shell element 19a thermally coupled to the light-emitting module 4, and the second shell element 19b thermally coupled to the power supply circuit 5, can be made to have appropriate surface areas as respective heat dissipation areas corresponding to the calorific values and allowable temperature limits of the light-emitting module 4 and the power supply circuit 5. This enables the LED lamp 1 to be enhanced in total luminous flux, using higher-output LEDs 11.

In the first embodiment, the peripheral surface of the flange 23 of the adiabatic member 18 is exposed to the outside of the shell portion 8 through between the first and second shell elements 19a and 19b.

Therefore, the peripheral surface of the flange 23 and the surface of the shell portion 8 may be coated with painting, or may be covered with a decoration sheet. This further enhances the appearance and hence the commercial value of the LED lamp 1.

Although the first embodiment employs a COB-type light-emitting module, it may use a surface-mount-device (SMD) type light-emitting module, a shell shaped light-emitting module, etc.

In addition, the number of light-emitting modules is not limited to one, but a plurality of light-emitting modules may be employed. Similarly, the arrangement and number of the LEDs are not limited to those of the first embodiment. For instance, only one LED may be located on the axis of the LED lamp.

The LED lamp is not limited to a common bulb shape. It may have a shape similar to, for example, a mini krypton bulb shape, a T shape, a spherical shape, a halogen bulb shape, a midget reflex shape, a beam lamp shape, a chokeless mercury lamp shape, an HID shape, a unit flat shape, a downlight shape, a night-light shape, a direct-pipe shape, a ceiling shape, a chandelier globe shape, a spotlight shape, etc.

Second Embodiment

Figure 5:
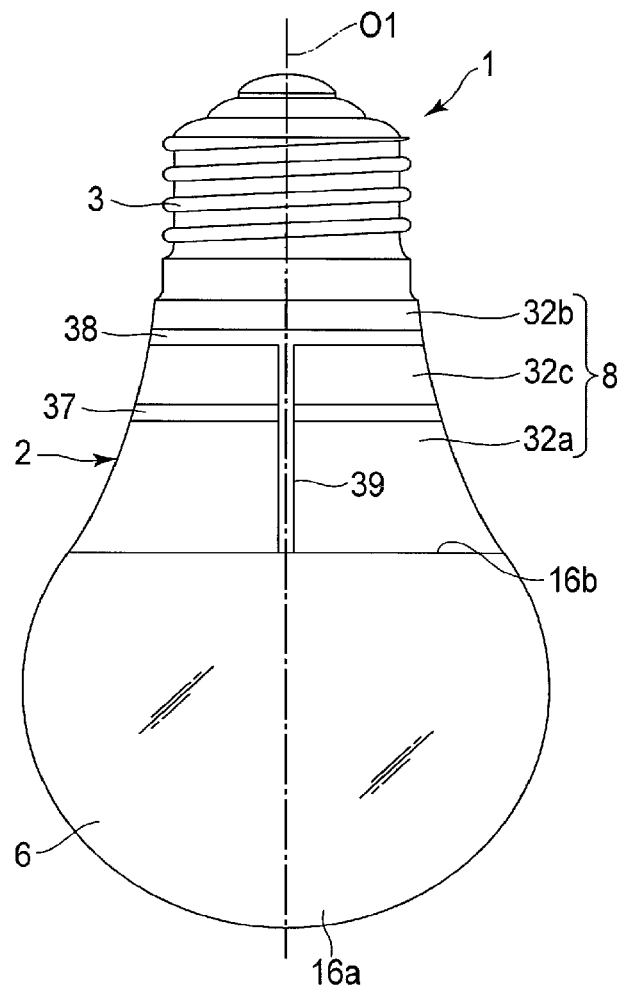
FIG. 5 is a side view showing an LED lamp of a common bulb shape according to a second embodiment.
Figure 6:
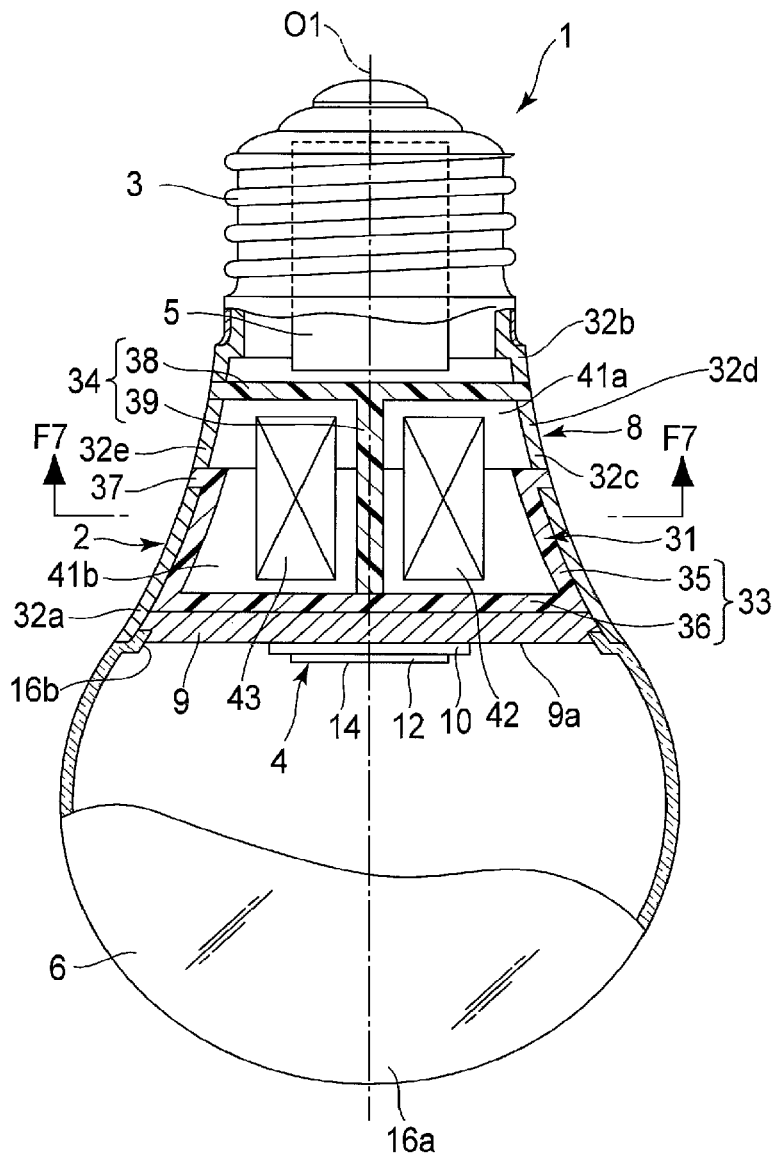
FIG. 6 is a cross-sectional view showing the common-bulb-shape LED lamp according to the second embodiment.

FIGS. 5 to 7 show a second embodiment. An LED lamp 1 according to the second embodiment differs from the first embodiment in that in the former, the shell portion 8 of the main body 2 is thermally divided into three elements. The other structures of the LED lamp 1 of the second embodiment are similar to those of the first embodiment. In the second embodiment, elements similar to those of the first embodiment are denoted by corresponding reference numbers, and no detailed description will be given thereof.

As shown in FIGS. 5 and 6, the shell portion 8 of the main body 2 is divided by an adiabatic member 31 into three portions, i.e., first to third shell elements 32a to 32c. The first to third shell elements 32a to 32c are arranged along the axis of the shell portion 8.

The first shell element 32a is an example of the first region. The first shell element 32a is formed cylindrical, continuously extended from the light-source support portion 9, and thermally coupled to the same. The second shell element 32b is an example of the second region. The second shell element 32b is formed cylindrical and continuously extended from the base 3. The second shell element 32b surrounds the power supply circuit 5, along with the base 3. The third shell element 32c is an example of the third area. The third shell element 32c is coaxially interposed between the first and second shell elements 32a and 32b.

The adiabatic member 31 is formed of the same material as in the first embodiment. As shown in FIG. 6, the adiabatic member 31 comprises a first adiabatic element 33 and a second adiabatic element 34. The first adiabatic element 33 comprises a first wall 35 of a cylindrical shape covering the inner peripheral surface of the first shell element 32a, and a second wall 36 of a disk shape covering the inner surface of the light-source support portion 9.

Further, the first wall 35 has a flange 37 at an edge thereof away from the second wall 36. The flange 37 continuously extends along the periphery of shell portion 8 between the first shell element 32a and the third shell element 32c.

Thus, the first and third shell elements 32a and 32c are thermally isolated from each other by the flange 37 of the adiabatic member 31. Thereby, transfer of heat between the first and third shell elements 32a and 32c is suppressed.

The second adiabatic element 34 includes a first partition wall 38 and a second partition wall 39. The first partition wall 38 is disc-shaped, and its outer peripheral edge is interposed between the second and third shell elements 32b and 32c. Thus, second and third shell elements 32b and 32c are thermally isolated from each other by the outer peripheral edge of the first partition wall 38. As a result, transfer of heat between the second and third shell elements 32b and 32c is suppressed. Further, the first partition wall 38 faces the second wall 36 of the first adiabatic element 33 within the shell portion 8.

The second partition wall 39 projects from the central portion of the first partition wall 38, and extends to the second wall 36 of the first adiabatic element 33. As shown in FIGS. 6 and 7, the projection end of the second partition wall 39 is in contact with the inner surface of the second wall 36 of the first adiabatic element 33. Further, the side edges of the second partition wall 39 is extended through the first wall 35 of the first adiabatic element 33, the first shell element 32a and the third shell element 32c, and exposed to the outside of the shell portion 8.

Thus, the second partition wall 39 thermally partitions an area, which is surrounded by the first and third shell elements 32a and 32c of the shell portion 8, into two chambers, i.e., a first chamber 41a and a second chamber 41b. The first and second chambers 41a and 41b are surrounded by the first and second adiabatic elements 33 and 34, respectively, and the inner surface of the third shell element 32c of the shell portion 8 is exposed to the first second chambers 41a and 41b.

In the second embodiment, the side edges of the second partition wall 39 are extended through the third shell element 32c, thereby thermally partitioning the third shell element 32c into a first peripheral wall portion 32d and a second peripheral wall portion 32e. The first peripheral wall portion 32d is exposed to the first chamber 41a, while the second peripheral wall portion 32e is exposed to the second chamber 41b.

In other words, the first peripheral wall portion 32d exposed to the first chamber 41a and the second peripheral wall portion 32e exposed to the second chamber 41b are kept thermally isolated from each other.

A rechargeable battery 42 is accommodated in the first chamber 41a. The rechargeable battery 42 is an example of an accessory article. The rechargeable battery 42 is electrically connected to the power supply circuit 5 and the light-emitting module 4. The rechargeable battery 42 produces heat when it is charged and discharged. The rechargeable battery 42 is thermally coupled to the first peripheral wall portion 32d of the third shell element 32c through, for example, as a silicone filling member, a metal member, a ceramic member or a plastic member.

A charge/discharge circuit 43 is accommodated in the second chamber 41b. The charge/discharge circuit 43 is an example of an element having an additional function. The charge/discharge circuit 43 is electrically connected to the rechargeable battery 42. The charge/discharge circuit 43 comprises a plurality of circuit elements mounted on a printed circuit board. Some of the circuit elements produce heat during operation. The charge/discharge circuit 43 is thermally coupled to the second peripheral wall portion 32e of the third shell element 32c through, for example, a silicone filling member, a metal member, a ceramic member or a plastic member.

In the second embodiment, the rechargeable battery 42 and the charge/discharge circuit 43 have different allowable temperature limits. Furthermore, the LEDs 11 have an allowable temperature limit different from those of the rechargeable battery 42 and the charge/discharge circuit 43. Specifically, the allowable temperature limits of the rechargeable battery 42 and charge/discharge circuit 43 are lower than that of the LEDs 11.

In the LED lamp 1 of the second embodiment, the heat produced by the light-emitting module 4 is uniformly transmitted to the first shell element 32a of the shell portion 8 through the light-source support portion 9, and is dissipated to the environment through the surface of the first shell element 32a.

The heat produced by the power supply circuit 5 is mainly uniformly transmitted to the second shell element 32b of the shell portion 8 through a filler, and is dissipated to the environment through the surface of the second shell element 32b. Further, part of the heat produced by the power supply circuit 5 is transmitted to the base 3, and is dissipated from the base 3 to the outside of the LED lamp 1 through a socket.

The first shell element 32a, to which the heat of the light-emitting module 4 is transmitted, and the second shell element 32b, to which the heat of the power supply circuit 5 is transmitted, are thermally isolated from each other by the adiabatic member 31, thereby suppressing transfer of heat between the first and second shell elements 32a and 32b. As a result, the heat of the light-emitting module 4 is dissipated to the environment mainly through the surface of the first shell element 32a. Similarly, the heat of the power supply circuit 5 is dissipated to the outside of the LED lamp 1 from the base 3 through the above-mentioned socket.

As described above, adverse influence of the heat, produced by the light-emitting module 4, on the power supply circuit 5 having an allowable temperature limit different from that of the light-emitting module 4 can be avoided as in the first embodiment. Therefore, the temperatures of the power supply circuit 5 and the light-emitting module 4 can be made to fall within their respective allowable temperature limits, by appropriately dissipating, to the environment through the surface of the shell portion 8, the heat produced by the power supply circuit 5 and the light-emitting module 4.

In addition, the first chamber 41a accommodating the rechargeable battery 42 is thermally isolated from the light-emitting module 4 by the second wall 36 of the first adiabatic element 33, and is also thermally isolated from the power supply circuit 5 by the first partition wall 38 of the second adiabatic element 34.

Similarly, the second chamber 41b accommodating the charge/discharge circuit 43 is thermally isolated from the light-emitting module 4 by the second wall 36 of the first adiabatic element 33, and is also thermally isolated from the power supply circuit 5 by the first partition wall 38 of the second adiabatic element 34.

Also, the first chamber 41a accommodating the rechargeable battery 42 is thermally isolated from the second chamber 41b accommodating the charge/discharge circuit 43 by the second partition wall 39 of the second adiabatic element 34. In addition, the first peripheral wall portion 32d of the second shell element 32c exposed to the first chamber 41a and the second peripheral wall portion 32e of the second shell element 32c exposed to the second chamber 41b are thermally isolated from each other by the second partition wall 39.

By virtue of this structure, the heat of the rechargeable battery 42 can be prevented from being transmitted through the second shell element 32c to the second chamber 41b that accommodates the charge/discharge circuit 43. Similarly, the heat of the charge/discharge circuit 43 can be prevented from being transmitted through the second shell element 32c to the first chamber 41a that accommodates the rechargeable battery 42.

As a result, the heat produced by the rechargeable battery 42 is mainly dissipated to the environment through the surface of the first peripheral wall portion 32d of the third shell element 32c. At the same time, the heat produced by the charge/discharge circuit 43 is dissipated to the environment mainly through the surface of the second peripheral wall portion 32e of the third shell element 32c. Therefore, the first chamber 41a can be kept in a temperature environment corresponding to the allowable temperature limit of the rechargeable battery 42. Similarly, the second chamber 41b can be kept in a temperature environment corresponding to the allowable temperature limit of the charge/discharge circuit 43.

Although in the second embodiment, the first adiabatic element 33 of the adiabatic member 31 is formed as one body, the first wall 35, the second wall 36 and the flange 37, for example, may be formed as separate members. In this case, these members may be assembled into one body, using an engagement mechanism, such as screws, or an adhesive or tape.

Furthermore, the second adiabatic element 34 of the adiabatic member 31 can also be constructed such that the first and second partition walls 38 and 39 are formed of separate members and assembled into one body.

Although in the second embodiment, the rechargeable battery 42 and the charge/discharge circuit 43 are arranged inside the main body 2, along with the power supply circuit, the embodiment is not limited to this. Alternatively, an arbitrary combination of arbitrary devices having additional functions may be arranged inside the main body 2.

The devices having additional functions may include, for example, a toning circuit, a light control circuit, a wireless circuit, a primary cell, a Peltier device, a microphone, a loud speaker, a radio, an antenna, a clock, an ultrasonic producer, a camera, a projector, a liquid crystal display, an interphone, a fire alarm, an alarm, a gas componential analysis sensor, a particle counter, a smoke sensor, a human sensing sensor, a distance sensor, a lighting intensity sensor, an atmospheric pressure sensor, a magnetism sensor, an acceleration sensor, a temperature sensor, a humidity sensor, an inclination sensor, a GPS, a Geiger counter, a ventilation fan, a humidifier, a dehumidifier, an air cleaner, a fire extinguishing agent, a sterilizer agent, a deodorizer, a perfume, a bug repellent, a CPU, a memory, a motor, a propeller, a fan, a fin, a pump, a heat pump, a heat pipe, a wire, a cleaner, a dust-collecting filter, a wireless LAN access point, a transponder, an electromagnetic shielding function, a radio power transmitter, a radio power receiver, a photocatalyst, a solar battery, etc.

Third Embodiment

FIGS. 8 and 9 show a third embodiment. An LED lamp 50 of a common bulb shape according to the third embodiment differs from the first embodiment mainly in the structure of a radiating globe portion 51. The other matters associated with the base 3, the light-emitting module 4 and the power supply circuit 5 are the same as those of the first embodiment. Therefore, in the third embodiment, elements similar to those of the first embodiment are denoted by corresponding reference numbers, and no detailed description will be given thereof.

As shown in FIG. 8, the globe portion 51 is a hollow element constituting the outline of the LED lamp 50, and has a shape similar to the glass bulb of a common light bulb in this embodiment. The globe portion 51 of the vertically-elongated LED lamp 50 has a vertically extending axis O1.

The globe portion 51 comprises a main body 52 and the light-guiding member 53. The main body 52 is formed of a metal material, such as aluminum, copper or iron, or a ceramic material excellent in thermal conductivity, and also serves as a heat dissipation portion.

The main body 52 is formed hollow along the axis O1 of the LED lamp 50. More specifically, the main body 52 comprises a neck portion 52a having an open end, and a spherical portion 52b continuously extending from the neck portion 52a. The open end of the neck portion 52a has a diameter substantially equal to the base 3. The base 3 is secured to this end of the neck portion 52a by means of an electrically insulated adhesive or grease.

The neck portion 52a comprises a top portion 52c opposing the open end of the neck portion 52a, a portion 52d having its diameter gradually downwardly enlarged from the neck portion 52a (hereinafter, the portion 52d will be referred to as the enlarged portion 52d), a maximum-diameter portion 52e that defines the maximum diameter of the spherical portion 52b, and a portion 52f having its diameter gradually reduced from the maximum-diameter portion 52e to the top portion 52c (hereinafter, the portion 52f will be referred to as the shrunk portion 52f).

The top portion 52c of the spherical portion 52b has a support surface 54. The support surface 54 is a flat surface that intersects perpendicularly with the axis O1 of the LED lamp 50, and the light-emitting module 4 is mounted on the central portion of the surface 54. The substrate 10 of the light-emitting module 4 is secured to the support surface 54 with a screw or connector (not shown) interposed therebetween. Further, the substrate 10 is thermally coupled to the main body 52 of the globe portion 51 via, for example, a heat conductive sheet, a heat conductive grease, or a heat conductive adhesive.

As shown in FIG. 8, the power supply circuit 5 is accommodated in a space ranging from the inside of the enlarged portion 52d of the main body 52 to the inside of the base 3. The power supply circuit 5 is thermally coupled to the base 3 and the neck portion 52a through a filler, such as silicone, or through a metal, ceramic or plastic member, which are not shown.

The light-guiding member 53 is a hollow element that continuously covers the outer surface of the main body 52 including the support surface 54. The light-guiding member 53 is formed of a material having optical transparency, such as acrylic, polycarbonate, cycloolefin or glass. The light-guiding member 53 comprises a cylindrical portion 57 and an optical lens unit 58.

The cylindrical portion 57 continuously surrounds the neck portion 52a, the enlarged portion 52d, the maximum-diameter portion 52e and the shrunk portion 52f of the main body 52. The thickness t of the cylindrical portion 57 is gradually reduced from the shrunk portion 52f to the neck portion 52a of the main body 52.

Furthermore, the cylindrical portion 57 has an outer peripheral surface 57a and an inner peripheral surface 57b. The outer peripheral surface 57a and the inner peripheral surface 57b are curved along the outer peripheral surface of the main body 52 ranging from the neck portion 52a to the shrunk portion 52f.

The inner peripheral surface 57b of the cylindrical portion 57 is formed as a light diffusion surface in which, for example, a large number of fine convex and concave portions are formed. The convex and concave portions are diffusion marks for diffusing light, and are formed, in the embodiment, by so-called sandblast of blasting a fine abrading agent onto the inner peripheral surface 57b of the cylindrical portion 57.

Alternatively, the diffusion marks may be formed by coating the inner peripheral surface 57b of the cylindrical portion 57 with a paint containing particles for diffusing light, or performing silk printing on the inner peripheral surface 57b. In addition, the diffusion marks may be formed on the outer peripheral surface 57a of the cylindrical portion 57, or on both the outer and inner peripheral surfaces 57a and 57b.

The diffusion marks do not have to be always uniformly formed on the inner or outer peripheral surface 57b or 57a of the cylindrical portion 57. For example, the diffusion marks may be formed thin or sparse in the vicinity of the light-emitting module 4, and formed thick or dense away from the light-emitting module 4. This realizes a uniform light distribution on the surface of the LED lamp 50.

Moreover, the light-guiding member 53 is not limited to a monolithic structure, but may be formed by combining a plurality of elements. For instance, if the light-guiding member 53 is divided into a plurality of elements along the axis O1, the light of the light-emitting module 4 can be easily guided to a position near the base 3. Further, if the light-guiding member 53 is divided into a plurality of elements perpendicularly to the axis O1, the appearance of the light-guiding member 53 improves, although the end faces of the divided elements must be processed to prevent reflection of light.

The divided elements may be jointed by various welding methods, such as ultrasonic welding, oscillation welding, induction welding, high-frequency welding, semiconductor-laser welding, and thermal welding, spin welding, or by adhesion methods using, for example, an adhesive, double-sided tape and grease.

As shown in FIG. 8, a clearance 59 is formed between the cylindrical portion 57 of the main body 52 and the light-guiding member 53. The clearance 59 is formed by interposing a spacer (not shown) between, for example, the main body 52 and the cylindrical portion 57. The spacer may be formed integral as one body with the outer surface of the main body 2, or with the inner peripheral surface 57b of the cylindrical portion 57. Alternatively, the spacer may be formed of a member separate from the main body 52 and the cylindrical portion 57.

In the third embodiment, a medium, such as air, filled in the clearance 59 thermally couples the main body 52 to the cylindrical portion 57 of the light-guiding member 53. A consideration will now be given to an appropriate value d that defines the thickness of the layer of air in the clearance 59.

The appropriate value d of the clearance 59 is set basically greater than the wavelength λ the light emitted from the light-emitting module 4. Further, in order to facilitate transmission of heat from the main body 52 to the light-guiding member 53, it is desirable to form the clearance 59 as narrow as possible. Moreover, in view of securing accuracy of processing of the cylindrical portion 57, the appropriate value d of the clearance 59 is set to, for example, about 0.01 to 1.0 mm.

As shown in FIG. 8, the optical lens unit 58 of the light-guiding member 53 comprises a wide-distribution lens 61 and a diffusion lens 62. The wide distribution lens 61 is formed integral with an end of the cylindrical portion 57 that surrounds the shrunk portion 52f of the main body 52. The wide distribution lens 61 is formed symmetrical with respect to the axis O1 of the LED lamp 50.

More specifically, the wide distribution lens 61 comprises a through-hole 63, an incidence surface 64, a projection surface 65 and a totally internally reflecting surface 66. The through-hole 63 is formed through the wide distribution lens 61 along the axis O1 of the LED lamp 50.

The incidence surface 64 is a flat plane perpendicular to the axis O1. The central portion of the incidence surface 64 faces the light-emitting surface 14, and has the through-hole 63 formed therethrough. The outer periphery of the incidence surface 64 faces the support surface 54 of the main body 52.

The projection surface 65 is formed integral with the peripheral surface 57a of the cylindrical portion 57 around the axis O1. The cylindrical portion 57 is curved such that its diameter is gradually increased between the wide-distribution lens 61 and the center C1 of the cylindrical portion 57, and is gradually reduced between the center C1 and the base 3.

The totally internally reflecting surface 66 connects the front end of the projection surface 65 to an edge of the incidence surface 64 opposing the through-hole 63. In other words, the totally internally reflecting surface 66 defines the through-hole 63, and is curved such that it spreads away from the incidence surface 64 along the radius of the wide-distribution lens 61.

The diffusion lens 62 of the optical lens unit 58 has a reverse surface 69, an obverse surface 70 and an end surface 71. The reverse surface 69 faces the totally internally reflecting surface 66 to cover the through-hole 63 of the wide-distribution lens 61. The obverse surface 70 is the opposite side of the reverse surface 69 and is exposed to the outside of the LED lamp 50. The center of each of the reverse and obverse surfaces 69 and 70 is aligned with the axis O1. Each of the edges of the surfaces 69 and 70 is upwardly curved away from the totally internally reflecting surface 66.

In the third embodiment, the obverse surface 70 is a white-light diffusion surface on which a large number of fine convex and concave portions are provided. The light diffusion surface is formed by so-called sandblast of spraying fine abradant particles on the entire surface 70.

Instead of sandblast, the light diffusion surface may be formed by coating the obverse surface 70 with a paint containing light diffusion particles, or by encapsulating diffusion particles in the diffusion lens 62. Instead of the obverse surface 70, the reverse surface 69 may have a light diffusion surface. Yet alternatively, both the obverse and reverse surfaces 70 and 69 may have respective light diffusion surfaces.

The end surface 71 of the diffusion lens 62 is an annular surface that connects the outer peripheral edges of the reverse and obverse surface 69 and 70. The end surface 71 faces the outer peripheral portion of the totally internally reflecting surface 66 of the wide-distribution lens 61.

The end surface 71 of the diffusion lens 62 is adhered to the outer peripheral portion of the totally internally reflecting surface 66 of the wide-distribution lens 61 at a plurality of peripheral positions by an adhesive 72. Further, clearances 73 are defined between the end surface 71 of the diffusion lens 62 and the totally internally reflecting surface 66 of the wide-distribution lens 61, except for the above-mentioned adhered positions.

As shown in FIG. 8, an adiabatic member 76 is provided inside the main body 52. The adiabatic member 76 covers the entire inner surfaces of the shrunk portion 52f and the top portion 52c of the main body 52. Thus, the adiabatic member 76 is provided inside the main body 52 between the light-emitting module 4 and the power supply circuit 5, thereby thermally isolating the light-emitting module 4 from the power supply circuit 5.

Furthermore, the adiabatic member 76 has a flange 77. The flange 77 continuously extends along the periphery of the shrunk portion 52f of the main body 52, and is interposed between the shrunk portion 52f and the maximum-diameter portion 52e. In other words, the flange 77 of the adiabatic member 76 thermally isolates the shrunk portion 52f from the maximum-diameter portion 52e to thereby suppress transfer of heat therebetween.

As described above, in the third embodiment, the flange 77 of the adiabatic member 76 is configured to thermally insulate first and second regions of the main body 52. The first region includes the top portion 52c and the shrunk portion 52f of the main body 52. The second region includes the neck portion 52a, the shrunk portion 52d and the maximum-diameter portion 52e of the main body 52.

It is desirable to form the adiabatic member 76 of a material, which, for example, has a higher allowance temperature limit than the light-emitting module 4, and exhibits adiabatic performance where the thermal conductivity is not more than 0.3 W/mK. The allowable temperature limit of the adiabatic member 76 is not less than 100° C. A resin material having a high allowable temperature limit, such as, in particular, PC, PEEK or ABS, is preferable as the material of the adiabatic member 76.

Furthermore, the adiabatic member 76 may be formed of aluminum, stainless steel, iron, or a resin material having the above-mentioned allowable temperature limit, or a plurality of holes or uneven portions may be provided in the adiabatic member 76, or a cavity may be formed in the adiabatic member 76. In this structure, the thermal resistance of the adiabatic member 76 is increased by the spaces defined by the holes, the uneven portions or the cavity, compared to a case where the adiabatic member 76 is formed only of a metal or resin material.

In addition, if the adiabatic member 76 is in contact with other members, these members may have uneven portions and be located at a distance from the adiabatic member 76. In this case, the same advantage as in the case where the adiabatic member 76 has uneven portions can be obtained.

If the adiabatic member 76 faces other members, a spacer as another member, such as a metal, resin, sheet or tape member, may be interposed between the adiabatic member 76 and those members in order to maintain a gap therebetween. In this case, the same advantage as in the case where the adiabatic member 76 and/or those members have uneven portions can be obtained.

The inner or outer surface of the adiabatic member 76 and/or the surfaces of the members opposing the adiabatic member 76 may be formed to be glossy by, for example, polishing, coating, metal deposition, etc. In this case, radiation of heat from the adiabatic member 76 and the members is suppressed, and the thermal resistance of the adiabatic member 76 increases.

The space defined between the adiabatic member 76 and other components and the space inside the adiabatic member 76 may be decompressed. Further, a gas having a low thermal conductivity, such as argon, may be filled in the space. In this case, the thermal resistance of the space increases.

The adiabatic member 76 may be formed of a fiber-based adiabatic material, such as glass wool, rock wool, cellulose fiber, carbonized cork, adiabatic wool material, or a foam insulation material, such as urethane foam, phenolic foam and polystyrene form, other adiabatic materials, such as aerogel, brick, concrete, or an epoxy-based heat-resistant adhesive, or a high heat-resistant paint. In addition, the adiabatic member 76 may be formed by combining various kinds of thermal insulation materials as described above. There are no particular limitations on the material of the adiabatic member 76.

When a direct-current voltage is applied to the light-emitting module 4 by the power supply circuit 5, a plurality of LEDs 11 simultaneously emit light, whereby the light-emitting surface 14 shines like an emission sheet. The light emitted from the central portion of the light-emitting surface 14 enters the incidence surface 64 of the wide-distribution lens 61. Further, the light emitted from a substantially central portion of the light-emitting surface 14 that crosses the axis O1, passes through the through-hole 63 of the wide-distribution lens 61, and enters the diffusion lens 62.

More specifically, as indicated by arrow A (light beam A), the light having entered an arbitrary point Q1 on the incidence surface 64 reaches the totally internally reflecting surface 66 through the wide-distribution lens 61. On the totally internally reflecting surface 66, the light is totally internally reflected to the projection surface 65. Part of the light guided to the projection surface 65 passes through the projection surface 65 to the outside of the globe portion 51. The remaining part of the light guided to the projection surface 65 is refracted by the projection surface 65 along the axis O1, whereby it enters the cylindrical portion 57 of the light-guiding member 53.

The light, which is included in the light having entered the cylindrical portion 57, and whose angle of incidence with respect to the outer peripheral surface 57a of the cylindrical portion 57 is not less than a critical angle, i.e., the light that satisfies a total internal reflection condition, advances through the interior of the wall of the cylindrical portion 57 towards the base 3, while repeating total internal reflection between the inner and outer peripheral surfaces 57a and 57b of the cylindrical portion 57.

In contrast, the light, which is included in the light having entered the cylindrical portion 57, and is diffused by diffusion marks and does not satisfy the total internal reflection condition, passes through the cylindrical portion 57 to the outside of the globe portion 51, without being totally internally reflected by the outer peripheral surface 57a of the cylindrical portion 57. As a result, the entire outer peripheral surface 57a of the cylindrical portion 57 of the light-guiding member 53 emits light.

As indicated by arrow B (light beam B), the light having passed the through-hole 63 of the wide-distribution lens 61 enters the diffusion lens 62. The light having entered the diffusion lens 62 is widely diffused while passing through the light diffusion surface of the diffusion lens 62, and is then emitted to the outside of the globe portion 51.

As a result, light is emitted in all directions from the light-guiding member 53 of the globe portion 51. Thus, an LED lamp 50 of a wide light distribution, which is similar to a common light bulb in light distribution and the way of lighting can be obtained.

When the LED lamp 50 is turned on, the light-emitting module 4 and the power supply circuit 5 produce heat. The heat produced by the light-emitting module 4 is transmitted from the support surface 54 of the main body 52 to the top portion 52c of the same. The heat transmitted to the top portion 52c is diffused to the spherical portion 52b of the main body 52.

Furthermore, in the third embodiment, a clearance 59 of about 0.01 to 1.0 mm is formed between the cylindrical portion 57 of the light-guiding member 53 and the main body 52, and the main body 52 and the cylindrical portion 57 of the light-guiding member 53 is thermally coupled to each other through an air layer existing in the clearance 59. Accordingly, the heat of the light-emitting module 4 diffused to the main body 52 is transmitted to the cylindrical portion 57 via the air layer, and is emitted to the environment through the outer peripheral surface 57a of the cylindrical portion 57.

FIG. 9 is a graph associated with an LED lamp 50 obtained by, for example, forming the light-guiding member 53 of acrylic and the main body 2 of aluminum, and showing the relationship between d/λ and the reflectance assumed when light is totally internally reflected at an angle of incidence of 45° within the cylindrical portion 57 of the light-guiding member 53. In FIG. 9, d is an appropriate value for the clearance 59 and λ is the wavelength of light.

It is evident from FIG. 9 that if d/λ>1, i.e., if d>λ, the reflectance of light in the light-guiding member 53 is substantially 100%. In contrast, if d/λ<1, i.e., if d<λ, light is absorbed by the main body 52, and the closer to 0 d, the lower the reflectance.

Therefore, the reflectance of light passing through the interior of the wall of the cylindrical portion 57 can be made close to 100% by providing an appropriate clearance 59 between the cylindrical portion 57 of the light-guiding member 53 and the main body 52, as in the LED lamp 50 of the third embodiment.

As a result, the great part of the light guided to the cylindrical portion 57 can be extracted as illumination light from the peripheral surface 57a of the cylindrical portion 57, and loss of light as a result of absorption of light by the main body 52 can be reduced. This means that transmission of light from the cylindrical portion 57 to the main body 52 because of an evanescent wave can be prevented, thereby reducing loss of light.

On the other hand, the heat produced by the power supply circuit 5 is mainly transmitted to the neck portion 52a of the main body 52, and is transmitted from the neck portion 52a to the cylindrical portion 57 of the light-guiding member 53 through the air layer in the clearance 59. As a result, the heat of the power supply circuit 5 is emitted from the outer peripheral surface 57a of the cylindrical portion 57 of the light-guiding member 53 to the environment. In addition, part of the heat produced by the power supply circuit 5 is also transmitted to the base 3, and then transmitted from the base 3 to the outside of the LED lamp 50 via a socket (not shown).

In the LED lamp 50 of the third embodiment, the adiabatic member 76 thermally isolates the top portion 52c and the shrunk portion 52f of the main body 52, to which the heat of the light-emitting module 4 is transmitted, from the enlarged parts 52d of the main body 52 in which the power supply circuit 5 is located, thereby suppressing transfer of heat between the shrunk portion 52f and the enlarged portion 52d.

Moreover, the adiabatic member 76 covers the entire inner surface of the top portion 52c of the main body 52 thermally coupled to the light-emitting module 4, thereby suppressing transmission of the heat, produced by the light-emitting module 4, to the enlarged portion 52d of the main body 52, and to the interior of the main body 52.

As a result, adverse influence of the heat produced by the light-emitting module 4 upon the power supply circuit 5 having an allowable temperature limit different from that of the light-emitting module 4 can be avoided. This enables the temperatures of the light-emitting module 4 and the power supply circuit 5 to fall within their respective allowable ranges, while appropriately dissipating the heat of the light-emitting module 4 and the power supply circuit 5 to the environment through the outer peripheral surface 57a of the cylindrical portion 57 of the light-guiding member 53.

Therefore, the heat of the light-emitting module 4 can be positively dissipated from the main body 52 to the outside of the light-guiding member 53, without considering the allowable temperature limit of the power supply circuit 5, with the result that the total luminous flux of the LED lamp 50 can be increased, using higher-output LEDs 11.

Fourth Embodiment

Figure 10:
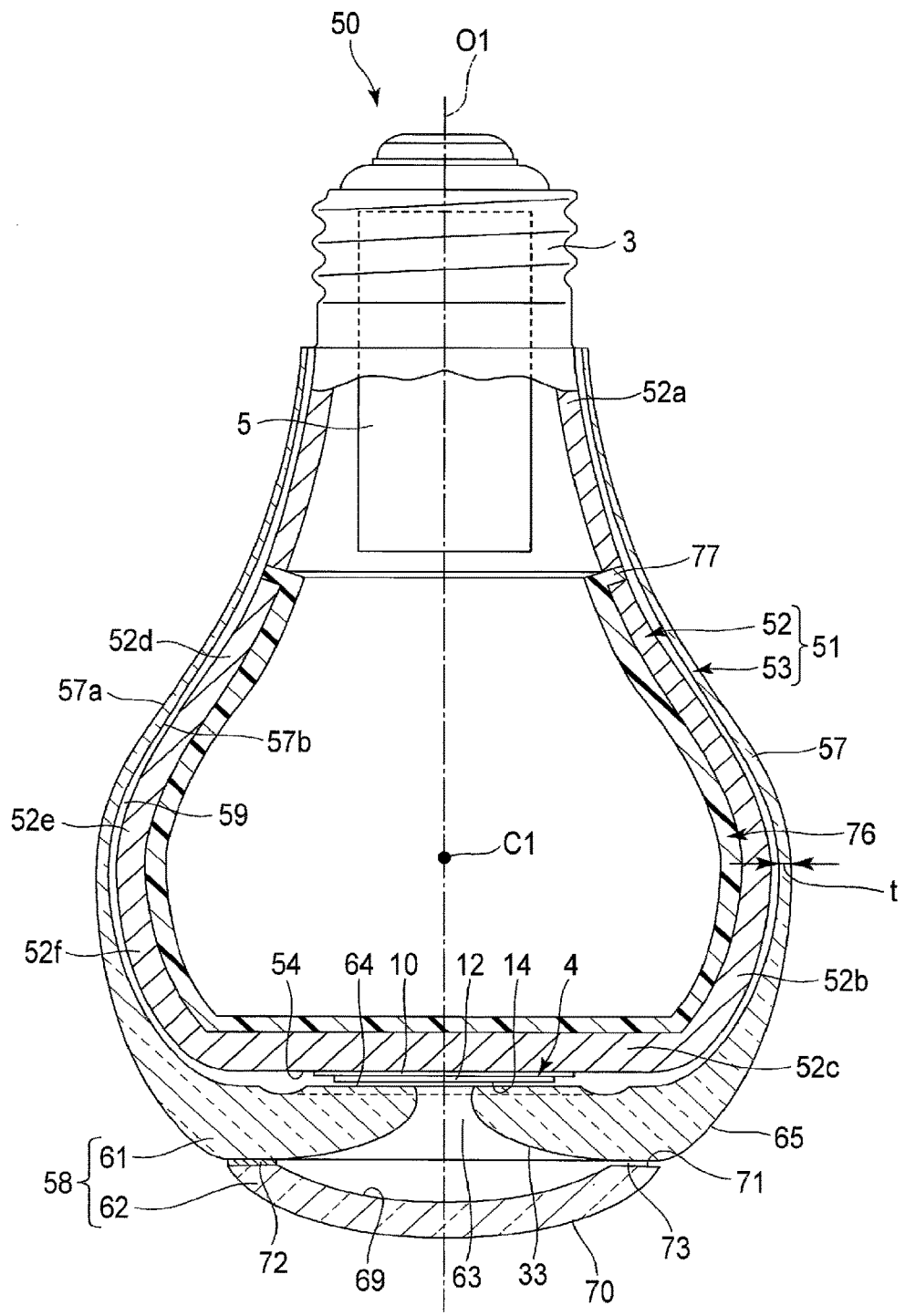
FIG. 10 is a cross-sectional view showing an LED lamp of a common bulb shape according to a fourth embodiment.

FIGS. 10 and 11 show a fourth embodiment. An LED lamp 50 according to the fourth embodiment differs from that of the third embodiment in that in the former, the dissipation area of the main body 52 is divided and distributed to the light-emitting module 4 and the power supply circuit 5 in accordance with their respective allowable temperature limits and dissipation amounts. The other basic structures of the LED lamp 50 are similar to those of the third embodiment. In the fourth embodiment, elements similar to those of the third embodiment are denoted by corresponding reference numbers, and no detailed description will be given thereof.

As shown in FIG. 10, the adiabatic member 76 covers the entire inner surface of the spherical portion 52b of the main body 52. That is, the adiabatic member 76 is more greatly extended towards the base 3 than the LED lamp 50 of the third embodiment.

The flange 77 of the adiabatic member 76 is continuously extended along the edge of the enlarged portion 52d of the main body 52 between the enlarged portion 52d and the neck portion 52a. In other words, the enlarged portion 52d and the neck portion 52a are thermally isolated from each other by the flange 77 of the adiabatic member 76, thereby suppressing transfer of heat between the enlarged portion 52d and the neck portion 52a. Furthermore, the flange 77 defines the boundary between the enlarged portion 52d and the neck portion 52a. This boundary is closer to the base 3 than to the center C1 of the main body 52.

That is, in the fourth embodiment, the first region of the main body 52 defined by the flange 77 includes the entire spherical portions 52b of the main body 52, and the second region of the main body 52 includes the neck portion 52a of the main body 52. Thus, the surface area of the first region is set much greater than that of the second region.

When the LED lamp 50 is turned on, the light-emitting module 4 and the power supply circuit 5 produce heat. The heat produced by the light-emitting module 4 and the power supply circuit 5 is dissipated to the outside of the LED lamp 50 through the same course as in the third embodiment.

A description will now be given of preferable heat dissipation areas of the first and second regions where the adiabatic member 7 completely thermally isolates the first region (spherical portion 52b) of the main body 52 and the second region (neck portion 52a) of the same.

Assuming that the entire surface area of the main body 52 is $A_{all}$, the surface area of the first region of the main body 52 thermally coupled to the light-emitting module 4 is $A_1$, and the surface area of the second region of the main body 52 thermally coupled to the power supply circuit 5 is $A_2$, the surface areas $A_{all}$, $A_1$ and $A_2$ satisfy the following equation:

$$A_{all} = A_1 + A_2 \quad (32)$$

Assuming that the surface area of the first region which causes an increase $\Delta T_{1max}$ in the allowable temperature limit of the light-emitting module 4 is $A_{1min}$, and that the surface area of the second region which causes an increase $\Delta T_{2max}$ in the allowable temperature limit of the power supply circuit 5 is $A_{2min}$, surface area $A_1$ of the first region satisfies expression 33, below, and surface area $A_2$ of the second region satisfies expression 34, below:

$$A_1 \geq A_{1min} \quad (33)$$

$$A_2 \geq A_{2min} \quad (34)$$

Furthermore, the surface area $A_{all}$ satisfies the following relationship:

$$A_{all} \geq A_{1min} + A_{2min} \quad (35)$$

If expression 33 is applied to equation 32, the following relationship is established:

$$A_1 \leq A_{all} - A_{2min} \quad (36)$$

If expression 34 is applied to equation 32, the following relationship is established:

$$A_2 \leq A_{all} - A_{1min} \quad (37)$$

If expressions 33 and 36 are combined, the following relationship is established:

$$A_{1min} \leq A_1 \leq A_{all} - A_{2min} \quad (38)$$

If expressions 34 and 37 are combined, following relationship 39 is established:

$$A_{2min} \leq A_2 \leq A_{all} - A_{1min} \quad (39)$$

For example, if only a temperature reduction in the light-emitting module 4 contributes to an improvement in short-term performance, such as luminous efficiency of the LED lamp 50, or long-term performance, such as a life, it is optimal to set surface area $A_1$ of the first region of the main body 52 as given by the following equation:

$$A_1 = A_{all} - A_{2min} \quad (40)$$

Similarly, it is optimal to set surface area $A_2$ of the second region of the main body 52 as given by the following equation:

$$A_2 = A_{all} - A_1 \quad (41)$$

Assuming here that the thermal resistance between the light-emitting module 4 and the environment is $R_1(A_1)$, the quantity of heat (i.e., calorific value) produced by the light-emitting module 4 is $Q_1$, an allowable temperature limit increase in the junction of the light-emitting module 4 is $\Delta T_{1max}$, the thermal resistance between the power supply circuit 5 and the environment is $R_2(A_2)$, the quantity of heat (i.e., calorific value) produced by the power supply circuit 5 is $Q_2$, and an allowable temperature limit increase in the junction of the power supply circuit 5 is $\Delta T_{2max}$, $A_{1min}$ and $A_{2min}$ satisfy the following equations, respectively:

$$\Delta T_{1max} = R_1(A_{1min})Q_1 \quad (42)$$

$$\Delta T_{2max} = R_2(A_{2min})Q_2 \quad (43)$$

FIG. 11 shows the heat dissipation path of the LED lamp 50. Assuming as shown in FIG. 11 that the thermal resistance between the junction of the light-emitting module 4 and the spherical portion 52b of the main body 52 is $R_{1ci}$, the thermal resistance between the spherical portion 52b and the environment is $R_{1co}$, the thermal resistance between the power supply circuit 5 and the neck portion 52a of the main body 52 is $R_{2ci}$, the thermal resistance between the neck portion 52a and the environment is $R_{2co}$, the thermal resistance between the power supply circuit 5 and the base 3 is $R_{2si}$, and the thermal resistance between the base 3 and the environment is $R_{2so}$, $R_1(A_1)$ including $A_1$ and $R_2(A_2)$ including $A_2$ satisfy the following equations, respectively:

$$R_1(A_1) = R_{1ci} + R_{1co} \quad (44)$$

$$R_2(A_2) = \frac{(R_{2ci} + R_{2co})(R_{2si} + R_{2so})}{(R_{2ci} + R_{2co}) + (R_{2si} + R_{2so})} \quad (45)$$

Consideration will here be given to thermal resistance $R_{1co}$ between the spherical portion 52b of the main body 52 and the environment will be described. Assuming that thermal resistance due to convection is $R_{1coc}(A_1)$ and thermal resistance due to radiation is $R_{1cor}(A_1)$, thermal resistance $R_{1co}(A_1)$ including $A_1$ satisfies the following equation:

$$R_{1co}(A_1) = \frac{R_{1coc}(A_1)R_{1cor}(A_1)}{R_{1coc}(A_1) + R_{1cor}(A_1)} \quad (46)$$

Thermal resistance $R_{2co}$ between the neck portion 52a of the main body 52 and the environment can also be expressed by an equation similar to equation 46, using thermal resistance $R_{2coc}(A_2)$ due to convection and thermal resistance $R_{2cor}(A_2)$ due to radiation.

First, thermal resistance $R_{1coc}(A_1)$ due to convection will be described. Assuming that the thermal transfer coefficient between the spherical portion 52b of the main body 52 and the environment is $h_1$, thermal resistance $R_{1coc}(A_1)$ due to convection satisfies the following equation:

$$R_{1coc}(A_1) = \frac{1}{h_1 A_1} \quad (47)$$

Further, assuming that the thermal transfer coefficient $h_1$ is equivalent to natural convection along a perpendicular isothermal plate, it can be obtained from the following equation:

$$h_1 = \frac{k_1}{d_1} Nu_1 \quad (48)$$

where $d_1$ is the vertical length of the spherical portion 52b of the main body 52, $k_1$ is the thermal transfer coefficient of ambient gas, and $Nu_1$ is a Nusselt number.

It is known that the Nusselt number $Nu_1$ satisfies a relationship given by the following equation, if $R_{a1}$ is a Rayleigh number:

$$Nu_1 = 0.59 Ra_1^{1/4} \quad (49)$$

Assuming that the average temperature of the main body 52 is $T_{1c}$, the temperature of the environment is Ta, the gravitational acceleration is g, the volume elasticity of gas is $\beta_1$, the kinematic viscosity of gas is $\nu_1$, and the thermometric conductivity of gas is $\alpha_1$, Rayleigh number $R_{a1}$ of gas is given by the following equation:

$$Ra_1 = \frac{g\beta_1(T_{1c} - T_a)d_1^3}{\nu_1 \alpha_1} \quad (50)$$

Thermal resistance $R_{2coc}(A_2)$ due to convection can also be obtained by equations similar to the above. Equations 48 to 50 associated with convection can be used for an arbitrary model associated with convection, other than natural convection along the perpendicular isothermal plane.

Next, thermal resistance $R_{1cor}(ri)$ due to radiation will be considered.

If a surface surrounding a convex surface is sufficiently larger than the convex surface, the relationship given by the following equation is known in association with radiation between the convex surface and the surface surrounding the same:

$$R_{1cor}(A_1) = \frac{1}{A_1 \varepsilon_1 \sigma (T_{1c} + T_a)(T_{1c}^2 + T_a^2)} \quad (51)$$

where $A_1$ is the area of the spherical portion 52b of the main body 52, $T_{1c}$ is the temperature of the same, $\varepsilon_1$ is the emissivity of the same, $T_a$ is the temperature of the environment, and $\sigma$ is a Stefan-Boltzmann constant.

Thermal resistance $R_{2cor}(A_2)$ due to radiation can be obtained by an equation similar to the above. Equation 51 associated with radiation is also applicable to an arbitrary model associated with radiation, as well as radiation between a convex surface and a surface surrounding the same.

A description will then be given of the preferable heat dissipation area of an LED lamp in a case where the number of component parts is generalized.

Assuming that the entire surface area of the LED lamp is $A_{all}$, the surface area of an $i^{th}$ spherical portion thermally coupled to an $i^{th}$ heat producer is $A_i$, the total number of heat producers is n, entire surface area $A_{all}$ satisfies the following equation:

$$A_{all} = \sum_{i=1}^{n} A_i \quad (52)$$

Assuming that the surface area of the $i^{th}$ spherical portion that causes an increase $\Delta T_{imax}$ in the allowable temperature limit of the $i^{th}$ heat producer is $A_{imin}$, $A_i$ satisfies the following relationship:

$$A_i \geq A_{imin} \quad (53)$$

Furthermore, the surface area $A_{all}$ satisfies the following equation:

$$A_{all} \geq \sum_{i=1}^{n} A_{imin} \quad (54)$$

If expression 53 is applied to equation 52, the following relationship will be established:

$$A_i \leq A_{all} - \sum_{\substack{j=1 \\ j \neq i}}^{n} A_{jmin} \quad (55)$$

If expressions 53 and 55 are combined, the following relationship is established:

$$A_{imin} \leq A_i \leq A_{all} - \sum_{\substack{j=1 \\ j \neq i}}^{n} A_{jmin} \quad (56)$$

If only a temperature reduction in the $i^{th}$ heat producer contributes to enhancement of the short-term performance, such as emission efficiency, of the LED lamp, or the long-term performance, such as life duration, of the same, it is optimal to define surface area $A_i$ of the $i^{th}$ shell element as follows:

$$A_i = A_{all} - \sum_{\substack{j=1 \\ j \neq i}}^{n} A_{jmin} \quad (57)$$

Assuming that the thermal resistance between the $i^{th}$ heat producer and the environment is $R_i(A_i)$, the quantity of heat (i.e., calorific value) produced by the $i^{th}$ heat producer is $Q_i$, and an allowable temperature limit increase in the junction of the $i^{th}$ heat producer is $\Delta T_{imax}$, $A_{imin}$ satisfies the following equation:

$$\Delta T_{imax} = R_i(A_{imin})Q_i \quad (58)$$

Further, assuming that the thermal resistance between the $i^{th}$ heat producer and the $i^{th}$ spherical portion is $R_{ici}$, and the thermal resistance between the $i^{th}$ spherical portion and the environment is $R_{ico}$, $R_i(A_i)$ including $A_i$ satisfies the following equation:

$$R_i(A_i) = R_{ici} + R_{ico} \quad (59)$$

If a cap is included in the heat dissipation path of the $i^{th}$ heat producer, $R_i(A_i)$ including $A_i$ satisfies the following equation:

$$R_i(A_i) = \frac{(R_{ici} + R_{ico})(R_{isi} + R_{iso})}{(R_{ici} + R_{ico}) + (R_{isi} + R_{iso})} \quad (60)$$

where $R_{isi}$ is the thermal resistance between the $i^{th}$ heat producer and the cap, and $R_{iso}$ is the thermal resistance between the cap and the environment.

A consideration will be given to thermal resistance $R_{ico}$ between the $i^{th}$ spherical portion and the environment. Assuming that the thermal resistance due to convection is $R_{icoc}(A_i)$, and the thermal resistance due to radiation is $R_{icor}(A_i)$, thermal resistance $R_{ico}(A_i)$ including $A_i$ satisfies the following equation:

$$R_{ico}(A_i) = \frac{R_{icoc}(A_i) R_{icor}(A_i)}{R_{icoc}(A_i) + R_{icor}(A_i)} \quad (61)$$

When the $i^{th}$ heat producer comprises m small heat producers $Q_j$, more specifically, when, for example, a light-emitting module comprises a plurality of LEDs, when a circuit board comprises a plurality of elements, or when a rechargeable battery module comprises a plurality of rechargeable batteries, calorific value Qi satisfies the following equation:

$$Q_i = \sum_{j=1}^{m} Q_j \tag{62}$$

It is desirable that the small heat producers $Q_j$ surrounded by an adiabatic member have the same allowable temperature limit.

In the fourth embodiment, the surface area of the first region (spherical portion 52*b*) of the main body 52 contributing to the heat dissipation of the light-emitting module 4, and the surface area of the second region (neck portion 52*a*) of the main body 52 contributing to the heat dissipation of the power supply circuit 5, are set to appropriate values that meet the allowable temperature limits and heat dissipation quantities of the light-emitting module 4 and the power supply circuit 5, respectively.

As a result, the heat of the light-emitting module 4 can be positively dissipated to the outside of the LED lamp 50 from main body 52 through the light-guiding member 53, regardless of the allowable temperature limit of the power supply circuit 5. Therefore, the total luminous flux of the LED lamp 50 can be increased, using higher-output LEDs 11.

Fifth Embodiment

FIG. 12 shows a fifth embodiment. An LED lamp 50 according to the fifth embodiment differs from the third embodiment in the structure of the main body 52 of the globe portion 51. The other structures of the LED lamp 50 are basically similar to those of the third embodiment. Therefore, in the fifth embodiment, elements similar to those of the third embodiment are denoted by corresponding reference numbers, and no detailed description will be given thereof.

As shown in FIG. 12, the main body 52 of the globe portion 51 is divided into first to third heat transfer portions 83*a*, 83*b* and 83*c* by the first and second adiabatic members 81 and 82.

The first heat transfer portion 83*a* is an example of the first region. The first heat transfer portion 83*a* includes the top portion 52*c* and a shrunk portion 52*f* thermally coupled to the light-emitting module 4. The second heat transfer portion 83*b* is an example of the second region. The second heat transfer portion 83*b* includes the neck portion 52*a*. The third heat transfer portion 83*c* is an example of a third region. The third heat transfer portion 83*c* comprises the enlarged portion 52*d* and the maximum-diameter portion 52*e*, and is located between the first and second heat transfer portions 83*a* and 83*b*.

It is desirable to form the first and second adiabatic members 81 and 82 of a material that has, for example, a higher allowable temperature limit than the light-emitting module 4, and exhibits adiabatic performance with a thermal conductivity of not more than 0.3 W/mK. The allowable temperature limit of the first and second adiabatic members 81 and 82 is not less than 100° C. As the material of the first and second adiabatic members 81 and 82, a resin material having a high allowable temperature limit, in particular, PC, PEEK or ABS, is preferable.

Further, the first and second adiabatic members 81 and 82 may be formed of aluminum, stainless steel, iron, or a resin having the above-mentioned allowable temperature limit, and may, at the same time, be provided with a plurality of holes or a plurality of convex and concave portions, or a cavity. In this structure, the spaces defined by the concave and convex portions or the cavity increases the thermal resistance of the first and second adiabatic members 81 and 82, compared to the case where they are formed only of a metal or resin.

In addition, if the first and second adiabatic members 81 and 82 are in contact with other members, these other members may have unevenness to thereby define spaces between them and the first and second adiabatic members 81 and 82. In this case, the same effect as in the case where the first and second adiabatic members 81 and 82 have unevenness can be acquired.

If the first and second adiabatic members 81 and 82 oppose the above-mentioned members, respective spacers as yet other members formed of, for example, a metal, a resin, a sheet or tape may be interposed between the first adiabatic member 81 and those members, and between the second adiabatic member 82 and those members, in order to keep spaces therebetween. This structure provides the same advantage as in the case where the first adiabatic member 81, the second adiabatic member 82 and/or other members have unevenness.

The overall or inner surfaces of the first and second adiabatic members 81 and 82 and the surfaces of the members opposing the adiabatic members 81 and 82 may be formed as glossy surfaces by polishing, coating, metal deposition, etc. This suppresses thermal radiation of the first and second adiabatic members 81 and 82 and other members, and increases the thermal resistance of the first and second adiabatic members 81 and 82.

The spaces defined between the first adiabatic member 81 and other members and between the second adiabatic member 82 and other members, and the spaces inside the first and second adiabatic members 81 and 82 may be decompressed, or may be filled with a gas having low thermal conductivity, such as argon. This increases the thermal resistance of the spaces.

Furthermore, the first and second adiabatic members 81 and 82 may be formed of a fiber-based adiabatic material, such as glass wool, rock wool, cellulose fiber, carbonized cork, adiabatic wool material, or a foam insulation material, such as urethane foam, phenolic foam and polystyrene form, other adiabatic materials, such as aerogel, brick, concrete, or an epoxy-based heat-resistant adhesive, or a high heat-resistant paint. In addition, the first and second adiabatic members 81 and 82 may be each formed of a combination of various adiabatic materials mentioned above. Thus, there are no particular limitations on the material of the first and second adiabatic members 81 and 82.

The first adiabatic member 81 is stacked on the inner surface of the first heat transfer portion 83*a*, and covers the entire inner surface of the first heat transfer portion 83*a*. A flange 84 is formed at an edge of the first adiabatic member 81. The flange 84 continuously extends along the periphery of the main body 52 around the axis O1, and is interposed between the first and third heat transfer portions 83*a* and 83*c*.

Accordingly, the first and third heat transfer portions 83*a* and 83*c* are thermally isolated from each other by the flange 84 of the first adiabatic member 81. Thus, transfer of heat is suppressed between the first and third heat transfer portions 83*a* and 83*c*.

The second adiabatic member 82 is accommodated within the main body 52. The second adiabatic member 82 comprises a cylindrical portion 85 having an end closed. The open end of the cylindrical portion 85 is interposed between the second and third heat transfer portions 83*b* and 83*c*.

Accordingly, the second and third heat transfer portions 83*b* and 83*c* are thermally isolated from each other by the second adiabatic member 82. Thus, transfer of heat is suppressed between the second and third heat transfer portions 83*b* and 83*c*.

As shown in FIG. 12, the second adiabatic member 82 partitions the inside of the main body 52 into a first chamber 87*a* and a second chamber 87*b*. The first and second chambers 87*a* and 87*b* are thermally isolated from each other by the second adiabatic member 82, and are aligned along the axis O1 of the LED lamp 50. The second adiabatic member 87*b* is located closer to the base 3 than the first adiabatic member 87*a*.

Further, the first adiabatic member 81 is exposed to the first chamber 87*a*, and thermally isolates the light-emitting module 4 and the first chamber 87*a*.

A rechargeable battery 88 is accommodated in the first chamber 87*a*. The rechargeable battery 88 is an example of an accessory component, and is electrically connected to the power supply circuit 5 and the light-emitting module 4. The rechargeable battery 88 produces heat during charging and discharging. The rechargeable battery 88 is thermally coupled to the third heat transfer portion 83*c* of the main body 52 by a filler, such as silicone, or by a metal, ceramic or plastic member. In the fifth embodiment, the rechargeable battery 88 has a size which occupies a greater part of the first chamber 87*a*.

A charge/discharge circuit 89 is accommodated in the second chamber 87*b*. The charge/discharge circuit 89 is an example of a component having an additional function. The charge/discharge circuit 89 is electrically connected to the rechargeable battery 88, and produces heat during operation. The charge/discharge circuit 89 is thermally coupled to the second heat transfer portion 83*b* of the main body 52 by a filler, such as silicone, or by a metal, ceramic or plastic member.

In the fifth embodiment, the allowable temperature limits of the rechargeable battery 88 and the charge/discharge circuit 89 differ from each other, and are lower than that of the LEDs 11. Further, the charge/discharge circuit 89 is adjacent to the power supply circuit 5 accommodated within the base 3. The allowable temperature limit of the charge/discharge circuit 89 differs from that of the power supply circuit 5.

An adiabatic plate 90 is interposed between the power supply circuit 5 and the charge/discharge circuit 89. The adiabatic plate 90 is diametrically inserted through the neck portion 52*a* of the main body 52, thereby thermally isolating the power supply circuit 5 from the charge/discharge circuits 89. It is desirable to form the adiabatic plate 90 of a material that exhibits adiabatic performance equivalent to, for example, the first and second adiabatic members 81 and 82.

In the fifth embodiment, the heat produced by the light-emitting module 4 and the power supply circuit 5 is dissipated to the outside of the LED lamp 50 through the same path as in the third embodiment.

The heat produced by the rechargeable battery 88 is transmitted from the first chamber 87*a* of the main body 52 to the cylindrical portion 57 of the light-guiding member 53 via the third heat transfer portion 83*c*, and is dissipated to the environment through the outer peripheral surface 57*a* of the cylindrical portion 57.

Further, the heat produced by the charge/discharge circuit 89 is transmitted from the second chamber 87*b* of the main body 52 to the cylindrical portion 57 of the light-guiding member 53 via the second heat transfer portion 83*b*. The heat of the charge/discharge circuit 89 transmitted to the cylindrical portion 57 is dissipated to the environment through the outer peripheral surface 57*a* of the cylindrical portion 57.

In the fifth embodiment, the main body 52 of the globe portion 51 is thermally divided into the first, second and third heat transfer portions 83*a*, 83*b* and 83*c* through the first and second adiabatic members 81 and 82. Therefore, appropriate surface areas can be imparted to the first to third heat transfer portions 83*a* to 83*c* to meet the allowable temperature limits and heat dissipation quantities of the light-emitting module 4, the rechargeable battery 88 and the charge/discharge circuit 89.

Thus, the surface area of the first heat transfer portion 83*a* that contributes to heat dissipation of the light-emitting module 4, the surface area of the third heat transfer portion 83*c* that contributes to heat dissipation of the rechargeable battery 88, and the surface area of the second heat transfer portion 83*b* that contributes to heat dissipation of the charge/discharge circuit 89, are appropriately determined.

As a result, the heat of the light-emitting module 4 can be positively dissipated to the environment through the main body 52 and the light-guiding member 53, without being influenced by the allowable temperature limit of the rechargeable battery 88 accommodated in the main body 52, and that of the charge/discharge circuit 89. This enables the total luminous flux of the LED lamp 50 to increase, using higher-output LEDs 11.

In the fifth embodiment, if the allowable temperature limit of the rechargeable battery 88 is the same as or close to that of the charge/discharge circuit 89, the rechargeable battery 88 and the charge/discharge circuit 89 may be accommodated in a common chamber, without the second adiabatic member 82.

Sixth Embodiment

FIGS. 13 and 14 show a sixth embodiment. An LED lamp 100 according to the sixth embodiment differs from the third embodiment in a structure contributing to light emission and heat dissipation. The other structures of the LED lamp 100 are basically similar to those of the third embodiment. Therefore, in the sixth embodiment, elements similar to those of the third embodiment are denoted by corresponding reference numbers, and no detailed description will be given thereof.

As shown in FIG. 13, the LED lamp 100 has a shape similar to a spherical lamp. The LED lamp 100 mainly comprises a columnar support 101, a globe portion 102, an SMD-type light-emitting module 103 as a light source, and a reflective ring 104.

The columnar support 101 is a cylindrical hollow member, and is formed of a metal material excellent in thermal conductivity, such as an aluminum alloy or a copper alloy. The columnar support 101 includes a cap support portion 105. The cap support portion 105 is positioned at one end of the columnar support 101 along the axis thereof, and is screwed into the base 3. The columnar support 101 is mechanically joined and thermally coupled to the base 3 by the screwing. The other end of the columnar support 101 coaxially projects from the base 3.

Furthermore, in the sixth embodiment, the power supply circuit 5 is accommodated within the columnar support 101. The power supply circuit 5 is supported by and thermally coupled to the columnar support 101 via a filler, such as silicone, or by a metal, ceramic or plastic member.

As shown in FIG. 13, the globe portion 102 is a hollow member that constitutes the shell of the LED lamp 100, and has a spherical shape similar to the glass bulb of a spherical lamp. The globe portion 102 as the shell of the LED lamp 100 has an axis O1.

The globe portion 102 comprises a main body 107, a light-guiding member 108, and a second light-guiding member 109. The main body 107 is formed of, for example, a metal material, such as aluminum, copper or iron, or of ceramic excellent in thermal conductivity, and also serves as a heat dissipation portion.

The main body 107 comprises a heat transfer portion 110 and a light-source support portion 111. The heat transfer portion 110 is formed hollow and spherical, extending along the axis O1 of the LED lamp 100. The heat transfer portion 110 has a top portion 110a that crosses the axis O1.

The light-source support portion 111 vertically opposes the top portion 110a of the heat transfer portion 110. The light-source support portion 111 is formed by depressing, into a flat portion, part of the peripheral surface of the heat transfer portion 110. The light-source support portion 111 has a disk shape that horizontally spreads around the axis O1.

The light-source support portion 111 has a circular opening 113 at its center. A ring-shaped seat 114 is formed along the periphery of the opening 113. The seat 114 slightly projects around the axis O1 from the light-source support portion 111 towards the columnar support 101. Accordingly, the seat 114 and the columnar support 101 are aligned along the axis O1.

The first light-guiding member 108 is a hollow element that completely covers the outer surface of the main body 107. The first light-guiding member 108 is formed of a material having optical transparency, such as acrylic, polycarbonate, cycloolefin or glass.

The first light-guiding member 108 comprises a spherical portion 116 and a light-receiving portion 117. The spherical portion 116 has an inner peripheral surface 116a and an outer peripheral surface 116b. The inner peripheral surface 116a of the spherical portion 116 is formed as a light diffusion surface on which, for example, a large number of fine concave and convex portions are formed. The concave and convex portions are diffusion marks for diffusing light, and are formed, in the sixth embodiment, by so-called sandblast of blasting a fine abrading agent onto the inner peripheral surface 116a of the spherical portion 116.

Alternatively, the diffusion marks may be formed by coating the inner peripheral surface 116a of the spherical portion 116 with a paint containing particles for diffusing light, or performing silk printing on the inner peripheral surface 116a. In addition, the diffusion marks may be formed on the outer peripheral surface 116b of the spherical portion 16, or on both the outer and inner peripheral surfaces 116a and 116b.

The light-receiving portion 117 is formed integral with the spherical portion 116 to concentrically surround the other end portion of the columnar support 101. The light-receiving portion 117 has a flat incidence surface 118 opposing the light-source support portion 111 of the main body 107, and a first reflective surface 119 continuously extending from the edge of the incidence surface 118. The first reflective surface 119 curves circularly, projecting toward the other end of the columnar support 101. Furthermore, the first reflective surface 119 extends to the reverse side of the incidence surface 118, and also extends to the outer peripheral surface 116b of the spherical portion 116, smoothly describing an arc.

In the sixth embodiment, the thickness t of the spherical portion 116 of the first light-guiding member 108 gradually increases from the bottom of the spherical portion 116 that crosses the axis O1 of the LED lamp 100, to the light-receiving portion 117.

As shown in FIG. 13, a plurality of projections 140 projecting from the outer peripheral surface of the heat transfer portion 110 of the main body 107 are formed integral with the outer peripheral surface. The projections 140 are hemispherical, and are dispersedly arranged on the outer peripheral surface of the heat transfer portion 110. The tips of the projections 140 are in contact with the inner peripheral surface 116a of the spherical portion 116 of the first light-guiding member 108.

As a result, a clearance 141 corresponding to the height of the projections 140 is formed between the outer peripheral surface of the heat transfer portion 110 and the inner peripheral surface 116a of the spherical portion 116. The clearance 141 can be referred to as an air layer. It is desirable to set the clearance 141 greater than the wavelength A of light emitted from the light-emitting module 103.

The second light-guiding member 109 is formed of a material having optical transparency like the first light-guiding member 108. The second light-guiding member 109 is a ring-shaped element interposed between the light-receiving portion 117 of the first light-guiding member 108 and the base 3. The second light-guiding member 109 and the light-receiving portion 117, surround the columnar support 101.

The second light-guiding member 109 comprises a first surface 120 and a second surface 121. The first surface 120 curves to smoothly connect the peripheral surface 116b of the spherical portion 116 to the outer surface of the columnar support 101. The second surface 121 is curved arcuately along the first reflective surface 119, and is slightly separated from the first reflective surface 119. As a result, a gap 123 is formed between the second surface 121 and the first reflective surface 119.

As shown in FIGS. 13 and 14, the light-emitting module 103 comprises a ring-shaped substrate 125, and a plurality of packages 126 mounted on the substrate 125. The substrate 125 is concentrically supported on the seat 114 of the main body 107. Each package 126 has at least one LED 127 sealed with a sealing resin containing, for example, an optical diffusion material and a phosphor. The LED 127 is an example of a semiconductor light-emitting element.

The plurality of packages 126 are mounted on a surface of the substrate 125 close to the base 3. On the substrate 125, the packages 126 are arranged at regular intervals around the axis O1 of the LED lamp 100. As shown in FIG. 14, part of each package 126 faces the inner peripheral portion of the incidence surface 118 of the light-receiving portion 117. The remaining part of each package 126 projects between the light-receiving portion 117 and the columnar support 101. In view of this, in the sixth embodiment, the power supply circuit 5 inside the light-emitting module 100 and the columnar support 101 is located along the axis O1 of the LED lamp 100.

The reflective ring 104 is concentrically provided around the axis O1 of the LED lamp 100 between the light-receiving portion 117 and the columnar support 101. The reflective ring 104 is formed of, for example, a metal material such as aluminum. A recess 129 is formed in the outer peripheral surface of the reflective ring 104. The recess 129 is enclosed by the first reflective surface 119 of the light-receiving portion 117.

The inner surface of the recess 129 serves as a second reflective surface 130 subjected to, for example, mirror finishing. The second reflective surface 130 is opposed to the first reflective surface 119 and recessed arcuately away from the first reflective surface 119. The second reflective surface 130 is also opposed to those of the packages 126 located away from the incidence surface 118.

As shown in FIG. 13, an adiabatic member 132 is provided inside the main body 107. It is desirable to form the adiabatic member 132 of a material that has a higher allowable temperature limit than, for example, the light-emitting module 103, and exhibits adiabatic performance where the thermal conductivity is not more than 0.3 W/mK. The allowable temperature limit of the adiabatic member 132 is not less than 100° C. A resin material having a high allowable temperature limit, such as, in particular, PC, PEEK or ABS, is preferable as the material of the adiabatic member 132.

Furthermore, the adiabatic member 132 may be formed of aluminum, stainless steel, iron, or a resin material having the above-mentioned allowable temperature limit, or a plurality of holes or uneven portions may be provided in the adiabatic member 132, or a cavity may be formed in the adiabatic member 132. In this structure, the thermal resistance of the adiabatic member 132 is increased by the spaces defined by the holes, the uneven portions or the cavity, compared to a case where the adiabatic member 132 is formed only of a metal or resin material.

In addition, if the adiabatic member 132 is in contact with other members, these members may have uneven portions and be located at a distance from the adiabatic member 132. In this case, the same advantage as in the case where the adiabatic member 132 has uneven portions can be obtained.

If the adiabatic member 132 faces other members, a spacer as another member, such as a metal, resin, sheet or tape member, may be interposed between the adiabatic member 132 and those members in order to maintain a gap therebetween. In this case, the same advantage as in the case where the adiabatic member 132 and/or those members have uneven portions can be obtained.

The inner or outer surface of the adiabatic member 132 and/or the surfaces of the members opposing the adiabatic member 132 may be formed to be glossy by, for example, polishing, coating, metal deposition, etc. In this case, radiation of heat from the adiabatic member 132 and the members is suppressed, and the thermal resistance of the adiabatic member 132 increases.

The space defined between the adiabatic member 132 and other components and the space inside the adiabatic member 132 may be decompressed. Further, a gas having a low thermal conductivity, such as argon or helium, may be filled in the space. In this case, the thermal resistance of the space increases.

The adiabatic member 132 may be formed of a fiber-based adiabatic material, such as glass wool, rock wool, cellulose fiber, carbonized cork, adiabatic wool material, or a foam insulation material, such as urethane foam, phenolic foam and polystyrene form, other adiabatic materials, such as aerogel, brick, concrete, or an epoxy-based heat-resistant adhesive, or a high heat-resistant paint. In addition, the adiabatic member 132 may be formed by combining various kinds of thermal insulation materials as described above. There are no particular limitations on the material of the adiabatic member 132.

The adiabatic member 132 covers the entire inner surfaces of a region of the heat transfer portion 110 of the main body 107 except for a bottom 110a, also covers the entire inner surface of the light-source support portion 111, and closes the opening 113 of the light-source support portion 111 from inside the heat transfer portion 110. In other words, the adiabatic member 132 thermally isolates the region inside the main body 107 from the light-emitting module 103.

The adiabatic member 132 has an opening 133 at a position corresponding to the bottom 110a of the heat transfer portion 110. A flange 134 is formed along the edge of the opening 133. The flange 134 continuously extends along the periphery of the opening 133, and is inserted through the heat transfer portion 110.

The flange 134 of the adiabatic member 132 partitions the heat transfer portion 110 of the main body 107 into a first portion 107a and a second portion 107b. The first portion 107a is an example of the first region. The first portion 107a includes a region ranging from the light-source support portion 111 to the bottom 110a of the heat transfer portion 110. The second portion 107b is an example of the second region. The first portion 107a includes the bottom 110a of the heat transfer portion 110. Thus, the surface area of the first portion 107a is significantly larger than that of the second portion 107b.

Further, the flange 134 of the adiabatic member 132 thermally isolates the first portion 107a of the main body 107 from the second portion 107b of the same. As a result, transfer of heat is suppressed between the first and second portions 107a and 107b.

In the sixth embodiment, considering easiness of assemblage of the LED lamp 100, it is desirable to divide the spherical main body 107 and the spherical first light-guiding member 108 into a plurality of elements along the axis O1 of the LED lamp 100, or along a line perpendicular to the axis O1. The resultant elements are assembled into one structure by bonding them using, for example, an adhesive.

As shown in FIG. 13, the region inside the main body 107 is partitioned by a first adiabatic wall 136a into two chambers, i.e., a first chamber 137a and a second chamber 137b. It is preferable to form the first adiabatic wall 136a of a material that exhibits adiabatic performance equivalent to that of the adiabatic member 132.

The first adiabatic wall 136a extends along the axis O1 of the LED lamp 100 in an eccentric position with respect to the axis O1. A greater part of the outer peripheral edge of the first adiabatic wall 136a is joined to the adiabatic member 132. The remaining part of the outer peripheral edge of the first adiabatic wall 136a extends to the interior of the second portion 107b of the main body 107 through the opening 133 of the adiabatic member 132, and extends through the second portion 107b to be exposed to the clearance 141.

Thus, the first and second chambers 137a and 137b are kept to be thermally isolated from each other by the adiabatic member 132 and the first adiabatic wall 136a. The volume of the first chamber 137a is greater than that of the second chamber 137b.

As shown in FIG. 13, a rechargeable battery 138 is accommodated in the first chamber 137a. The rechargeable battery 138 is an example of an accessory component. The rechargeable battery 138 is electrically connected to the power supply circuit 5 and the light-emitting module 103. The rechargeable battery 138 produces heat during charging and discharging. The rechargeable battery 138 is thermally coupled to the second portion 107b of the main body 107 through a filler, such as silicone, or through a metal, ceramic or plastic member. In the sixth embodiment, the rechargeable battery 138 has a size which occupies a greater part of the first chamber 137a.

A charge/discharge circuit 139 is accommodated in the second chamber 137b. The charge/discharge circuit 139 is an example of a component having an additional function, and is electrically connected to the rechargeable battery 138.

The charge/discharge circuit 139 comprises a plurality of circuit elements mounted on a printed circuit board. Some of the circuit elements produce heat during operation. The charge/discharge circuit 139 is thermally coupled to the second portion 107b of the main body 107 by a filler, such as silicone, or by a metal, ceramic or plastic member.

In the sixth embodiment, the rechargeable battery 138 and the charge/discharge circuit 139 have different allowable temperature limits. Furthermore, the allowable temperature limits of the rechargeable battery 138 and the charge/discharge circuit 139 differ from the allowable temperature limit of the LEDs 127. More specifically, the allowable temperature limits of the rechargeable battery 138 and the charge/discharge circuit 139 are lower than that of the LEDs 127.

A second adiabatic wall 136b is interposed between the power supply circuit 5 and the light-emitting module 103. The second adiabatic wall 136b is diametrically inserted through the columnar support 101 to thereby thermally isolate the power supply circuit 5 from the light-emitting modules 103. It is desirable to form the second adiabatic wall 136b of a material that exhibits adiabatic performance equivalent to that of, for example, the first adiabatic wall 136a.

When direct-current voltage is applied to the light-emitting module 103 by the power supply circuit 5, a plurality of LEDs 127 emit light simultaneously. Part of the light emitted from the LEDs 127 is directly guided from the incidence surface 118 of the first light-guiding member 108 to the light-receiving portion 117 of the same, as is indicated by light beam C. The light having entered the light-receiving portion 117 passes therethrough and reaches the first reflective surface 119. Since the first reflective surface 119 is curved to cause greater part of the light guided thereto from the incidence surface 118 to totally internally reflect therefrom, the light totally internally reflected from the first reflective surface 119 passes through the light-receiving portion 117 to the spherical portion 116 of the first light-guiding member 108.

In contrast, the light included in the LEDs 127 and displaced from the incidence surface 118 is directed to the second reflective surface 130 of the reflective ring 104, as is indicated by light beam D in FIG. 14. The second reflective surface 130 reflects greater part of light from the LEDs 127 to the first reflective surface 119 of the light-receiving portion 117. The light reflected from the second reflective surface 130 is guided from the first reflective surface 119 to the light-receiving portion 117, and then to the spherical portion 116 of the first light-guiding member 108 through the light-receiving portion 117.

The light, which has entered the spherical portion 116 and whose incidence angle is not less than a critical angle, i.e., the light that satisfies the total reflection condition, is directed from the base 3 side to the bottom of the spherical portion 116 through the interior of the wall of the spherical portion 116, while repeating its total reflection between the inner and outer peripheral surfaces 116a and 116b of the spherical portion 116.

In contrast, the light, which has entered the spherical portion 116 and has been diffused by diffusion marks on the inner peripheral surface 116a of the spherical portion 116, i.e., the light that does not satisfy the total reflection condition, is emitted through the spherical portion 116 to the outside of the globe portion 102 without total reflection.

The light, which has entered the light-receiving portion 117 of the first light-guiding member 108 and passed through the first reflective surface 119, is guided to the second light-guiding member 109 from the second surface 121 thereof. The light having entered the second light-guiding member 109 is guided from the first surface 120 toward the base 3 of the LED lamp 100.

As a result, light is emitted from the entire surfaces of the first and second light-guiding members 108 and 109, whereby the LED lamp 100 functions as a wide-distribution lighting device.

Further, an air layer exists between the heat transfer portion 110 of the main body 107 and the spherical portion 116 of the first light-guiding member 108. Accordingly, the light refracted by the inner peripheral surface 116a of the spherical portion 116 is directed to the outer surface of the heat transfer portion 110 through the air layer and reflected by the same. Thus, the light passing through the interior of the wall of the spherical portion 116 can be widely diffused, thereby further enhancing the light-guiding efficiency.

Therefore, the distribution angle of the light emitted from the outer peripheral surface 116b of the spherical portion 116 of the first light-guiding member 108 can be extended.

When the LED lamp 100 is turned on, the power supply circuit 5, the light-emitting module 103, the rechargeable battery 138 and the charge/discharge circuit 139 produce heat. The heat produced by the power supply circuit 5 is transmitted from the columnar support 101 to the second light-guiding member 109 and the base 3. The heat transmitted to the second light-guiding member 109 is dissipated to the environment through the first surface 120 of the second light-guiding member 109. The heat produced by the base 3 is dissipated to the outside of the LED lamp 100 through the base 3 and a socket (not shown).

The heat produced by the light-emitting module 103 is diffused to the first portion 107a of the heat transfer portion 110 through the seat 114 of the main body 107 and the light-source support portion 111 of the heat transfer portion 110. A clearance 141 larger than the wavelength λ of light emitted from the light-emitting module 103 is formed between the heat transfer portion 110 and the spherical portion 116 of the first light-guiding member 108 covering the heat transfer portion 110. An air layer in the clearance 141 thermally couples the heat transfer portion 110 to the spherical portions 116 of the first light-guiding member 108.

As a result, the heat of the light-emitting module 103 diffused to the first portion 107a of the heat transfer portion 110 is transmitted to the spherical portion 116 through the air layer, and is also dissipated to the environment through the outer peripheral surface 116b of the spherical portion 116.

On the other hand, the first chamber 137a accommodating the rechargeable battery 138 is thermally isolated by the adiabatic member 132 from the first portion 107a of the heat transfer portion 110 to which the heat of the light-emitting module 103 is transmitted. Accordingly, the heat produced by the rechargeable battery 138 is transmitted from the second portion 107b of the heat transfer portion 110 to the spherical portion 116 via the air layer, and then dissipated to the environment through the outer peripheral surface 116b of the spherical portion 116.

The second chamber 137b accommodating the charge/discharge circuit 139 is thermally isolated by the adiabatic member 132 from the first portion 107a of the heat transfer portion 110 to which the heat of the light-emitting module 103 is transmitted. In addition, the second chamber 137b is thermally isolated from the first chamber 137a by the first adiabatic wall 136a. Accordingly, the heat produced by the charge/discharge circuit 139 is transmitted to the spherical portion 116 via the air layer from the second portion 107b of the heat transfer portion 110, and then dissipated to the environment through the outer peripheral surface 116b of the spherical portion 116.

Furthermore, the first portion 107a of the heat transfer portion 110, to which the heat of the light-emitting module 103 is transmitted, is thermally isolated by the flange 134 of the adiabatic member 132 from the second portion 107b of the heat transfer portion 110, to which the heat of the rechargeable battery 138 and the charge/discharge circuit 139 is transmitted.

As a result, the heat of the light-emitting module 103 is prevented from being transmitted via the first portion 107a of the heat transfer portion 110 to the first chamber 137a accommodating the rechargeable battery 138, and to the second chamber 137b accommodating the charge/discharge circuit 139. Similarly, the heat of the rechargeable battery 138 and the charge/discharge circuit 139 is prevented from being transmitted via the first portion 107a of the heat transfer portion 110 to the light-source support portion 111 that supports the light-emitting module 103.

In addition, the outer peripheral edge of the first adiabatic wall 136a interposed between the first and second chambers 137a and 137b is inserted through the second portion 107b of the heat transfer portion 110. Accordingly, the heat of the rechargeable battery 138 is prevented from being transmitted via the second portion 107b to the second chamber 137b accommodating the charge/discharge circuit 139. Similarly, the heat of the charge/discharge circuit 139 is prevented from being transmitted via the second portion 107b to the first chamber 137a accommodating the rechargeable battery 138.

Therefore, the first chamber 137a can be maintained in a temperature environment corresponding to the allowable temperature limit of the rechargeable battery 138. Similarly, the second chamber 137b can be maintained in a temperature environment corresponding to the allowable temperature limit of the charge/discharge circuit 139.

It is evident from the above that the heat of the light-emitting module 103 can be positively transmitted to the main body 107, regardless of the allowable temperature limits of the power supply circuit 5, the rechargeable battery 138 and the charge/discharge circuit 139. Accordingly, the total luminous flux of the LED lamp 100 can be increased using higher-output LEDs 127.

For instance, when the LED lamp 100 is engaged with a socket in the ceiling, it is turned on in a vertical attitude, with the base 3 located upward. When the LED lamp 100 is in the on-state, the heat dissipated from the outer peripheral surface 116b of the spherical portion 116 of the first light-guiding member 108 warms the air around the globe portion 102.

The warmed air around the globe portion 102 drifts upward by natural convection along the outer peripheral surface 116b of the spherical portion 116. This air cools the outer peripheral surface 116b of the spherical portion 116.

In the sixth embodiment, since the light-emitting module 103 as one of the heating sources is located near the base 3, the temperature of the spherical portion 116 of the first light-guiding member 108 is highest near the base 3, and lowest near the bottom of the spherical portion 116 located below the base 3. Thus, the air upwardly drifting along the outer peripheral surface 116b of the spherical portion 116 increases as it approaches the base 3.

In the sixth embodiment, the light-emitting module 103 having a higher allowable temperature limit than the rechargeable battery 138 and the charge/discharge circuit 139 is provided near the base 3. Therefore, although the temperature of the air drifting upward along the outer peripheral surface 116b of the spherical portion 116 is highest near the base 3, this does not adversely affect the heat-resistance performance of the light-emitting module 103.

Further, when the air drifting upward due to natural convection contacts the lower end of the spherical portion 116, its temperature is lower than near the base 3. Therefore, the lower end of the spherical portion 116 including its bottom is efficiently cooled by natural convection. This enables the rechargeable battery 138 and the charge/discharge circuit 139 surrounded by the spherical portion 116 to exhibit sufficient heat dissipation performance.

Seventh Embodiment

FIG. 15 shows a seventh embodiment associated with the sixth seventh embodiment. In an LED lamp 100 according to the seventh embodiment, a plurality of projections 150 are formed integral as one body with the inner peripheral surface 116a of the spherical portion 116 of the first light-guiding member 108. The projections 150 are formed, for example, hemispheric, and are dispersed in a wide area on the inner peripheral surface 116a of the spherical portion 116. The top of each projection 150 is in contact with the outer surface of the heat transfer portion 110 of the main body 107.

As a result, a clearance 151 corresponding to the height of the projections 150 is formed between the outer surface of the heat transfer portion 110 and the inner peripheral surface 116a of the spherical portion 116. Because of the existence of the clearance 151, the light passing through the interior of the first light-guiding member 108, and reaching the inner peripheral surface 116a of the spherical portion 116 exhibits total reflection. Furthermore, the clearance 151 functions as an air layer that thermally couples the heat transfer portion 110 to the spherical portions 116 of the first light-guiding member 108.

Also in the seventh embodiment constructed as the above, the heat of the light-emitting module 103 can be positively transmitted to the main body 107, regardless of the allowable temperature limits of the power supply circuit 5, the rechargeable battery 138 and the charge/discharge circuit 139. Thus, the seventh embodiment can provide the same advantage as the sixth embodiment.

Eighth Embodiment

FIG. 16 shows an eighth embodiment. An LED lamp 100 according to the eighth embodiment comprises two types of light sources. One of the light sources is the COB-type light-emitting module 4 used in the third embodiment. The other light source is the SMD-type light-emitting module 103 used in the sixth embodiment. In the eighth embodiment, elements similar to those of the third and sixth embodiments are denoted by corresponding reference numbers, and no detailed description will be given thereof.

As shown in FIG. 16, the main body 107 is divided into the first to third heat transfer portions 163a, 163b and 163c by the first and second adiabatic members 161 and 162. The first heat transfer portion 163a is an example of the first region. The first heat transfer portion 163a includes a bottom 110a in which the COB type light-emitting module 4 is embedded. The second heat transfer portion 163b is an example of the second region. The second heat transfer portion 163b includes a light-source support portion 111 that supports the SMD type light-emitting module 103. The third heat transfer portion 163c is an example of the third area, and is interposed between the first and second heat transfer portions 163a and 163b.

It is desirable to form the first and second adiabatic members 161 and 162 of a material, which, for example, has a higher allowance temperature limit than the light-emitting modules 4 and 103, and exhibits adiabatic performance where the thermal conductivity is not more than 0.3 W/mK. The allowable temperature limit of each of the first and second adiabatic members 161 and 162 is not less than 100° C. A resin material having a high allowable temperature limit, such as, in particular, PC, PEEK or ABS, is preferable as the material of each of the first and second adiabatic members 161 and 162.

Furthermore, the adiabatic members 161 and 162 may be formed of aluminum, stainless steel, iron, or a resin material having the above-mentioned allowable temperature limit, or a plurality of holes or uneven portions may be provided in each of the first and second adiabatic members 161 and 162, or a cavity may be formed in each of the first and second adiabatic members 161 and 162. In this structure, the thermal resistance of the first and second adiabatic members 161 and 162 is increased by the spaces defined by the holes, the uneven portions or the cavity, compared to a case where these adiabatic members are formed only of a metal or resin material.

In addition, if the first and second adiabatic members 161 and 162 are in contact with other members, these members may have uneven portions and be located at a distance from the adiabatic members. In this case, the same advantage as in the case where the first and second adiabatic members 161 and 162 have uneven portions can be obtained.

If each of the first and second adiabatic members 161 and 162 faces other members, a spacer as another member, such as a metal, resin, sheet or tape member, may be interposed between each of the first and second adiabatic members 161 and 162 and those members in order to maintain a gap therebetween. In this case, the same advantage as in the case where the first and second adiabatic members 161 and 162 and/or those members have uneven portions can be obtained.

The inner or outer surface of each of the first and second adiabatic members 161 and 162 and/or the surfaces of the members opposing a corresponding one of the adiabatic members 161 and 162 may be formed to be glossy by, for example, polishing, coating, metal deposition, etc. In this case, radiation of heat from the first and second adiabatic members 161 and 162 and the members is suppressed, and the thermal resistance of the first and second adiabatic members 161 and 162 increases.

The space defined between each of the first and second adiabatic members 161 and 162 and other components and the space inside each of the first and second adiabatic members 161 and 162 may be decompressed. Further, a gas having a low thermal conductivity, such as argon or helium, may be filled in the space. In this case, the thermal resistance of the space increases.

The first and second adiabatic members 161 and 162 may be formed of a fiber-based adiabatic material, such as glass wool, rock wool, cellulose fiber, carbonized cork, adiabatic wool material, or a foam insulation material, such as urethane foam, phenolic foam and polystyrene form, other adiabatic materials, such as aerogel, brick, concrete, or an epoxy-based heat-resistant adhesive, or a high heat-resistant paint. In addition, the first and second adiabatic members 161 and 162 may be formed by combining various kinds of thermal insulation materials as described above. There are no particular limitations on the material of each of the first and second adiabatic members 161 and 162.

The first adiabatic member 161 is stacked on the inner surface of the first heat transfer portion 163a to cover the entire inner surface of the same. A flange 161a is formed on the outer peripheral edge of the first adiabatic member 161. The flange 161a continuously extends along the periphery of the main body 107 around the axis O1 of the LED lamp 100, and is interposed between the first and third heat transfer portions 163a and 163c.

Thus, the flange 161a of the first adiabatic member 161 thermally isolates the first and third heat transfer portions 163a and 163c. As a result, transfer of heat is suppressed between the first and third heat transfer portions 163a and 163c.

The second adiabatic member 162 is stacked on the inner surface of the second heat transfer portion 163b having the light support portion 111 to cover the entire inner surface of the second heat transfer portion 163b. A flange 162a is formed on the outer peripheral edge of the second adiabatic member 162. The flange 162a continuously extends along the periphery of the main body 107 around the axis O1 of the LED lamp 100, and is interposed between the second and third heat transfer portions 163b and 163c.

Thus, the second adiabatic member 162 thermally isolates the second and third heat transfer portions 163b and 163c. As a result, transfer of heat is suppressed between the second and third heat transfer portions 163b and 163c.

As shown in FIG. 16, a portion of the first light-guiding member 108, which includes the bottom of the spherical portion 116, covers the light-emitting surface 14 of the light-emitting module 4 located at the bottom 110a of the main body 107. A diffusion lens 165 is embedded in a portion of the spherical portion 116 that opposes the light-emitting surface 14 of the light-emitting module 4. The diffusion lens 165 is formed of a material having optical transparency, such as acrylic, polycarbonate, cycloolefin or glass. The diffusion lens 165 is located coaxial with the light-emitting module 4, the center of the lens crossing the axis O1 of the LED lamp 100.

The diffusion lens 165 is configured to guide, to the outside of the globe portion 102, part of the light entering the spherical portion 116 of the first light-guiding member 108 through the light-emitting surface 14, and to reflect the remaining part of the light to the interior of the wall of the spherical portion 116.

As shown in FIG. 16, a region inside the main body 107, which is covered by the first and second adiabatic members 161 and 162, is divided by a first adiabatic wall 166a into two chambers, i.e., a first chamber 167a and a second chamber 167b. It is desirable to form the first adiabatic wall 166a of a material that exhibits adiabatic performance equivalent to that of the first and second adiabatic members 161 and 162.

The first adiabatic wall 166a extends perpendicular to the axis O1 of the LED lamp 100 in a position corresponding to the third heat transfer portion 163c of the main body 107. The outer peripheral edge of the first adiabatic wall 166a is inserted through the third heat transfer portion 163c and exposed to the clearance 141.

As a result, the first chamber 167a is located between the first adiabatic member 161 and the first adiabatic wall 166a so that it is adjacent to the bottom 110a of the heat transfer portion 110 in which the COB-type light-emitting module 4 is embedded. Similarly, the second chamber 167b is located between the second adiabatic member 162 and the first adiabatic wall 166a so that it is adjacent to the light-source support portion 111 of the heat transfer portion 110 that supports the SMD-type light-emitting module 103.

Further, the outer peripheral edge of the first adiabatic wall 166a thermally divides the third heat transfer portion 163c of the main body 107 into a first portion 170a exposed to the first chamber 167a, and a second portion 170b exposed to the second chamber 167b. As a result, the first and second chambers 167a and 167b are thermally isolated from each other, whereby transfer of heat between them is restricted.

As shown in FIG. 16, a rechargeable battery 168 is accommodated in the first chamber 167a. The rechargeable battery 168 is an example of an accessory component. The rechargeable battery 168 is electrically connected to the power supply circuit 5 and the two light-emitting modules 4 and 103. The rechargeable battery 168 produces heat when it charges and discharges. The rechargeable battery 168 is thermally coupled to the first portion 170a of the third heat transfer portion 163c through a filler, such as silicone, or through a metal, ceramic or plastic member. The rechargeable battery 168 has a size which occupies a greater part of the first chamber 167a.

The charge/discharge circuit 169 is accommodated in the second chamber 167b. The charge/discharge circuit 169 is an example of a component having an additional function, and is electrically connected to the rechargeable battery 168. The charge/discharge circuit 169 comprises a plurality of circuit elements mounted on a printed circuit board. Some of the circuit elements produce heat during operation. The charge/discharge circuit 169 is thermally coupled to the second portion 170b of the third heat transfer portion 163c by a filler, such as silicone, or by a metal, ceramic or plastic member.

In the eighth embodiment, the rechargeable battery 168 and the charge/discharge circuit 169 have different allowable temperature limits. Further, the allowable temperature limits of the rechargeable battery 168 and the charge/discharge circuit 169 differ from that of LEDs 11 and 127. More specifically, the allowable temperature limits of the rechargeable battery 168 and the charge/discharge circuit 169 are lower than that of LEDs 11 and 127.

A second adiabatic wall 166b is interposed between the power supply circuit 5 and the light-emitting module 103. The second adiabatic wall 166b is diametrically inserted through the columnar support 101 to thereby thermally isolate the power supply circuit 5 from the light-emitting modules 103. It is desirable to form the second adiabatic wall 166b of a material which exhibits adiabatic performance equivalent to that of, for example, the first adiabatic wall 166a.

In the eighth embodiment, the light emitted from the COB-type light-emitting module 4 enters the diffusion lens 165. Part of the light entering the diffusion lens 165 is guided therethrough and emitted to the outside of the globe portion 102. The remaining part of the light reflects at the interface between the diffusion lens 165 and the spherical portion 116 of the first light-guiding member 108, and enters the interior of the wall of the spherical portion 116.

The light, which is included in the light having entered the peripheral surface 116b of the spherical portion 116, and whose incidence angle with respect to the peripheral surface 116b is not less than a critical angle, i.e., the light that satisfies a total reflection condition, advances through the interior of the wall of the spherical portion 116 from the bottom thereof towards the base 3, while repeating total reflection between the inner and outer peripheral surfaces 116a and 116b of the spherical portion 116.

In contrast, the light, which is included in the light having entered the spherical portion 116, and is diffused by diffusion marks and does not satisfy the total reflection condition, passes through the spherical portion 116 to the environment, without being totally internally reflected by the outer peripheral surface 116b of the spherical portion 116.

The light emitted from the SMD type light-emitting module 103 passes through the light-receiving portion 117 of the first light-guiding member 108, and reaches the spherical portion 116, as in the sixth embodiment shown in FIGS. 13 and 14. The light, which is included in the light having entered the peripheral surface 116b of the spherical portion 116, and whose incidence angle with respect to the peripheral surface 116b is not less than a critical angle, i.e., the light that satisfies a total reflection condition, advances through the interior of the wall of the spherical portion 116 from the bottom thereof towards the base 3, while repeating total reflection between the inner and outer peripheral surfaces 116a and 116b of the spherical portion 116.

The light, which is included in the light having entered the spherical portion 116, and is diffused by diffusion marks and does not satisfy the total reflection condition, passes through the spherical portion 116 to the environment, without being totally internally reflected by the outer peripheral surface 116b of the spherical portion 116.

The light, which is included in the light having entered the light-receiving portion 117 of the first light-guiding member 108 and has passed through the first reflective surface 119, enters the second light-guiding member 109 through the second surface 121 thereof. The light having entered the second light-guiding member 109 is emitted from the first surface 120 toward the base 3 of the LED lamp 100.

As a result, light is emitted broadly from the first and second light-guiding members 108 and 109, whereby the LED lamp 1 functions as a lighting device of wide light distribution.

Further, since an air layer exists between the heat transfer portion 110 of the main body 107 and the spherical portion 116 of the first light-guiding member 108, the light refracted by the inner peripheral surface 116a of the spherical portion 116 is guided through the air layer to the outer surface of the heat transfer portion 110, and is reflected therefrom. Thus, the light passing through the interior of the wall of the spherical portion 116 can be widely diffused.

On the other hand, the heat produced by the light-emitting module 4 is transmitted to the first heat transfer portion 163a of the main body 107, and then transmitted from the first heat transfer portion 163a to the spherical portion 116 of the first light-guiding member 108 through the clearance 114 as the air layer.

The heat produced by the light-emitting module 103 is transmitted from the seat 114 of the main body 107 to the second heat transfer portion 163b of the main body 107 through the light-source support portion 111, and then transmitted from the second heat transfer portion 163b to the spherical portion 116 of the first light-guiding member 108 through the air layer of the clearance 114. Thus, the heat of the two light-emitting modules 4 and 103 is dissipated to the environment through the outer peripheral surface 116b of the spherical portion 116.

The heat produced by the power supply circuit 5 is transmitted from the columnar support 101 to the second light-guiding member 109 and the base 3. The heat transmitted to the second light-guiding member 109 is dissipated to the environment through the first field 120 of the second light-guiding member 109. The heat transmitted to the base 3 is dissipated to the outside of the LED lamp 100 through the base 3 and a socket.

The first chamber 167a accommodating the rechargeable battery 168 is thermally isolated by the first adiabatic member 161 from the first heat transfer portion 163a to which the heat of the light-emitting module 4 is transmitted. Moreover, the first chamber 167a is thermally isolated from the second chamber 167b by the first adiabatic wall 166a. Accordingly, the heat produced by the rechargeable battery 168 is transmitted from the first portion 170a of the third heat transfer portion 163c of the main body 107 to the spherical portion 116 through the air layer, and is dissipated to the environment through the outer peripheral surface 116b of the spherical portion 116.

The second chamber 167b accommodating the charge/discharge circuit 169 is thermally isolated by the second adiabatic member 162 from the second heat transfer portion 163b to which the heat of the light-emitting module 103 is transmitted. Moreover, the second chamber 167b is also thermally isolated from the first chamber 167a by the first adiabatic wall 166a. Accordingly, the heat produced by the charge/discharge circuit 169 is transmitted from the second portion 170b of the third heat transfer portion 163c to the spherical portion 116 through the air layer, and is dissipated to the environment through the outer peripheral surface 116b of the spherical portion 116.

Furthermore, in the eighth embodiment, the first heat transfer portion 163a, to which the heat of the light-emitting module 4 is transmitted, is thermally isolated by the flange 161a of the first adiabatic member 161 from the first portion 170a of the third heat transfer portion 163c, to which the heat of the rechargeable battery 168 is transmitted. This prevents the heat of the light-emitting module 4 from being transmitted from the first heat transfer portion 163a through the third heat transfer portion 163c to the first chamber 167a accommodating the rechargeable battery 168.

Similarly, the second heat transfer portion 163b, to which the heat of the light-emitting module 103 is transmitted, is thermally isolated by the flange 162a of the second adiabatic member 162 from the second portion 170b of the third heat transfer portion 163c, to which the heat of the charge/discharge circuit 169 is transmitted. This prevents the heat of the light-emitting module 103 from being transmitted from the second heat transfer portion 163b through the third heat transfer portion 163c to the second chamber 167b accommodating the charge/discharge circuit 169.

In addition, the first adiabatic wall 166a interposed between the first and second chambers 167a and 167b thermally divides the third heat transfer portion 163c of the heat transfer portion 110 into the first portion 170a exposed to the first chamber 167a and the second portion 170b exposed to the second chamber 167b, so that the first and second portions 170a and 170b are thermally isolated from each other. Accordingly, the heat of the rechargeable battery 168 can be prevented from being transmitted through the third heat transfer portion 163c to the second chamber 167b that accommodates the charge/discharge circuit 169. Similarly, the heat of the charge/discharge circuit 169 can be prevented from being transmitted through the third heat transfer portion 163c to the first chamber 167a that accommodates the rechargeable battery 168.

Therefore, the first chamber 167a can be maintained in a temperature environment corresponding to the allowable temperature limit of the rechargeable battery 168. Similarly, the second chamber 167b can be maintained in a temperature environment corresponding to the allowable temperature limit of the charge/discharge circuit 169.

It is evident from the above that the heat of the light-emitting modules 4 and 103 can be positively transmitted to the main body 107, regardless of the allowable temperature limits of the power supply circuit 5, the rechargeable battery 168 and the charge/discharge circuit 169. Accordingly, the total luminous flux of the LED lamp 100 can be increased using higher-output LEDs 11 and 127.

Ninth Embodiment

FIG. 17 shows a ninth embodiment. An LED lamp 100 according to the ninth embodiment differs from the sixth embodiment in the structure of the main body 107. The other structures of the LED lamp 100 are substantially the same as those in the sixth embodiment. Therefore, in the ninth embodiment, elements similar to those of the sixth embodiment are denoted by corresponding reference numbers, and no detailed description will be given thereof.

As shown in FIG. 17, the heat transfer portion 110 of the main body 107 is divided into two portions, i.e., a first heat transfer portion 171 as the first area, and a second heat transfer portion 172 as the second area. The first heat transfer portion 171 has a substantially hemispherical shape including the bottom 110a of the heat transfer portion 110. The second heat transfer portion 172 has a hemispherical shape including the light-source support portion 111.

The first and second heat transfer portions 171 and 172 are vertically separate from each other. In the ninth embodiment, the second heat transfer portion 172 has a larger surface area than the first heat transfer portion 171.

As shown in FIG. 17, the inner surface of the second heat transfer portion 172 is covered by an adiabatic member 174. The adiabatic member 174 is formed of a resin material, such as PEEK or ABS. It is desirable to form the adiabatic member 174 of a material, which, for example, has a higher allowance temperature limit than the light-emitting module 103, and exhibits adiabatic performance where the thermal conductivity is not more than 0.3 W/mK. The allowable temperature limit of the adiabatic member 174 is not less than 100° C. A resin material having a high allowable temperature limit, such as, in particular, PC, PEEK or ABS, is preferable as the material of the adiabatic member 174.

Furthermore, the adiabatic member 174 may be formed of aluminum, stainless steel, iron, or a resin material having the above-mentioned allowable temperature limit, or a plurality of holes or uneven portions may be provided in the adiabatic member 174, or a cavity may be formed in the adiabatic member 174. In this structure, the thermal resistance of the adiabatic member 174 is increased by the spaces defined by the holes, the uneven portions or the cavity, compared to a case where the adiabatic member is formed only of a metal or resin material.

In addition, if the adiabatic member 174 is in contact with other members, these members may have uneven portions and be located at a distance from the adiabatic members. In this case, the same advantage as in the case where the adiabatic member 174 has uneven portions can be obtained.

If the adiabatic member 174 faces other members, a spacer as another member, such as a metal, resin, sheet or tape member, may be interposed between the adiabatic member 174 and those members in order to maintain a gap therebetween. In this case, the same advantage as in the case where the adiabatic member 174 and/or those members have uneven portions can be obtained.

The inner or outer surface of the adiabatic member 174 and/or the surfaces of the members opposing the adiabatic member 174 may be formed to be glossy by, for example, polishing, coating, metal deposition, etc. In this case, radiation of heat from the adiabatic member 174 and the members is suppressed, and the thermal resistance of the adiabatic member 174 increases.

The space defined between the adiabatic member 174 and other components and the space inside the adiabatic member 174 may be decompressed. Further, a gas having a low thermal conductivity, such as argon or helium, may be filled in the space. In this case, the thermal resistance of the space increases.

The adiabatic member 174 may be formed of a fiber-based adiabatic material, such as glass wool, rock wool, cellulose fiber, carbonized cork, adiabatic wool material, or a foam insulation material, such as urethane foam, phenolic foam and polystyrene form, other adiabatic materials, such as aerogel, brick, concrete, or an epoxy-based heat-resistant adhesive, or a high heat-resistant paint. In addition, the adiabatic member 174 may be formed by combining various kinds of thermal insulation materials as described above. There are no particular limitations on the material of the adiabatic member 174.

As shown in FIG. 17, a plurality of relay members 176 are interposed the first and second heat transfer portions 171 and 172. Each relay member 176 is formed of, for example, a shape-memory alloy excellent in thermal conductivity. The relay members 176 have the property of varying its shape in accordance with the temperature of the second heat transfer portion 172 to which the heat of the LEDs 127 is transmitted.

More specifically, the relay members 176 store the allowable temperature limit of the rechargeable battery 168. The relay members 176 bridge the first and second heat transfer portions 171 and 172 when the temperature of the second heat transfer portion 172 is less than the allowable temperature limit of the rechargeable battery 168. In this case, the first and second heat transfer portions 171 and 172 are thermally coupled by the relay members 176.

In the ninth embodiment, the inner surface of the first heat transfer portion 171, the relay members 176, and the adiabatic member 174 that covers the second heat transfer portion 172 from inside, are exposed to the first and second chambers 137a and 137b. In other words, the first heat transfer portion 171 of the heat transfer portion 110 directly faces the rechargeable battery 138 accommodated in the first chamber 137a, and the charge/discharge circuit 139 accommodated in the second chamber 137b.

The heat produced by the LEDs 127 when the LED lamp 100 is in the on state is transmitted from the light-source support portion 111 of the heat transfer portion 110 to the first heat transfer portion 171 through the second heat transfer portion 172 and the relay members 176, whereby the heat of the LEDs 127 diffuses to the entire heat transfer portion 110. The heat of the LEDs 127 diffused to the heat transfer portion 110 is transmitted from the entire outer surface of the heat transfer portion 110 to the spherical portion 116 through the clearance 141 as an air layer, and then dissipated to the environment through the outer peripheral surface 116b of the spherical portion 116. Thus, a sufficient region for dissipating the heat of the LEDs 127 can be secured on the spherical portion 116, whereby the heat of the LEDs 127 can be positively dissipated to the environment.

If the temperature of the second heat transfer portion 172 reaches or exceeds the allowable temperature limit of the rechargeable battery 168, the relay members 176 inwardly deform in the space defined by the heat transfer portion 110, using, as a fulcrum, their proximal ends secured to the second heat transfer portion 172, as is indicated by the two-dot chain lines in FIG. 17. As a result, the relay members 176 are separated from the first heat transfer portion 171, whereby the first and second heat transfer portions 171 and 172 are thermally isolated from each other.

Accordingly, the heat of the LEDs 127 is prevented from being transmitted to the first heat transfer portion 171 exposed to the first and second chambers 137a and 137b, although the area of the heat transfer portion 110 that contributes to heat dissipation of the LEDs 127 decreases. As a result, the heat produced by the LEDs 127 is prevented from being transmitted to the rechargeable battery 138 and the charge/discharge circuit 139 that have lower allowable temperature limits than the light-emitting module 103, whereby the rechargeable battery 138 and the charge/discharge circuit 139 can be kept in proper temperature environment.

In addition, when the rechargeable battery 138 is charged in the OFF state of the LED lamp 100, the rechargeable battery 138 and the charge/discharge circuit 139 produce heat. Since at this time, the LEDs 127 do not produce heat, the temperature of the second heat transfer portion 172 of the heat transfer portion 110 is lower than the allowable temperature limit of the rechargeable battery 138. Accordingly, the relay members 176 keep bridging the first and second heat transfer portions 171 and 172, whereby the first and second heat transfer portions 171 and 172 are thermally coupled to each other by the relay members 176.

In this structure, the heat produced by the rechargeable battery 138 and the charge/discharge circuit 139 is transmitted from the first heat transfer portion 171 to the second heat transfer portion 172 through the relay members 176, whereby it is diffused to the entire heat transfer portion 110. The heat diffused to the heat transfer portion 110 and charge/discharge circuit 139 is transmitted from the entire outer surface of the heat transfer portion 110 to the spherical portion 116 via the air layer, and is then dissipated to the environment through the peripheral surface 116b of the spherical portion 116.

Therefore, a sufficient region for dissipating the heat of the rechargeable battery 138 and the charge/discharge circuit 139 can be secured on the spherical portion 116, whereby excessive heating of the rechargeable battery 138 and the charge/discharge circuit 139 during charging can be avoided.

The structure for changing the surface area of the heat transfer portion 110 is not limited to the ninth embodiment. For example, a sensor for detecting the temperature of the rechargeable battery 138, and an actuator that operates upon receiving a signal from the sensor, may be combined. In this structure, the first and second heat transfer portions 171 and 172 of the main body 107 can be connected so that they can be selectively isolated from each other, using an actuator.

Tenth Embodiment

Figure 18:
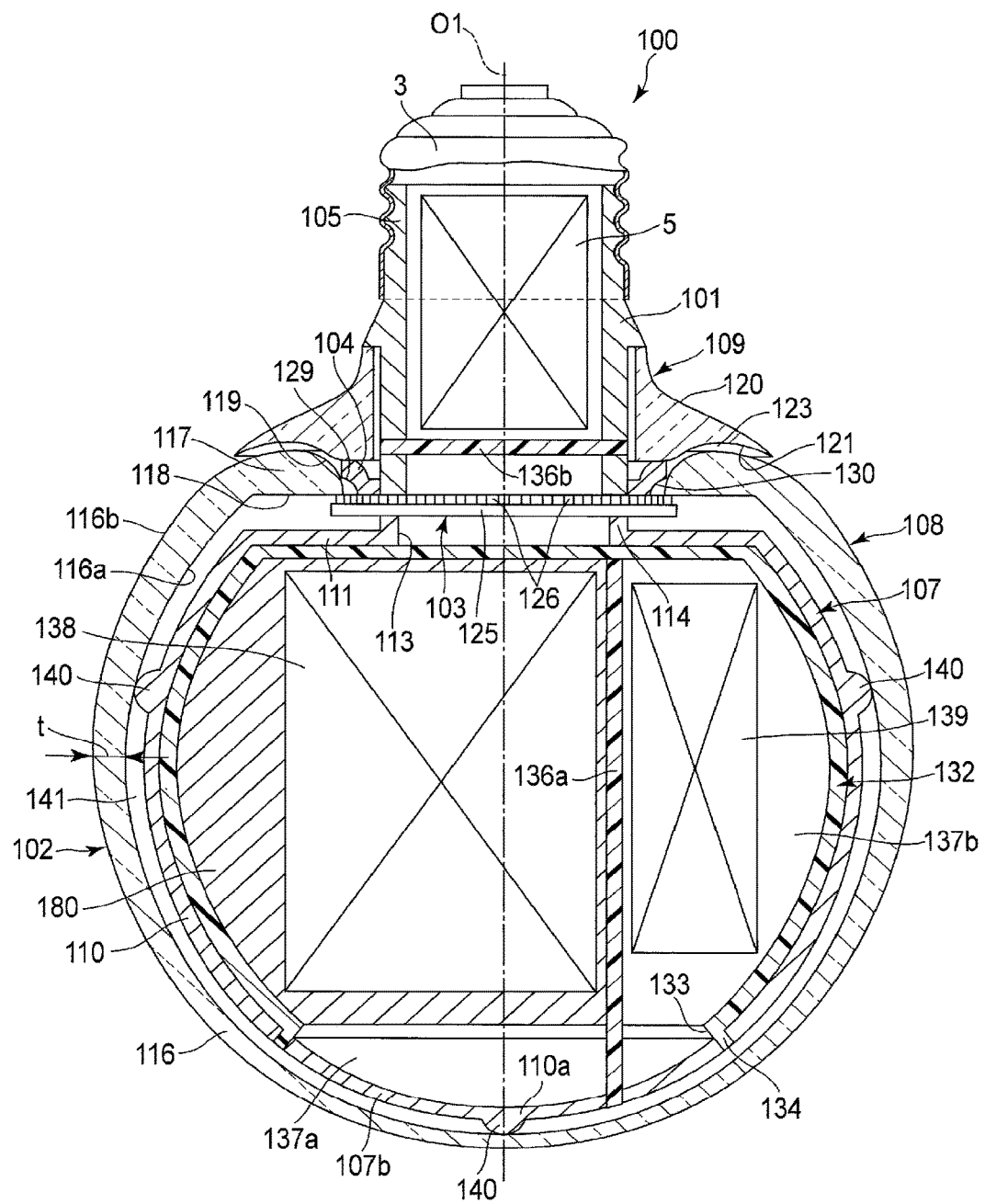
FIG. 18 is a cross-sectional view showing an LED lamp of a spherical bulb shape according to a tenth embodiment.
Figure 19:
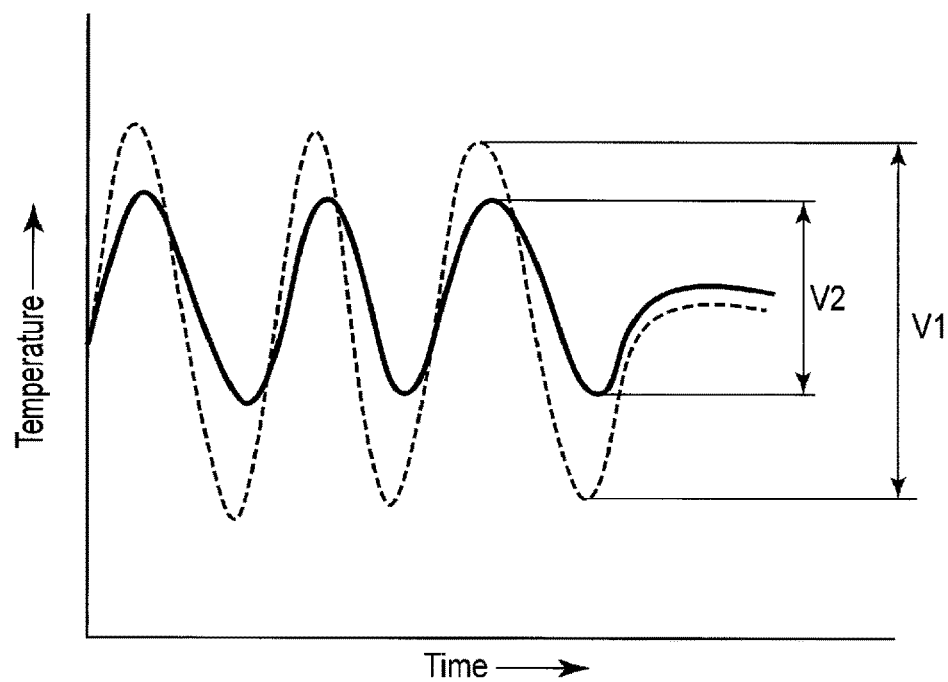
FIG. 19 is a graph showing the relationship between the temperature and time of a rechargeable battery in the tenth embodiment.

FIGS. 18 and 19 show a tenth embodiment. The tenth embodiment is based on the LED lamp 100 of the sixth embodiment.

In the LED lamp 100 of the tenth embodiment, the first chamber 137a of the heat transfer portion 110 is filled with a heat storage medium 180. The heat storage medium 180 covers the rechargeable battery 138 accommodated in the first chamber 137a. The heat storage medium 180 is formed of a material having a significantly greater thermal capacity than air. As the material having a greater thermal capacity than air, a metal material, such as copper or iron, a resin material, such as PBS or PEEK, or a phase change material, such as paraffin, can be used.

In a state where the base 3 of the LED lamp 100 is connected to a socket, the rechargeable battery 138 repeats charge and discharge. Since the rechargeable battery 138 produces heat during charging, its temperature rises with time.

When the rechargeable battery 138 has been charged, its temperature gradually decreases. That is, when the rechargeable battery 138 repeats charge and discharge in the first chamber 137a, its temperature fluctuates in a particular cycle as indicated by the broken-line curve in FIG. 19. More specifically, the broken-line curve in FIG. 19 indicates width V1 of fluctuation in the temperature of the rechargeable battery 138 observed when the rechargeable battery 138 is exposed to the first chamber 137a.

In the tenth embodiment, the heat produced by the rechargeable battery 138 is transmitted from the second portion 107b of the heat transfer portion 107 to the spherical portion 116 through the air layer in the clearance 141, and is dissipated to the environment through the outer peripheral surface 116b of the spherical portion 116.

Further, in the tenth embodiment, the rechargeable battery 138 in the first chamber 137a is covered with the heat storage medium 180. The heat storage medium 180 absorbs part of the heat produced by the rechargeable battery 138. The heat of the rechargeable battery 138 absorbed in the heat storage medium 180 is gradually released therefrom with lapse of time when charging of the rechargeable battery 138 is completed and no more heat is generated.

When the rechargeable battery 138 repeats charge and discharge in the first chamber 137a, resultant width V2 of fluctuation in the temperature of the rechargeable battery 138 is smaller than fluctuation width V1, as is indicated by the solid-line curve in FIG. 19. Therefore, degradation in the performance of the rechargeable battery 138 due to a temperature change can be suppressed as much as possible, thereby extending the life of the rechargeable battery 138.

Eleventh Embodiment

FIGS. 20 to 22 show an eleventh embodiment. An LED lamp 100 according to the eleventh embodiment differs from the sixth embodiment in the structure inside the main body 107. The other structures of the LED lamp 100 are substantially the same as those in the sixth embodiment. Therefore, in the eleventh embodiment, elements similar to those of the sixth embodiment are denoted by corresponding reference numbers, and no detailed description will be given thereof.

As shown in FIG. 20, the main body 107 is divided into first to third heat transfer portions 193a, 193b and 193c by first and second adiabatic members 191 and 192. The first heat transfer portion 193a is an example of the first region. The first heat transfer portion 193a includes the light-source support portion 111 supporting the SMD-type light-emitting module 103, the bottom 110a of the heat transfer portion 111, and an arcuate portion included in the heat transfer portion 110 and connecting the light-source support portion 111 to the bottom 110a. Further, the center of the bottom 110a of the first heat transfer portion 193a crosses the axis O1 of the LED lamp 100.

The second heat transfer portion 193b is an example of the second region. The second heat transfer portion 193b includes a hemispherical portion that is included in the main body 107 and connects the light-source support portion 111 to the bottom 110a of the heat transfer portion 110. Similarly, the third heat transfer portion 193c includes a hemispherical portion that is included in the main body 107 and connects the light-source support portion 111 to the bottom 110a of the heat transfer portion 110. In other words, the first heat transfer portion 193a is circumferentially interposed between the second and third heat transfer portions 193b and 193c.

It is desirable to form the first and second adiabatic members 191 and 192 of a material, which, for example, has a higher allowance temperature limit than the light-emitting module 103, and exhibits adiabatic performance where the thermal conductivity is not more than 0.3 W/mK. The allowable temperature limit of each of the first and second adiabatic members 191 and 192 is not less than 100° C. A resin material having a high allowable temperature limit, such as, in particular, PC, PEEK or ABS, is preferable as the material of each of the first and second adiabatic members 191 and 192.

The first adiabatic member 191 is accommodated in the main body 107, and has its outer peripheral edge 191a interposed between the first and second heat transfer portions 193a and 193b. The outer peripheral edge 191a of the first adiabatic member 191 thermally isolates the first and second heat transfer portions 193a and 193b. Thereby, transfer of heat between the first and second heat transfer portions 193a and 193b is suppressed.

The second adiabatic member 192 is accommodated in the main body 107, and has its outer peripheral edge 192a interposed between the first and second heat transfer portions 193a and 193b. The outer peripheral edge 192a of the second adiabatic member 192 thermally isolates the first and third heat transfer portions 193a and 193c. Thereby, transfer of heat between the first and third heat transfer portions 193a and 193c is suppressed.

Furthermore, the first and second adiabatic members 191 and 192 divide the main body 107 into the first or third chamber 194a, 194b and 194c. The axis O1 of the LED lamp 100 also serves as the axis of first chamber 194a that is surrounded by the first heat transfer portion 193a of the main body 107 and first and second adiabatic members 191 and 192.

The second chamber 194b is surrounded by the second heat transfer portion 193b of the main body 107 and the first adiabatic member 191. Similarly, the third chamber 194c is surrounded by the third heat transfer portion 193c of the main body 107 and the second adiabatic member portion 192.

As shown in FIGS. 20 to 22, the globe portion 102 has first to sixth vents 196a, 196b, 196c, 196d, 196e and 196f. The first to third vents 196a, 196b and 196c and the fifth and sixth vents 196e and 196f continuously extend through the heat transfer portion 110 of the main body 107 and the spherical portion 116 of the first light-guiding member 108. The fourth vents 196d extend through the spherical portion 116 of the first light-guiding member 108.

As shown in FIGS. 20 and 21, the first vents 196a are arranged at regular intervals in a region including the bottom 110a of the heat transfer portion 110, and open to the first chamber 194a. The second vents 196b are arranged at regular intervals in a region around the bottom 110a of the heat transfer portion 110, and open to the second chamber 194b. The third vents 196c are arranged at regular intervals in a region around the bottom 110a of the heat transfer portion 110, and open to the third chamber 194c.

As shown in FIGS. 20 and 22, the fourth vents 196d are arranged in the spherical portion 116 at regular circumferential intervals, surrounding the light-emitting module 103. The fourth vents 196d communicate with the first chamber 194a through a plurality of communication holes 197 formed in the light-source support portion 111 of the main body 107. The fifth vents 196e are located closer to the base 3 than the second vents 196b. The fifth vents 196e are arranged at regular circumferential intervals with respect to the main body 107, and open to the first and second chambers 194a and 194b. Similarly, the sixth vents 196f are located closer to the base 3 than the third vents 196c. The sixth vents 196f are arranged at regular circumferential intervals with respect to the main body 107, and open to the first and third chambers 194a and 194c.

Thus, the first vents 196a are arranged away from the fourth vents 196d, the second vents 196b are arranged away from the fifth vents 196e, and the third vents 196c are arranged away from the sixth vents 196f along the axis O1 of the LED lamp 100.

As shown in FIG. 20, the rechargeable battery 198 is accommodated in first chamber 194a. The rechargeable battery 198 is an example of an accessory member, and is electrically connected to the power supply circuit 5 and the light-emitting module 103. The rechargeable battery 198 produces heat during charge and discharge. In the eleventh embodiment, although the rechargeable battery 198 has a size that occupies a greater part of a space in the first chamber 194a, it is separate from the first and second adiabatic members 191 and 192 within the first chamber 194a. Thus, response clearances for air flow are secured between the rechargeable battery 198 and the first adiabatic member 191 and between the rechargeable battery 198 and the second adiabatic member 192.

The charge/discharge circuit 199 is accommodated in second chamber 194b. The charge/discharge circuit 199 is an example of an element having an additional function, and is electrically connected to the rechargeable battery 198. The charge/discharge circuit 199 has a plurality of circuit elements mounted on a printed circuit board. Some of the circuit elements produce heat during operation.

Furthermore, an overcharge prevention circuit 200 is accommodated in the third chamber 194c. The overcharge prevention circuit 200 is an example of an element having an additional function, and is electrically connected to the charge/discharge circuit 199. The overcharge prevention circuit 200 has a plurality of circuit elements mounted on the printed circuit board. Some of the circuit elements produce heat during operation.

In the eleventh the embodiment, the rechargeable battery 198, the charge/discharge circuit 199 and the overcharge prevention circuit 200 have different allowable temperature limits. Further, the allowable temperature limits of the rechargeable battery 198, the charge/discharge circuit 199 and the overcharge prevention circuit 200 are lower than the allowable temperature limit of the light-emitting module 103.

In the eleventh embodiment, when the LED lamp 100 is turned on, the power supply circuit 5 and the light-emitting module 103 produce heat. The heat produced by the power supply circuit 5 and the light-emitting module 103 is dissipated to the environment through the same path as in the sixth embodiment described above.

In contrast, when the rechargeable battery 198 is in a charging state, the rechargeable battery 198, the charge/discharge circuit 199 and the overcharge prevention circuit 200 produce heat. The heat produced by the rechargeable battery 198 warms air in the first chamber 194a. Similarly, the heat produced by the overcharge prevention circuit 200 warms air in the third chamber 194c.

Since the warm air in the first to third chambers 194a to 194c has a lower density than the air (external air) outside the LED lamp 100, it drifts upward. If, for example, the LED lamp 100 is vertically suspended from the ceiling, with the base 3 positioned at the top, the external air outside the LED lamp 100 flows into the first to third chambers 194a to 194c through the first to third vents 196a, 196b and 196c.

More specifically, the air flowing into the first chamber 194a through the first vent 196a cools the rechargeable battery 198 while passing through the first chamber 194a. Further, part of the air in the first chamber 194a circulates around the light-emitting module 103 through the communication holes 197 formed in the light-source support portion 111, thereby cooling the light-emitting module 103. The air having cooled the rechargeable battery 198 and the light-emitting module 103 is discharged to the outside of the globe portion 102 through the fourth vents 196d. This enhances the heat dissipation performance of the rechargeable battery 198 and the light-emitting module 103.

As is indicated by one of the broken-line arrows in FIG. 20, the air having entered the second chamber 194b through the second vent 196b flows around the charge/discharge circuit 199, thereby cooling the same. The air having cooled the charge/discharge circuit 199 is discharged to the outside of the globe portion 102 through the fifth vent 196e. This enhances the heat dissipation performance of the charge/discharge circuit 199.

Furthermore, as is indicated by the other broken-line arrow in FIG. 20, the air having entered the third chamber 194c through the third vents 196c flows around the overcharge prevention circuit 200, thereby cooling the same. The air having cooled the overcharge prevention circuit 200 is discharged to the outside of the globe portion 102 through the sixth vent 196f. This enhances the heat dissipation performance of the overcharge prevention circuit 200.

As described above, in the eleventh embodiment, the first to third vents 196a, 196b and 196c located at the lower end of the globe portion 102 function as air inlets, and the fourth to sixth vents 196d, 196e and 196f located around the base 3 function as air outlets.

If the total cross section of the air inlets are made to be almost equal to the total cross section of the air outlets in each of the first to third chambers 194a, 194b and 194c, substantially a maximum cooling effect can be obtained by law of mass conservation in association with the sum of the sections of the air inlets and outlets. The cross section of each of the air inlets and outlets is set perpendicular to the flow of the air.

In the eleventh embodiment, the rechargeable battery 198, the charge/discharge circuit 199 and the overcharge prevention circuit 200, which have allowable temperature limits lower than the light-emitting module 103, are accommodated in the first to third chambers 194a, 194b and 194c, respectively, that are thermally divided by the first and second adiabatic members 191 and 192. In addition, the rechargeable battery 198, the charge/discharge circuit 199 and the overcharge prevention circuit 200 are forcibly cooled by the air that circulates through the first to third chambers 194a, 194b and 194c.

In other words, the respective passages of the air for cooling the rechargeable battery 198, the charge/discharge circuit 199 and the overcharge prevention circuit 200 are thermally isolated from each other within the main body 107. That is, the heat of the light-emitting module 103 can be positively transmitted to the heat transfer portion 110 of the main body 107, regardless of the allowable temperature limits of the rechargeable battery 198, the charge/discharge circuit 199 and the overcharge prevention circuit 200. As a result, higher-output LEDs 127 can be used, and hence the total luminous flux of the LED lamp 100 can be increased.

Twelfth Embodiment

FIG. 23 shows a twelfth embodiment. An LED lamp 100 according to the twelfth embodiment differs from the sixth embodiment in the structures of the globe portion 205 and the light-emitting module 206. The other structures of the LED lamp 100 are substantially the same as those in the sixth embodiment. Therefore, in the twelfth embodiment, elements similar to those of the sixth embodiment are denoted by corresponding reference numbers, and no detailed description will be given thereof.

As shown in FIG. 23, the globe portion 205 comprises a main body 207 and a light-guiding member 208. The main body 207 has a heat transfer portion 210 and a support portion 211. The heat transfer portion 210 is a hollow member having an axis identical to the axis O1 of the LED lamp 100. The heat transfer portion 210 has a bottom 210a perpendicular to the axis O1. A flat light-source support surface 212 is formed on the bottom 210a. The light-source support surface 212 extends perpendicular to the axis O1.

The support portion 211 is the upper portion of the main body 207 and opposes the light-source support surface 212. The support portion 211 is formed by flattening part of the periphery of the heat transfer portion 210. The support portion 211 is formed like a disk horizontally extending around the axis O1.

In the twelfth embodiment, the heat transfer has a first portion 210b having the light-source support surface 212, and a second portion 210c having the support portion 211. The first portion 210b is an example of the first region. The second portion 210c is an example of the second region. The first and second portions 210b and 210c are formed hemispherical and have respective circular opening ends.

The light-guiding member 208 is a spherical hollow member that continuously covers the outer surface of the main body 207. The light-guiding member 208 is formed of a material having optical transparency, such as acrylic, polycarbonate, cycloolefin or glass.

The light-guiding member 208 comprises a base portion 215 in which a columnar support 101 is inserted, and a spherical portion 216 continuously extending from the base portion 215. The spherical portion 216 has an inner peripheral surface 216a and an outer peripheral surface 216b. The inner peripheral surface 216a of the spherical portion 216 faces the outer surface of the main body 207. The outer peripheral surface 216b constitutes the outer periphery of the LED lamp 100.

In the twelfth embodiment, the thickness t of the spherical portion 216 of the light-guiding member 208 is gradually increased from the bottom of the spherical portion 216, which is perpendicular to the axis O1 of the LED lamp 100, to the base portion 215.

As shown in FIG. 23, a region including the bottom of the spherical portion 216 of the light-guiding member 208 faces the light-source support surface 212. A diffusion lens 213 is embedded in a region that includes the bottom of the spherical portion 116. The diffusion lens 213 is formed of a material having optical transparency, such as acrylic, polycarbonate, cycloolefin or glass, and the center of the diffusion lens 213 coincides with the axis O1. The diffusion lens 213 is tapered toward the center of the light-source support surface 212.

A clearance 217 is formed between the inner peripheral surface 216a of the spherical portion 216 and the outer surface of the main body 207. The clearance 217 enables total reflection of light that passes through the interior of the light-guiding member 208 and reaches the inner peripheral surface 216a of the spherical portion 216. The clearance 217 can also be referred to as an air layer that permits thermal conduction from the main body 207 to the light-guiding member 208. The light-source support surface 212 of the heat transfer portion 210 is exposed to the clearance 217.

The light-emitting module 206 as a light source is supported by the light-source support surface 212 of the heat transfer portion 210. The light-emitting module 206 is exposed to the clearance 217. The light-emitting module 206 comprises, as main elements, a substrate 219 secured to the light-source support surface 212, and a plurality of LEDs 220 arranged in a matrix on the substrate 219. Each LED 220 is an example of a semiconductor light-emitting element. In the twelfth embodiment, blue LEDs that emit blue light with a wavelength of, for example, 450 nm are used. The LEDs 220 face the diffusion lens 213 through the clearance 217.

As shown in FIG. 23, an adiabatic member 223 is provided in the heat transfer portion 210 of the main body 207. It is desirable to form the adiabatic member 223 of a material, which, for example, has a higher allowance temperature limit than the light-emitting module 206, and exhibits adiabatic performance where the thermal conductivity is not more than 0.3 W/mK. The allowable temperature limit of the adiabatic member 223 is not less than 100° C. A resin material having a high allowable temperature limit, such as, in particular, PC, PEEK or ABS, is preferable as the material of the adiabatic member 223.

Furthermore, the adiabatic member 223 may be formed of aluminum, stainless steel, iron, or a resin material having the above-mentioned allowable temperature limit, or a plurality of holes or uneven portions may be provided in the adiabatic member 223, or a cavity may be formed in the adiabatic member 223. In this structure, the thermal resistance of the adiabatic member 223 is increased by the spaces defined by the holes, the uneven portions or the cavity, compared to a case where the adiabatic member is formed only of a metal or resin material.

In addition, if the adiabatic member 223 is in contact with other members, these members may have uneven portions and be located at a distance from the adiabatic members. In this case, the same advantage as in the case where the adiabatic member 223 has uneven portions can be obtained.

If the adiabatic member 223 faces other members, a spacer as another member, such as a metal, resin, sheet or tape member, may be interposed between the adiabatic member 223 and those members in order to maintain a gap therebetween. In this case, the same advantage as in the case where the adiabatic member 223 and/or those members have uneven portions can be obtained.

The inner or outer surface of the adiabatic member 223 and/or the surfaces of the members opposing the adiabatic member 223 may be formed to be glossy by, for example, polishing, coating, metal deposition, etc. In this case, radiation of heat from the adiabatic member 223 and the members is suppressed, and the thermal resistance of the adiabatic member 223 increases.

The space defined between the adiabatic member 223 and other components and the space inside the adiabatic member 223 may be decompressed. Further, a gas having a low thermal conductivity, such as argon or helium, may be filled in the space. In this case, the thermal resistance of the space increases.

The adiabatic member 223 may be formed of a fiber-based adiabatic material, such as glass wool, rock wool, cellulose fiber, carbonized cork, adiabatic wool material, or a foam insulation material, such as urethane foam, phenolic foam and polystyrene form, other adiabatic materials, such as aerogel, brick, concrete, or an epoxy-based heat-resistant adhesive, or a high heat-resistant paint. In addition, the adiabatic member 223 may be formed by combining various kinds of thermal insulation materials as described above. There are no particular limitations on the material of the adiabatic member 223.

The adiabatic member 223 covers the bottom 210a of the heat transfer portion 210 and the entire inner peripheral surface of the first portion 210b. The adiabatic member 223 has a flange 224. The flange 224 extends along the periphery of the heat transfer portion 210, and is interposed between the open ends of the first and second portions 210b and 210c of the heat transfer portion 210.

That is, the flange 224 of the adiabatic member 223 thermally isolates the first and second portions 210b and 210c of the heat transfer portion 210 from each other. As a result, transfer of heat is suppressed between the first and second portions 210b and 210c.

The region inside the main body 207, covered by the adiabatic member 223, is divided by a first adiabatic wall 225a into two chambers, i.e., a first chamber 226a and a second chamber 226b. It is desirable to form the first adiabatic wall 225a of a material that exhibits adiabatic performance equivalent to, for example, the adiabatic member 223.

The first adiabatic wall 225a extends along the axis O1 of the LED lamp 100 in an eccentric position with respect to the axis O1, and substantially the half of the outer peripheral edge of the wall 225a is joined to the adiabatic member 223. The remaining part of the outer peripheral edge of the first adiabatic wall 225a is joined to the second portion 210c and support portion 211 of the main body 207.

Thus, the first and second chambers 226a and 226b are maintained in a thermally isolated state via the adiabatic member 223 and the first adiabatic wall 225a. The volume of the first chamber 226a is larger than that of the second chamber 226b.

As shown in FIG. 23, a rechargeable battery 227 is accommodated in the first chamber 226a. The rechargeable battery 227 is an example of an accessory component. The rechargeable battery 227 is electrically connected to the power supply circuit 5 and the light-emitting module 206, and produces heat during charge and discharge. The rechargeable battery 227 is thermally coupled to the second portion 210c of the heat transfer portion 210 through a filler, such as silicone, or through a metal, ceramic or plastic member. In the twelfth embodiment, the rechargeable battery 227 has a size that occupies a greater part of the first chamber 226a.

A charge/discharge circuit 228 is accommodated in the second chamber 226b. The charge/discharge circuit 228 is an example of a component having an additional function, and is electrically connected to the rechargeable battery 227. The charge/discharge circuit 228 comprises a plurality of circuit elements mounted on a printed circuit board. Some of the circuit elements produce heat during operation. The charge/discharge circuit 228 is thermally coupled to the second portion 210c of the heat transfer portion 210 by a filler, such as silicone, or by a metal, ceramic or plastic member.

In the twelfth embodiment, the rechargeable battery 227 and the charge/discharge circuit 228 have different allowable temperature limits. Furthermore, the allowable temperature limits of the rechargeable battery 227 and the charge/discharge circuit 228 are lower than that of the LEDs 220.

A second adiabatic wall 225b is interposed between the power supply circuit 5 and the rechargeable battery 227. The second adiabatic wall 225b is diametrically inserted through the columnar support 101 to thereby thermally isolate the power supply circuit 5 from the rechargeable battery 227. It is desirable to form the second adiabatic wall 225b of a material that exhibits adiabatic performance equivalent to that of, for example, the first adiabatic wall 225a.

A phosphor film 221 is stacked on the inner peripheral surface 216a of the spherical portion 216 of the light-guiding member 208. The phosphor film 221 continuously covers the inner surface of the base portion 215 from the inner peripheral surface 216a of the spherical portion 216. Phosphor particles contained in the phosphor film 221 are excited by the light generated by the light-emitting diode 220, thereby generating light of a color as the complementary color of the light generated by the light-emitting diode 220.

More specifically, fluorescent particles absorb blue light generated by the light-emitting diode 220, thereby generating yellow light with a wavelength of about 560 nm. As a result, white light enters a region of the light-guiding member 208 including its bottom. Part of the light having entered the light-guiding member 208 is transmitted through the diffusion lens 213 to the outside of the globe portion 205. The remaining part of the light having entered the light-guiding member 208 is reflected by the diffusion lens 213 to the interior of the wall of the spherical portion 216 of the light-guiding member 208.

The light, which is included in the light having entered the spherical portion 216, and whose incidence angle with respect to the outer peripheral surface 216a of the spherical portion 216 is not less than a critical angle, i.e., the light that satisfies a total reflection condition, advances through the interior of the wall of the spherical portion 216 from the bottom of the spherical portion 216 towards the base 3, while repeating total reflection between the inner and outer peripheral surfaces 216a and 216b of the spherical portion 216.

In the twelfth embodiment, the phosphor film 221 stacked on the inner peripheral surface 216a of the spherical portion 216 functions as a diffusion mark film for diffusing light passing through the light-guiding member 208. The light, which has been diffused by the diffusion mark film and does not satisfy the total reflection condition, passes through the spherical portion 216 to the outside of the globe portion 205, without being totally internally reflected by the outer peripheral surface 216b of the spherical portion 216.

As a result, light is radiated from the entire surface of the light-guiding member 208, whereby the LED lamp 100 functions as a wide-distribution lighting device.

In the twelfth embodiment, since the phosphor film 221 is stacked on the inner peripheral surface 216a of the spherical portion 216 of the light-guiding member 208, it is separate from the LEDs 220 of the light-emitting module 206. Accordingly, even if the phosphor film 221 is excited to thereby produce heat, the heat of the phosphor film 221 is prevented from being directly transmitted to the LEDs 220.

This prevents an excessive increase in the temperature of the LEDs 220, and hence enables the life of the LEDs 220 to increase.

Furthermore, since the phosphor film 221 is stacked on the inner peripheral surface 216a of the spherical portion 216, the percentage of light returning from the phosphor film 221 to the LEDs 220 decreases. This suppresses loss of light, and enables white light to be efficiently radiated, to the environment, through the outer peripheral surface 216b of the spherical portion 216 of the light-guiding member 208.

In the twelfth embodiment, the phosphor film 221 is not limited to be stacked on the inner peripheral surface 216a of the spherical portion 216. For example, the phosphor film 221 may be stacked on the outer peripheral surface 216b of the spherical portion 216, as is indicated by the two-dot chain line, or on both the inner and outer peripheral surfaces 216a and 216b of the spherical portion 216.

In the twelfth embodiment, the phosphor film 221 is not limited to be stacked uniformly on the entire inner peripheral surface 216a of the spherical portion 216. For instance, portions of the phosphor film 221 near the light-emitting module 206 may be thin or sparse, and portions of the same away from the light-emitting module 206 may be thick or dense. This enables emission distribution on the surface of the LED lamp 100 to be uniformed.

In addition, the spherical light-guiding member 208 is not limited to a monolithic structure, but may be formed by combining a plurality of arbitrarily divided elements. For instance, if the light-guiding member 208 is divided into a plurality of elements along the axis O1, the light of the light-emitting module 206 can be easily guided to a position near the base 3. Further, if the light-guiding member 208 is divided into a plurality of elements perpendicularly to the axis O1, the light-guiding member 208 can have a better appearance, although the end faces of the divided elements must be processed to prevent reflection of light.

The divided elements may be joined by various welding methods, such as ultrasonic welding, oscillation welding, induction welding, high-frequency welding, semiconductor-laser welding, and thermal welding, spin welding, or by adhesion methods using, for example, an adhesive, double-sided tape and grease.

Thirteenth Embodiment

FIG. 24 shows a thirteenth embodiment. An LED lamp 100 according to the thirteenth embodiment differs from the sixth embodiment in the structure of the globe portion 102. The other structures of the LED lamp 100 are substantially the same as those in the sixth embodiment. Therefore, in the thirteenth embodiment, elements similar to those of the sixth embodiment are denoted by corresponding reference numbers, and no detailed description will be given thereof.

As shown in FIG. 24, the first chamber 137a accommodating rechargeable battery 138, and the second chamber 137b accommodating the charge/discharge circuit 139, are sealed spaces isolated from the outside the globe portion 102.

The inner surface of the main body 107 is separate from the adiabatic member 132. In other words, a first clearance 231 is defined between the inner surface of the main body 107 and the adiabatic member 132. The first clearance 231 may be formed by bringing a plurality of projections (not shown) extending from, for example, the inner surface of the main body 107 into contact with the surface of the adiabatic member 132, or by interposing a plurality of spacers (not shown) between the inner surface of the main body 107 and the adiabatic member 132. The first chamber 137a, the second chamber 137b and the first clearance 231 are maintained under vacuum or under near vacuum.

A second clearance 232 is defined between the main body 107 and the first light-guiding member 108. The second clearance 232 may be formed by bringing a plurality of projections (not shown) extending from the surface of the main body 107 into contact with the inner surface of the first light-guiding member 108 as in the sixth embodiment, or by bringing a plurality of projections (not shown) extending from the inner surface of the first light-guiding member 108 into contact with the surface of the main body 107 as in the seventh embodiment.

A gas having a higher thermal conductivity than air is sealed in the second clearance 232. As the gas, helium, hydrogen, etc., is preferable. Thus, the thermal conductivity of the second clearance 232 is set higher than the first chamber 137a, the second chamber 137b and the first clearance 231.

In the thirteenth embodiment, the adiabatic member 132 thermally isolates the light-emitting module 103 from the rechargeable battery 138, and also from the charge/discharge circuits 139. Further, the first chamber 137a accommodating rechargeable battery 138, the second chamber 137b accommodating the charge/discharge circuit 139, and the first clearance 231 defined between the main body 107 and the adiabatic member 132, are maintained under vacuum or under near vacuum.

As a result, transfer of heat is suppressed between the first chamber 137a, the second chamber 137b, the main body 107 and the adiabatic member 132. By virtue of the adiabatic member 132 and the vacuum atmosphere, the rechargeable battery 138 and the charge/discharge circuit 139 are further protected from thermal influence of the light-emitting module 103.

Furthermore, helium or hydrogen used in the thirteenth embodiment to seal the second clearance 232 is more superior than air in thermal conductivity. Accordingly, the heat of the light-emitting module 103, the rechargeable battery 138 and the charge/discharge circuit 139 transmitted to the main body 107 is efficiently transferred to the first light-guiding member 108 via helium or hydrogen, and is then dissipated to the environment from the outer peripheral surface 116b of the first light-guiding member 108.

Thus, the heat of the light-emitting module 103 can be positively transmitted to the main body 107, regardless of the allowable temperature limits of the rechargeable battery 138 and the charge/discharge circuit 139. This enables higher-output LEDs 127 to be used, whereby the total luminous flux of the LED lamp 100 can be increased.

Fourteenth Embodiment

FIG. 25 shows a fourteenth embodiment that is associated with the LED lamp 100 of the thirteenth embodiment. In the LED lamp 100 of the fourteenth embodiment, air is filled in the first chamber 137a, the second chamber 137b, the first clearance 231, and the second clearance 232.

As shown in FIG. 25, the inner surface of the adiabatic member 132 exposed to the first and second chambers 137a and 137b, the outer surface of the adiabatic member 132 exposed to the first clearance 231, and the inner surface of the main body 107 exposed to the first clearance 231, are formed as glossy surfaces 240 having a low thermal emissivity.

Further, the surface of the main body 107 exposed to the second clearance 232 is coated with paint of a high thermal emissivity. Thus, the outer surface of the main body 107 is a painted surface 241 capable of more easily emitting heat than the glossy surfaces 240.

As described above, in the fourteenth embodiment, the thermal emissivity between the main body 107 and the first light-guiding member 108 is set higher than the thermal emissivity between the main body 107 and the adiabatic member 132.

In the fourteenth embodiment, transfer of heat between the main body 107 and the adiabatic member 132 is suppressed by forming, as the glossy surfaces 240, the inner surface of the adiabatic member 132 exposed to the first and second chambers 137*a* and 137*b*, the outer surface of the adiabatic member 132 exposed to the first clearance 231, and the inner surface of the main body 107 exposed to the first clearance 231. Thus, the combination of the glossy surfaces and the adiabatic member 132 further enhances adiabatic performance between the light-emitting module 103 and the rechargeable battery 138, and between the light-emitting module 103 and the charge/discharge circuit 139.

Furthermore, the heat of the light-emitting module 103, the rechargeable battery 138 and the heat of charge/discharge circuit 139 transmitted to the main body 107 can be efficiently emitted to the second clearance 232 by making, as the painted surface 241, the outer surface of the main body 107 covered with the first light-guiding member 108.

As a result, the heat of the light-emitting module 103, the rechargeable battery 138 and the charge/discharge circuit 139 can be positively transmitted from the main body 107 to the first light-guiding member 108, thereby dissipating the heat to the environment through the outer peripheral surface 116*b* of the first light-guiding member 108.

This structure enables higher-output LEDs 127 to be used, regardless of the allowable temperature limits of the rechargeable battery 138 and the charge/discharge circuit 139, thereby increasing the total luminous flux of the LED lamp 100.

In the fourteenth embodiment, the first chamber 137*a*, the second chamber 137*b*, the first clearance 231 and the second clearance 232 are filled with air. However, the embodiment is not limited to this. For instance, the first chamber 137*a*, the second chamber 137*b* and the first clearance 231 may be set under vacuum or under near vacuum, and the second clearance 232 may be filled with a gas, such as helium or hydrogen.

Fifteenth Embodiment

FIG. 26 is a fifteenth embodiment. An LED lamp 100 according to the fifteenth embodiment differs from the sixth embodiment in the structure of the globe portion 102. The other structures of the LED lamp 100 are substantially the same as those in the sixth embodiment. Therefore, in the fifteenth embodiment, elements similar to those of the sixth embodiment are denoted by corresponding reference numbers, and no detailed description will be given thereof.

As shown in FIG. 26, the globe portion 102 comprises a diffusion cover 250, in place of the second light-guiding member 109 of the sixth embodiment. The diffusion cover 250 is formed of a material having optical transparency, such as acrylic, polycarbonate, cycloolefin, or glass.

The diffusion cover 250 surrounds the columnar support 101 between the light-receiving portion 117 of the first light-guiding member 108 and the base 3. The diffusion cover 250 is a thin plate having substantially the same thickness, and is shaped like an umbrella opening in the form of a flare from the base 3 toward the light-receiving portion 117. The diffusion cover 250 covers the first reflective surface 119 and reflective ring 104 of the light-receiving portion 117 from the base 3 side.

The diffusion cover 250 comprises a first surface 251 and a second surface 252. The first surface 251 curves to smoothly connect the peripheral surface 116*b* of the spherical portion 116 of the first light-guiding member 108 to the outer surface of the columnar support 101. The second surface 252 curves along the first surface 251. Accordingly, a space 253 is formed between the diffusion cover 250 and the light-receiving portion 117, and between and the diffusion cover 250 and the reflective ring 104.

The first surface 251 of the diffusion cover 250 is a white optical diffusion surface provided with, for example, a large number of fine concave and convex portions. The optical diffusion surface is formed by so-called sandblast of spraying fine abradant particles over the entire first surface 251.

The method of forming the optical diffusion surface is not limited to the sandblast. The diffusion surface may also be formed by coating the first surface 251 with paint containing light-diffusing particles, or by sealing diffusion particles in the diffusion cover 250. Instead of the first surface 251, the second surface 252 may be formed as an optical diffusion surface. Further, both the first and second surfaces 251 and 252 may be formed as optical diffusion surfaces.

In the fifteenth embodiment, the light generated by the LEDs 127 of the light-emitting module 103 directly or indirectly enters the light-receiving portion 117 of the first light-guiding member 108, as in the sixth embodiment.

The light, which is included in the light having entered the light-receiving portion 117 and has passed through the first reflective surface 119, enters the second surface 252 of the diffusion cover 250 through the space 253. The light having entered the diffusion cover 250 is broadly diffused during passing therethrough, and is then emitted from the first surface 251 toward the base 3 of the LED lamp 100.

As a result, light is broadly emitted from the first light-guiding member 108 and the diffusion cover 250. Thus, the LED lamp 100 functions as a lighting device of wide distribution.

The diffusion cover is not an element dedicated to the LED lamp of the fifteenth embodiment, but can also be used, in place of the second light-guiding member, in the LED lamps according to the sixth to eleventh embodiments.

Sixteenth Embodiment

Figure 27:
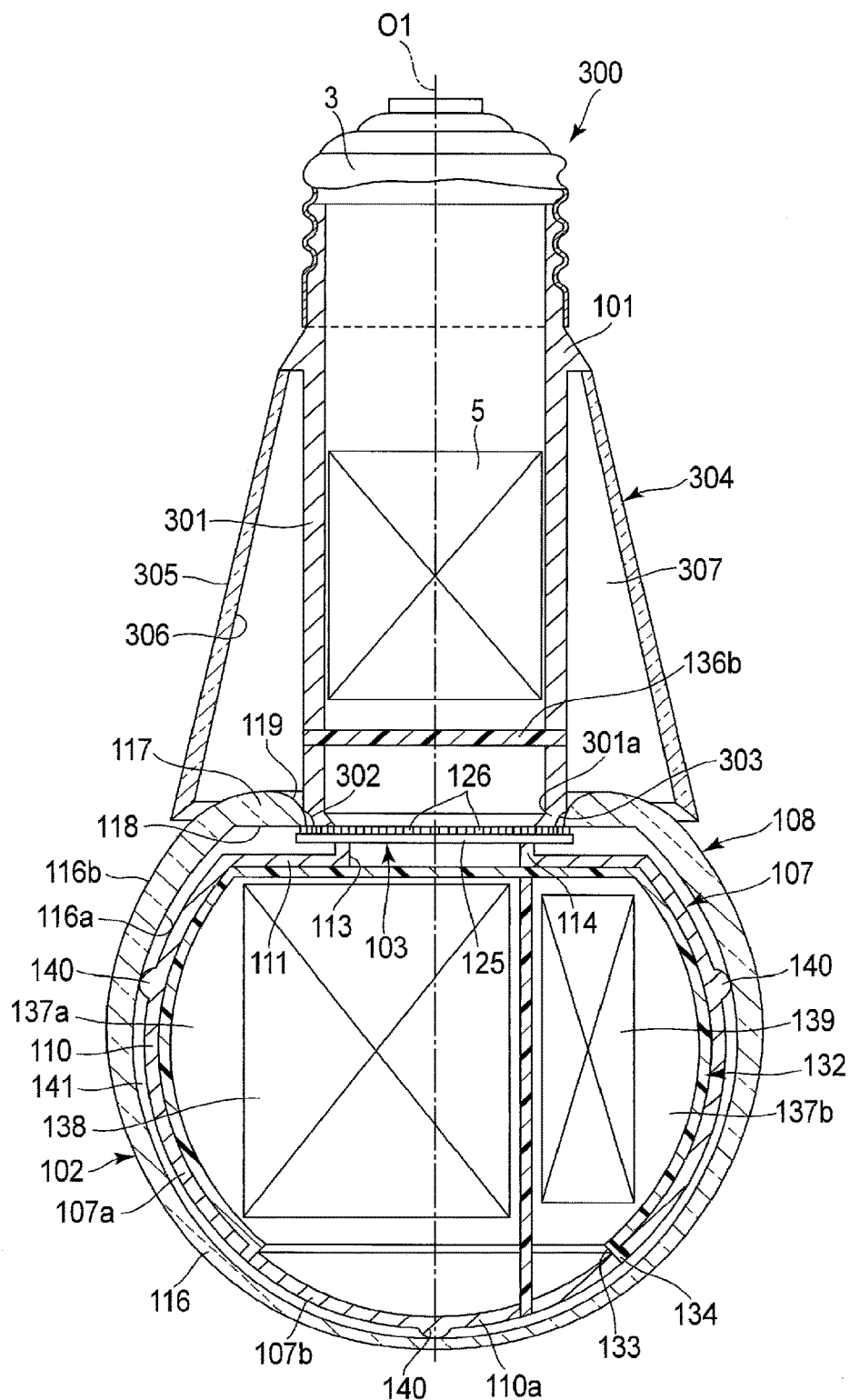
FIG. 27 is a cross-sectional view showing an LED lamp according to a sixteenth embodiment.

FIG. 27 shows a sixteenth embodiment. An LED lamp 300 according to the sixteenth embodiment differs from the sixth embodiment in structures except for the essential portion of the globe portion 102. Therefore, in the sixteenth embodiment, only elements different from those of the sixth embodiment will be described. Similar elements are denoted by corresponding reference numbers, and no detailed description will be given thereof.

As shown in FIG. 27, the columnar support 101, in which the base 3 is fitted, has an extended portion 301 extending to the globe portion 102. The extended portion 301 is a cylindrical hollow member, and has an axis coinciding with the axis O1 of the LED lamp 300.

In the sixteenth embodiment, the power supply circuit 5 is accommodated in the extended portion 301, and is separate from the base 3. Further, the power supply circuit 5 is thermally coupled to the extended portion 301 through a filler, such as silicone, or through a metal, ceramic or plastic member.

The extended portion 301 has an end portion 301a located on the opposite side of the base 3. The end portion 301a is surrounded by the light-receiving portion 117 of the first light-guiding member 107. A recess 302 is formed in the outer peripheral edge of the end portion 301a facing the light-receiving portion 117. The inner surface of the recess 302 serves as a second reflective surface 303 that is mirror-polished, for example. The second reflective surface 303 faces the first reflective surface 119, curved away from the same.

Furthermore, part of each package 126 included in the light-emitting module 103 faces the inner peripheral portion of the incidence surface 118 of the light-receiving portion 117, as in the sixth embodiment. The remaining part of each package 126 faces the second reflective surface 303 of the extended portion 301.

As shown in FIG. 27, the extended portion 301 of the columnar support 101 is covered with a diffusion cover 304. The diffusion cover 304 is formed of a material having optical transparency, such as acrylic, polycarbonate, cycloolefin or glass.

The diffusion cover 304 is a cylindrical member having an axis coinciding with the axis O1 of the LED lamp 300, and is interposed between the base 3 and the light-receiving portion 117 of the first light-guiding member 108. The diffusion cover 304 has a shape gradually enlarged in diameter from the base 3 toward the light-receiving portion 117, thereby covering the light-receiving portion 117 from the base 3 side.

Furthermore, the diffusion cover 304 comprises an outer peripheral surface 305 and an inner peripheral surface 306. The outer peripheral surface 305 linearly connects the outer surface of the columnar support 101 to the outer peripheral surface 116b of the spherical portion 116 of the first light-guiding member 108. The outer peripheral surface 305 is inclined from the base 3 toward the spherical portion 116 away from the axis O1 of the LED lamp 300. The inner peripheral surface 306 linearly extends along the outer peripheral surface 305.

As a result, a space 307, in which the first reflective surface 119 of the light-receiving portion 117 is exposed, is defined between the extended portion 301 and the diffusion cover 304. The space 307 is tapered from the light-receiving portion 117 toward the base 3.

The outer peripheral surface 305 of the diffusion cover 304 is formed as a white optical diffusion surface provided with, for example, a large number of fine concave and convex portions. The optical diffusion surface is formed by so-called sandblast of spraying fine abradant particles over the entire outer peripheral surface 305.

The method of forming the optical diffusion surface is not limited to the sandblast. The diffusion surface may also be formed by coating the outer peripheral 305 with paint containing light-diffusing particles, or by sealing diffusion particles in the diffusion cover 304. Further, instead of the peripheral surface 305, the inner peripheral surface 306 may be formed as an optical diffusion surface. Yet further, both the peripheral surface 305 and the inner peripheral surface 306 may be formed as optical diffusion surfaces.

In the sixteenth embodiment, part of the light emitted from the light-emitting module 103 directly enters the light-receiving portion 117 through the incidence surface 118 of the first light-guiding member 108, as in the sixth embodiment. Greater part of the light entering the light-receiving portion 117 passes therethrough to the first reflective surface 119, and is totally reflected therefrom. The light totally reflected by the first reflective surface 119 passes through the light-receiving portion 117 to the spherical portion 116 of the first light-guiding member 108.

The light, which is included in the light emitted from the light-emitting module 103 and does not enter the incidence surface 118, is guided to the second reflective surface 303 of the extended portion 301 of the columnar support 101. The second reflective surface 303 reflects, to the first reflective surface 119, greater part of the light emitted from the light-emitting module 103. The light reflected by the second reflective surface 303 passes through the first reflective surface 119 to the light-receiving portion 117, through which it is guided to the spherical portion 116 of the first light-guiding member 108. The light reaching the spherical portion 116 is emitted to the outside of the spherical portion 116 in the same course as in the sixth embodiment.

The light, which is included in the light having entered the light-receiving portion 117 of the first light-guiding member 108 and has passed through the first reflective surface 119, passes through the space 307 and enters the diffusion cover 304 from the inner peripheral surface 306 of the same. Part of the light guided to the space 307 is reflected by the outer peripheral surface of the extended portion 301, and is directed to the inner peripheral surface 306 of the diffusion cover 304.

Optical loss on the outer peripheral surface of the extended portion 301 can be suppressed by performing polishing or metal deposition on an outer peripheral surface of the extended portion 301 exposed to the space 307, or by coating the outer peripheral surface of the extended portion 301 with white paint.

The light having entered the diffusion cover 304 is widely diffused while passing therethrough, and is then emitted to the surroundings of the LED lamp 300 through the outer peripheral surface 305 of the diffusion cover 304.

As a result, light is emitted in all directions from the first light-guiding member 108 and the diffusion cover 304. Thus, the LED lamp 300 functions as a lighting device of a wide light distribution.

In the sixteenth embodiment, the diffusion cover 304 that covers the extended portion 301 of the columnar support 101 has a cylindrical shape extending along the axis O1 of the LED lamp 300. This structure increases the surface area of the extended portion 301, i.e., increases the emission area of the LED lamp 300.

In the sixteenth embodiment, the power supply circuit 5, which produces heat, is accommodated inside the extended portion 301 having thermal conductivity. The heat produced by the power supply circuit 5 is transmitted from the extended portion 301 to the diffusion cover 304 through an air layer as a medium in the space 307, and is then dissipated to the environment through the outer peripheral surface 305 of the diffusion cover 304.

Part of the heat of the power supply circuit 5 transmitted to the extended portion 301 is further transmitted from the extended portion 301 to the base 3 via the columnar support 101, and is then dissipated to the outside of the LED lamp 300 through the base 3 and a socket. Thus, the extended portion 301 of the columnar support 101 also functions as a heat transfer portion for heat dissipation.

The columnar support including the diffusion cover and the extended portion is not an element dedicated to the LED lamp of the sixteenth embodiment, but may be used in, for example, the LED lamps of the sixth to eleventh embodiments, in place of the columnar supports and the second light-guiding members therein.

Seventeenth Embodiment

FIG. 28 shows a seventeenth embodiment. An LED lamp 300 according to the seventeenth embodiment differs from the sixteenth embodiment in that in the former, the extended portion 301 of the columnar support 101 is surrounded by a light-guiding member 400. The other structures of the LED lamp 300 are substantially the same as those in the sixteenth embodiment. Therefore, in the seventeenth embodiment, elements similar to those of the sixteenth embodiment are denoted by corresponding reference numbers, and no detailed description will be given thereof.

The light-guiding member 400 is formed of a material having optical transparency, as in the sixteenth embodiment. The light-guiding member 400 has an outer peripheral surface 401, an inner peripheral surface 402 and end surface 403.

The outer peripheral surface 401 linearly connects the outer surface the columnar support 101 to the outer peripheral surfaces 116b of the spherical portion 116 of the first light-guiding member 108. The outer peripheral surface 401 is inclined from the base 3 toward the spherical portion 116 away from the axis O1 of the LED lamp 300.

The inner peripheral surface 402 extends along the axis O1 of the LED lamp 300 concentrically with the extended portion 301 to surround the same. Accordingly, the thickness T of the light-guiding member 400 gradually increases from the base 3 toward the spherical portion 116. A clearance 404 is defined between the inner peripheral surface 402 of the light-guiding member 400 and the extended portion 301.

The end surface 403 faces the first reflective surface 119 of the light-receiving portion 117, and curves along the first reflective surface 119. A clearance 405 is defined between the end surface 403 and the first reflective surface 119. It is desirable to set the clearances 404 and 405 larger than the wavelength $\lambda$ of light emitted from the light-emitting module 103. The appropriate size of the clearances 404 and 405 is, for example, 0.01 to 1.0 mm.

Furthermore, the inner peripheral surface 402 of the light-guiding member 400 is a white light-diffusion surface provided with, for example, a large number of fine concave and convex portions. The optical diffusion surface is formed by so-called sandblast of spraying fine abradant particles over the entire inner peripheral surface 402.

The method of forming the optical diffusion surface is not limited to the sandblast. The diffusion surface may also be formed by coating the inner peripheral surface 402 with paint containing light-diffusing particles, or by sealing light-diffusing particles in the light-guiding member 400. Instead of the inner peripheral surface 402, the outer peripheral surface 401 may be formed as an optical diffusion surface. Further, both the inner and outer peripheral surfaces 412 and 401 may be formed as optical diffusion surfaces.

In the seventeenth embodiment, the light emitted from the light-emitting module 103 is guided to the spherical portion 116 of the first light-guiding member 108 through the same course as in the sixteenth embodiment, and is then emitted from the outer peripheral surface 116b of the spherical portion 116 to the environment.

The light, which is included in the light having entered the light-receiving portion 117 of the first light-guiding member 108, and has passed through the first reflective surface 119, enters the interior of the wall of the light-guiding member 400 from the end surface 403 of the member 400 through the clearance 405. Part of the light having entered the light-guiding member 400 advances toward the base 3, while repeating total reflection between the inner and outer peripheral surfaces 402 and 401 of the light-guiding member 400.

The light that does not satisfy the total reflection condition passes through the outer peripheral surface 401 of the light-guiding member 400 to the environment. As a result, light is emitted in all directions from the first light-guiding member 108 and the light-guiding member 400, whereby the LED lamp 300 functions as a wide-distribution lighting device.

The light-guiding member 400 is not limited to a monolithic structure, but may be formed by combining a plurality of arbitrarily divided elements. For instance, if the light-guiding member 400 is divided into a plurality of elements along the axis O1, the light of the light-emitting module 103 can be easily guided to a position near the base 3. Further, if the light-guiding member 400 is divided into a plurality of elements perpendicularly to the axis O1, it can have a better appearance, although the end faces of the divided elements must be processed to prevent reflection of light.

The divided elements may be joined by various welding methods, such as ultrasonic welding, oscillation welding, induction welding, high-frequency welding, semiconductor-laser welding, and thermal welding, spin welding, or by adhesion methods using, for example, an adhesive, double-sided tape and grease.

The light-guiding member and the extended portion of the columnar support are not elements dedicated to the LED lamp of the seventeenth embodiment, but can also be used in the LED lamps according to the sixth to eleventh embodiments, in place of their columnar supports and second light-guiding members.

The lighting devices according to the above-described embodiments are not limited to LED lamps of a bulb type. For instance, the lighting devices are also applicable to a lighting structure directly attached to the ceiling or wall of a room, or to a lighting structure pendent from the ceiling.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A lighting device comprising:
   a main body having a thermal conductivity, the main body including a hollow cylindrical shell portion, and a light-source support portion positioned at an end of the shell portion;
   a base secured to the other end of the shell portion, which is located on an opposite side of the light-source support portion;
   a light source including at least a semiconductor light-emitting element and thermally coupled to the light-source support portion;
   an accessory element having an allowable temperature limit different from an allowable temperature limit of the light source, the accessory element accommodated in the shell portion in a state where the accessory element is thermally coupled to the shell portion; and
   an adiabatic member thermally isolating the light source from the accessory element, the adiabatic member including an edge at a position distant from the base, which is closer to the light-source support portion than the base, the edge dividing the shell portion into a first region that is thermally coupled to the light source, and at least a second region that is thermally coupled to the accessory element, the second region being continuous with the base, the first region being thermally isolated from the second region by the edge.

2. The lighting device of claim 1, wherein the adiabatic member is interposed between the light-source support portion and the accessory element.

3. The lighting device of claim 2, further comprising a globe included in the main body and covering the light-source support portion and the light source.

4. The lighting device of claim 1, wherein assuming that an entire surface area of the main body is $A_{all}$, a surface area of the first region of the main body thermally coupled to the light source is $A_1$, and the second region thermally coupled to the accessory element is $A_2$, the surface areas $A_{all}$, $A_1$ and $A_2$ satisfy a following equation (1):

$$A_{all}=A_1+A_2 \quad (1)$$

assuming that a surface area of the first region of the main body, which causes the light source to have an allowable temperature limit increase $\Delta T_{1max}$, is $A_{1min}$, and a surface area of the second region of the main body, which causes the accessory element to have an allowable temperature limit increase $\Delta T_{2max}$, is $A_{2min}$, the surface area $A_1$ of the first region of the main body satisfies a following inequation (2):

$$A_1 \geq A_{1min} \quad (2)$$

the surface area $A_2$ of the second region of the main body satisfies a following inequation (3):

$$A_2 \geq A_{2min} \quad (3)$$

the surface area $A_{all}$ satisfies a following relationship (4):

$$A_{all} \geq A_{1min}+A_{2min} \quad (4)$$

when the inequation (2) is applied to the equation (1), a following inequation (5) is satisfied:

$$A_1 \leq A_{all}-A_{2min} \quad (5)$$

when the inequation (3) is applied to the equation (1), a following inequation (6) is satisfied:

$$A_2 \leq A_{all}-A_{1min} \quad (6)$$

when the inequations (2) and (5) are combined, a following inequation (7) is satisfied:

$$A_{1min} \leq A_1 \leq A_{all}-A_{2min} \quad (7)$$

when the inequations (3) and (6) are combined, a following inequation (8) is satisfied:

$$A_{2min} \leq A_2 \leq A_{all}-A_{1min} \quad (8)$$

assuming that a thermal resistance between the light source and an environment is $R_1(A_1)$, a calorific value of the light source is $Q_1$, an allowable temperature limit increase at a junction of the light source is $\Delta T_{1max}$, a thermal resistance between the accessory element and the environment is $R_2(A_2)$, a calorific value of the accessory element is $Q_2$, an allowable temperature limit increase associated with the accessory element is $\Delta T_{2max}$, $A_{1min}$ and $A_{2min}$ satisfy following equations (9) and (10), respectively:

$$\Delta T_{1max}=R_1(A_{1min})Q_1 \quad (9)$$

$$\Delta T_{2max}=R_2(A_{2min})Q_2 \quad (10)$$

assuming that a thermal resistance between the junction of the light source and the first region of the main body is $R_{1ci}$, a thermal resistance between the first region of the main body and the environment is $R_{1co}$, and a thermal resistance between the accessory element and the second region of the main body is $R_{2ci}$, a thermal resistance between the second region of the main body and the environment is $R_{2co}$, a thermal resistance between the accessory element and a base incorporated in the main body is $R_{2si}$, and a thermal resistance between the base and the environment is $R_{2so}$, the above-mentioned $R_1(A_1)$ including the above-mentioned $A_1$ and the above-mentioned $R_2(A_2)$ including the above-mentioned $A_2$ satisfy following equations (11) and (12), respectively:

$$R_1(A_1) = R_{1ci} + R_{1co} \quad (11)$$

$$R_2(A_2) = \frac{(R_{2ci} + R_{2co})(R_{2si} + R_{2so})}{(R_{2ci} + R_{2co}) + (R_{2si} + R_{2so})} \quad (12)$$

a thermal resistance $R_{1co}(A_1)$ between the main body and the environment satisfies a following equation (13), assuming that a thermal resistance therebetween due to convection is $R_{1coc}(A_1)$, and a thermal resistance therebetween due to radiation is $R_{1cor}(A_1)$:

$$R_{1co}(A_1) = \frac{R_{1coc}(A_1)R_{1cor}(A_1)}{R_{1coc}(A_1) + R_{1cor}(A_1)} \quad (13)$$

a thermal resistance $R_{2co}(A_2)$ between the second region of the main body and the environment satisfies an equation similar to the equation (13), assuming that a thermal resistance therebetween due to convection is $R_{2coc}(A_2)$, and a thermal resistance therebetween due to radiation is $R_{2cor}(A_2)$;

assuming that a heat transfer coefficient between the first region of the main body and the environment is $h_1$, the thermal resistance $R_{1coc}(A_1)$ due to convection satisfies a following equation (14):

$$R_{1coc}(A_1) = \frac{1}{h_1 A_1} \quad (14)$$

assuming that the heat transfer coefficient $h_1$ is equivalent to natural convection along an isothermal vertical plate, and that a vertical length of the first region of the main body is $d_1$, a heat transfer coefficient of a gas in the environment is $k1$, and a Nusselt number of the gas is $Nu_1$, the heat transfer coefficient $h_1$ is given by a following equation (15):

$$h_1 = \frac{k_1}{d_1} Nu_1 \quad (15)$$

assuming that a Rayleigh number of the gas is $Ra_1$, the Nusselt number $Nu_1$ satisfies a relationship given by a following equation (16):

$$Nu_1 = 0.59 Ra_1^{1/4} \quad (16)$$

assuming that an average temperature of the main body is $T_{1c}$, a temperature of the environment is $T_a$, a gravitational acceleration is g, a volume elasticity of the gas is $\beta 1$, a coefficient of kinematic viscosity of the gas $v_1$, and a temperature transfer coefficient of the gas is $\alpha_1$, the Rayleigh number $Ra_1$ of the gas is given by a following equation (17):

$$Ra_1 = \frac{g\beta_1(T_{1c} - T_a)d_1^3}{v_1\alpha_1} \quad (17)$$

assuming that the surface area of the first region of the main body is $A_1$, the temperature of the main body is $T_{1c}$, a radiation coefficient of the main body is $\varepsilon 1$, the temperature of the environment is $T_a$, and a Stefan-Boltzmann constant is $\sigma$, a relationship given by a following equation (18) is established:

$$R_{1cor}(A_1) = \frac{1}{A_1\varepsilon_1\sigma(T_{1c} + T_a)(T_{1c}^2 + T_a^2)}. \quad (18)$$

5. The lighting device of claim 4, wherein when only a reduction in the temperature of the light source contributes to an enhancement of a short-term performance, such as an emission efficiency, or of a long-term performance, such as a life, the surface area $A_1$ of the first region of the main body is defined by a following equation (19), and the surface area $A_2$ of the second region of the main body is defined by a following equation (20):

$$A_1 = A_{all} - A_{2min} \quad (19)$$

$$A_2 = A_{all} - A_1 \quad (20).$$

6. The lighting device of claim 5, wherein
assuming that the entire surface area of the main body is $A_{all}$, an $i^{th}$ surface area of the main body connected to an $i^{th}$ heat producer is $A_i$, and a total number of heat producers is n, the surface area $A_{all}$ satisfies a following equation (21):

$$A_{all} = \sum_{i=1}^{n} A_i \quad (21)$$

assuming that the $i^{th}$ surface area of the main body, which causes the $i^{th}$ heat producer to have an allowable temperature limit increase $\Delta T_{imax}$, is $A_{imin}$, Ai satisfies a following inequation (22):

$$A_i \geq A_{imin} \quad (22)$$

the surface area $A_{all}$ further satisfies a following equation (23):

$$A_{all} \geq \sum_{i=1}^{n} A_{imin} \quad (23)$$

when the inequation (22) is applied to the equation (21), a following inequation (24) is established:

$$A_i \leq A_{all} - \sum_{\substack{j=1 \\ j \neq i}}^{n} A_{jmin} \quad (24)$$

when the inequations (22) and (24) are combined, a following inequation (25) is established:

$$A_{imax} \leq A_i \leq A_{all} - \sum_{\substack{j=1 \\ j \neq i}}^{n} A_{jmin} \quad (25)$$

assuming that a thermal resistance between the $i^{th}$ heat producer and the environment is $R_i(A_i)$, a calorific value of the $i^{th}$ heat producer is Qi, and an allowable temperature limit increase at a junction of the $i^{th}$ heat producer is $\Delta T_{imax}$, $A_{imin}$ satisfies a following equation (26):

$$\Delta T_{imax} = R_i(A_{imin})Q_i \quad (26)$$

assuming that a thermal resistance between the $i^{th}$ heat producer and the main body is $R_{ici}$, and a thermal resistance between the main body and the environment is $R_{ico}$, $R_i(A_i)$ including $A_i$ satisfies a following equation (27):

$$R_i(A_i) = R_{ici} + R_{ico} \quad (27)$$

when a heat dissipation path of the $i^{th}$ heat producer includes a base, $R_i(A_i)$ including $A_i$ satisfies a following equation (28), assuming that a thermal resistance between the $i^{th}$ heat producer and the base is $R_{isi}$, and a thermal resistance between the base and the environment is $R_{iso}$:

$$R_i(A_i) = \frac{(R_{ici} + R_{ico})(R_{isi} + R_{iso})}{(R_{ici} + R_{ico}) + (R_{isi} + R_{iso})} \quad (28)$$

assuming that a thermal resistance between the main body and the environment due to convection is $R_{icoc}(A_i)$, and a thermal resistance therebetween due to radiation is $R_{icor}(A_i)$, a thermal resistance $R_{ico}(A_i)$ therebetween satisfies a following equation (29):

$$R_{ico}(A_i) = \frac{R_{icoc}(A_i)R_{icor}(A_i)}{R_{icoc}(A_i) + R_{icor}(A_i)}. \quad (29)$$

7. The lighting device of claim 6, wherein when only a reduction in the temperature of the $i^{th}$ heat producer contributes to an enhancement of a short-term performance, such as an emission efficiency, or of a long-term performance, such as a life, the surface area $A_i$ of the main body connected to the $i^{th}$ heat producer is defined by a following equation (30):

$$A_i = A_{all} - \sum_{\substack{j=1 \\ j \neq i}}^{n} A_{jmin}. \quad (30)$$

8. The lighting device of claim 6, wherein when the $i^{th}$ heat producer comprises m small heat producers the calorific value $Q_i$ satisfies a following equation (31):

$$Q_i = \sum_{j=1}^{m} Q_j. \quad (31)$$

* * * * *